United States Patent
Innes et al.

(10) Patent No.: US 10,581,522 B1
(45) Date of Patent: Mar. 3, 2020

(54) FREE-SPACE, TWISTED LIGHT OPTICAL COMMUNICATION SYSTEM

(71) Applicant: AT&T Intellectual Property I, L.P., Atlanta, GA (US)

(72) Inventors: Timothy Innes, Atlanta, GA (US); Keith Russ, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/211,809

(22) Filed: Dec. 6, 2018

(51) Int. Cl.
*H04B 10/40* (2013.01)
*H04B 10/11* (2013.01)

(52) U.S. Cl.
CPC .................... *H04B 10/11* (2013.01)

(58) Field of Classification Search
CPC ........... H04B 10/11; H04B 10/40; H04J 11/00
See application file for complete search history.

(56) References Cited

U.S. PATENT DOCUMENTS

| | | |
|---|---|---|
| 2,106,770 A | 2/1938 | Southworth et al. |
| 2,129,714 A | 9/1938 | Southworth et al. |
| 2,410,113 A | 10/1946 | Turner, Jr. |
| 2,541,843 A | 2/1951 | Tiley et al. |
| 2,685,068 A | 7/1954 | Goubau |
| 2,735,092 A | 2/1956 | Brown |
| 2,806,177 A | 9/1957 | Haeff et al. |
| 2,852,753 A | 9/1958 | Gent et al. |
| 2,867,776 A | 1/1959 | Wilkinson, Jr. |
| 2,900,558 A | 8/1959 | Watkins et al. |
| 2,912,695 A | 11/1959 | Cutler |
| 2,921,277 A | 1/1960 | Goubau |
| 3,016,520 A | 1/1962 | Chaimowicz et al. |
| 3,096,462 A | 7/1963 | Feinstein et al. |
| 3,201,724 A | 8/1965 | Hafner |

(Continued)

FOREIGN PATENT DOCUMENTS

| | | |
|---|---|---|
| CA | 2515560 A1 | 2/2007 |
| EP | 2568528 B1 | 12/2017 |

(Continued)

OTHER PUBLICATIONS

International Search Report and Written Opinion for PCT/US2017/065110 dated Mar. 13, 2018.

(Continued)

*Primary Examiner* — Dzung D Tran
(74) *Attorney, Agent, or Firm* — Guntin & Gust, PLC; Ralph Trementozzi

(57) ABSTRACT

Aspects of the subject disclosure may include, determining a twist number based on digital input data, wherein the twist number corresponds to a predetermined orbital angular momentum of a photon. An adjustment value is generated based on the twist number, and multiple orbital angular momentum modulators are adjusted, wherein the modulators are adapted to change orbital angular momenta of photons of an input optical beam according to the adjustment value. Application of a light beam to the multiple orbital angular momentum modulators applies orbital angular momenta to the input optical beam resulting in a modulated optical beam having a predetermined number of twists based on the predetermined orbital angular momentum. Other embodiments are disclosed.

20 Claims, 34 Drawing Sheets

(56) References Cited

U.S. PATENT DOCUMENTS

| | | |
|---|---|---|
| 3,566,317 A | 2/1971 | Hafner |
| 3,588,755 A | 6/1971 | Sawada et al. |
| 3,956,751 A | 5/1976 | Herman |
| 4,783,665 A | 11/1988 | Lier et al. |
| 4,825,221 A | 4/1989 | Suzuki et al. |
| 5,457,469 A | 10/1995 | Diamond et al. |
| 5,889,449 A | 3/1999 | Fiedziuszko |
| 6,239,377 B1 | 5/2001 | Nishikawa et al. |
| 6,590,923 B1 | 7/2003 | Batelaan et al. |
| 7,009,471 B2 | 3/2006 | Elmore |
| 7,043,271 B1 | 5/2006 | Seto et al. |
| 7,064,726 B2 | 6/2006 | Kitamori et al. |
| 7,280,033 B2 | 10/2007 | Berkman et al. |
| 7,301,424 B2 | 11/2007 | Suarez-Gartner et al. |
| 7,345,623 B2 | 3/2008 | McEwan et al. |
| 7,567,154 B2 | 7/2009 | Elmore |
| 7,590,404 B1 | 9/2009 | Johnson et al. |
| 7,915,980 B2 | 3/2011 | Hardacker et al. |
| 7,925,235 B2 | 4/2011 | Konya et al. |
| 7,973,296 B2 | 7/2011 | Quick et al. |
| 8,159,385 B2 | 4/2012 | Farneth et al. |
| 8,212,635 B2 | 7/2012 | Miller, II et al. |
| 8,237,617 B1 | 8/2012 | Johnson et al. |
| 8,253,516 B2 | 8/2012 | Miller, II et al. |
| 8,269,583 B2 | 9/2012 | Miller, II et al. |
| 8,344,829 B2 | 1/2013 | Miller, II et al. |
| 8,547,090 B2 | 10/2013 | Lukin et al. |
| 8,655,180 B2 | 2/2014 | Vaananen |
| 8,736,502 B1 | 5/2014 | Mehr et al. |
| 8,897,697 B1 | 11/2014 | Bennett et al. |
| 9,077,577 B1 | 7/2015 | Linquist et al. |
| 9,113,347 B2 | 8/2015 | Henry |
| 9,209,902 B2 | 12/2015 | Willis, III et al. |
| 9,290,258 B1 | 3/2016 | Devaul |
| 9,312,919 B1 | 4/2016 | Barzegar et al. |
| 9,448,257 B2 | 9/2016 | Saxby et al. |
| 9,461,706 B1 | 10/2016 | Bennett et al. |
| 9,490,869 B1 | 11/2016 | Henry |
| 9,503,228 B2 | 11/2016 | Subhedar et al. |
| 9,509,415 B1 | 11/2016 | Henry et al. |
| 9,520,945 B2 | 12/2016 | Gerszberg et al. |
| 9,525,524 B2 | 12/2016 | Barzegar et al. |
| 9,544,006 B2 | 1/2017 | Henry et al. |
| 9,564,947 B2 | 2/2017 | Stuckman et al. |
| 9,577,306 B2 | 2/2017 | Willis, III et al. |
| 9,588,815 B1 | 3/2017 | Mistry et al. |
| 9,608,692 B2 | 3/2017 | Willis, III et al. |
| 9,608,740 B2 | 3/2017 | Henry et al. |
| 9,615,269 B2 | 4/2017 | Henry et al. |
| 9,627,768 B2 | 4/2017 | Henry et al. |
| 9,628,116 B2 | 4/2017 | Willis, III et al. |
| 9,640,850 B2 | 5/2017 | Henry et al. |
| 9,653,770 B2 | 5/2017 | Henry et al. |
| 9,680,670 B2 | 6/2017 | Henry et al. |
| 9,692,101 B2 | 6/2017 | Henry et al. |
| 9,705,561 B2 | 7/2017 | Henry et al. |
| 9,705,571 B2 | 7/2017 | Gerszberg et al. |
| 9,742,462 B2 | 8/2017 | Bennett et al. |
| 9,748,626 B2 | 8/2017 | Henry et al. |
| 9,749,053 B2 | 8/2017 | Henry et al. |
| 9,722,318 B2 | 9/2017 | Adriazola et al. |
| 9,753,469 B2 | 9/2017 | Mccollough |
| 9,768,833 B2 | 9/2017 | Fuchs et al. |
| 9,769,020 B2 | 9/2017 | Henry et al. |
| 9,780,834 B2 | 10/2017 | Henry et al. |
| 9,793,951 B2 | 10/2017 | Henry et al. |
| 9,793,954 B2 | 10/2017 | Bennett et al. |
| 9,838,286 B2 | 12/2017 | Zhang et al. |
| 9,847,566 B2 | 12/2017 | Henry et al. |
| 9,853,342 B2 | 12/2017 | Henry et al. |
| 9,858,167 B2 | 1/2018 | Neiger et al. |
| 9,860,075 B1 | 1/2018 | Gerszberg et al. |
| 9,865,911 B2 | 1/2018 | Henry et al. |
| 9,866,309 B2 | 1/2018 | Bennett et al. |
| 9,871,282 B2 | 1/2018 | Henry et al. |
| 9,871,283 B2 | 1/2018 | Henry et al. |
| 9,876,264 B2 | 1/2018 | Barnickel et al. |
| 9,876,388 B2 | 1/2018 | Steiner-jovic et al. |
| 9,876,570 B2 | 1/2018 | Henry et al. |
| 9,876,605 B1 | 1/2018 | Henry et al. |
| 9,882,257 B2 | 1/2018 | Henry et al. |
| 9,893,795 B1 | 2/2018 | Willis et al. |
| 9,912,381 B2 | 3/2018 | Bennett et al. |
| 9,917,341 B2 | 3/2018 | Henry et al. |
| 9,984,818 B2 | 5/2018 | Rumrill |
| 9,991,580 B2 | 6/2018 | Henry et al. |
| 9,997,819 B2 | 6/2018 | Bennett et al. |
| 9,998,172 B1 | 6/2018 | Barzegar et al. |
| 9,998,870 B1 | 6/2018 | Bennett et al. |
| 9,999,038 B2 | 6/2018 | Barzegar et al. |
| 10,003,364 B1 | 6/2018 | Willis, III et al. |
| 10,009,063 B2 | 6/2018 | Gerszberg et al. |
| 10,009,065 B2 | 6/2018 | Henry et al. |
| 10,009,067 B2 | 6/2018 | Birk et al. |
| 10,009,287 B2 | 6/2018 | Djukic et al. |
| 10,009,901 B2 | 6/2018 | Gerszberg |
| 10,027,397 B2 | 7/2018 | Kim |
| 10,027,427 B2 | 7/2018 | Vannucci et al. |
| 10,027,530 B2 | 7/2018 | Mahkonen et al. |
| 10,033,107 B2 | 7/2018 | Henry et al. |
| 10,033,108 B2 | 7/2018 | Henry et al. |
| 10,044,409 B2 | 8/2018 | Barzegar et al. |
| 10,051,483 B2 | 8/2018 | Barzegar et al. |
| 10,051,488 B1 | 8/2018 | Vannucci et al. |
| 10,062,970 B1 | 8/2018 | Vannucci et al. |
| 10,069,535 B2 | 9/2018 | Vannucci et al. |
| 10,079,661 B2 | 9/2018 | Gerszberg et al. |
| 10,084,541 B2 | 9/2018 | Ashrafi |
| 10,090,606 B2 | 10/2018 | Henry et al. |
| 10,096,883 B2 | 10/2018 | Henry et al. |
| 10,103,777 B1 | 10/2018 | Henry et al. |
| 10,103,799 B2 | 10/2018 | Luddy et al. |
| 10,103,801 B2 | 10/2018 | Bennett et al. |
| 10,123,217 B1 | 11/2018 | Barzegar et al. |
| 10,129,057 B2 | 11/2018 | Willis, III et al. |
| 10,135,145 B2 | 11/2018 | Henry et al. |
| 10,136,434 B2 | 11/2018 | Gerszberg et al. |
| 10,142,086 B2 | 11/2018 | Bennett et al. |
| 10,148,016 B2 | 12/2018 | Johnson et al. |
| 10,154,493 B2 | 12/2018 | Bennett et al. |
| 10,170,840 B2 | 1/2019 | Henry et al. |
| 10,171,158 B1 | 1/2019 | Barzegar et al. |
| 10,200,106 B1 | 2/2019 | Barzegar et al. |
| 10,205,212 B2 | 2/2019 | Henry et al. |
| 10,205,231 B1 | 2/2019 | Henry et al. |
| 10,205,655 B2 | 2/2019 | Barzegar et al. |
| 10,224,981 B2 | 3/2019 | Henry et al. |
| 10,230,426 B1 | 3/2019 | Henry et al. |
| 10,230,428 B1 | 3/2019 | Barzegar et al. |
| 10,243,270 B2 | 3/2019 | Henry et al. |
| 10,244,408 B1 | 3/2019 | Vannucci et al. |
| 10,264,586 B2 | 4/2019 | Beattie, Jr. et al. |
| 10,276,907 B2 | 4/2019 | Bennett et al. |
| 10,284,261 B1 | 5/2019 | Barzegar et al. |
| 10,291,286 B2 | 5/2019 | Henry et al. |
| 10,305,190 B2 | 5/2019 | Britz et al. |
| 10,305,192 B2 | 5/2019 | Rappaport |
| 10,305,197 B2 | 5/2019 | Henry et al. |
| 10,312,567 B2 | 6/2019 | Bennett et al. |
| 10,320,586 B2 | 6/2019 | Henry et al. |
| 10,326,495 B1 | 6/2019 | Barzegar et al. |
| 10,340,573 B2 | 7/2019 | Johnson et al. |
| 10,340,600 B2 | 7/2019 | Henry et al. |
| 10,340,979 B1 | 7/2019 | Barzegar et al. |
| 10,348,391 B2 | 7/2019 | Bennett et al. |
| 10,355,745 B2 | 7/2019 | Henry et al. |
| 10,361,489 B2 | 7/2019 | Britz et al. |
| 2004/0113756 A1 | 6/2004 | Mollenkopf et al. |
| 2004/0169572 A1 | 9/2004 | Elmore et al. |
| 2004/0218688 A1 | 11/2004 | Santhoff et al. |
| 2005/0042989 A1 | 2/2005 | Ho et al. |
| 2005/0111533 A1 | 5/2005 | Berkman et al. |
| 2005/0258920 A1 | 11/2005 | Elmore et al. |
| 2005/0259914 A1 | 11/2005 | Padgett et al. |

(56) References Cited

U.S. PATENT DOCUMENTS

| | | | |
|---|---|---|---|
| 2006/0056807 A1* | 3/2006 | Grier | H04B 10/501 386/316 |
| 2006/0083269 A1 | 4/2006 | Kang et al. | |
| 2006/0239613 A1 | 10/2006 | Montgomery et al. | |
| 2008/0064331 A1 | 3/2008 | Washiro et al. | |
| 2008/0125036 A1 | 5/2008 | Konya et al. | |
| 2008/0211727 A1 | 9/2008 | Elmore et al. | |
| 2008/0252541 A1 | 10/2008 | Diaz et al. | |
| 2009/0079660 A1 | 3/2009 | Elmore et al. | |
| 2009/0258652 A1 | 10/2009 | Lambert et al. | |
| 2010/0225426 A1 | 9/2010 | Unger et al. | |
| 2010/0277003 A1 | 11/2010 | Von Novak et al. | |
| 2011/0110404 A1 | 5/2011 | Washiro | |
| 2011/0132658 A1 | 6/2011 | Miller, II et al. | |
| 2011/0136432 A1 | 6/2011 | Miller, II et al. | |
| 2011/0140911 A1 | 6/2011 | Pant et al. | |
| 2011/0187578 A1 | 8/2011 | Farneth et al. | |
| 2012/0133373 A1 | 5/2012 | Ali et al. | |
| 2012/0306587 A1 | 12/2012 | Strid et al. | |
| 2013/0064311 A1 | 3/2013 | Turner et al. | |
| 2013/0169499 A1 | 7/2013 | Lin et al. | |
| 2014/0285277 A1 | 9/2014 | Herbsommer et al. | |
| 2015/0126107 A1 | 5/2015 | Robert et al. | |
| 2015/0188584 A1 | 7/2015 | Laurent-Michel | |
| 2015/0194735 A1 | 7/2015 | Graceffo | |
| 2015/0201186 A1* | 7/2015 | Smithwick | H04N 9/3132 348/52 |
| 2015/0256270 A1 | 9/2015 | Paller | |
| 2015/0349910 A1 | 12/2015 | Huang et al. | |
| 2016/0028163 A1 | 1/2016 | Li et al. | |
| 2016/0041523 A1* | 2/2016 | Ashrafi | G03H 1/2645 359/9 |
| 2016/0044647 A1* | 2/2016 | Ashrafi | H04J 14/06 370/330 |
| 2016/0069804 A1 | 3/2016 | Ashrafi et al. | |
| 2016/0080839 A1 | 3/2016 | Fuchs et al. | |
| 2016/0112093 A1 | 4/2016 | Barzegar | |
| 2016/0127073 A1 | 5/2016 | Ashrafi et al. | |
| 2016/0164571 A1 | 6/2016 | Bennett et al. | |
| 2016/0182096 A1 | 6/2016 | Panioukov et al. | |
| 2016/0261477 A1 | 9/2016 | Au et al. | |
| 2016/0315662 A1 | 10/2016 | Henry | |
| 2016/0359541 A1 | 12/2016 | Bennett | |
| 2016/0359546 A1 | 12/2016 | Bennett | |
| 2017/0012667 A1 | 1/2017 | Bennett | |
| 2017/0033953 A1 | 2/2017 | Henry et al. | |
| 2017/0033954 A1 | 2/2017 | Henry et al. | |
| 2017/0079037 A1 | 3/2017 | Gerszberg et al. | |
| 2017/0093693 A1 | 3/2017 | Barzegar et al. | |
| 2017/0110795 A1 | 4/2017 | Henry | |
| 2017/0110804 A1 | 4/2017 | Henry et al. | |
| 2017/0163451 A1 | 6/2017 | Willner et al. | |
| 2017/0229782 A1 | 8/2017 | Adriazola et al. | |
| 2017/0244614 A1 | 8/2017 | Wu et al. | |
| 2017/0302505 A1 | 10/2017 | Zafer et al. | |
| 2018/0034685 A1 | 2/2018 | Naous | |
| 2018/0048497 A1 | 2/2018 | Henry et al. | |
| 2018/0054232 A1 | 2/2018 | Henry et al. | |
| 2018/0054233 A1 | 2/2018 | Henry et al. | |
| 2018/0054234 A1 | 2/2018 | Stuckman et al. | |
| 2018/0062886 A1 | 3/2018 | Shala et al. | |
| 2018/0063018 A1 | 3/2018 | Bosch et al. | |
| 2018/0069594 A1 | 3/2018 | Henry et al. | |
| 2018/0069731 A1 | 3/2018 | Henry et al. | |
| 2018/0074568 A1 | 3/2018 | Priyadarshi et al. | |
| 2018/0076982 A1 | 3/2018 | Henry et al. | |
| 2018/0076988 A1 | 3/2018 | Willis, III | |
| 2018/0077709 A1 | 3/2018 | Gerszberg | |
| 2018/0108997 A1 | 4/2018 | Henry et al. | |
| 2018/0108998 A1 | 4/2018 | Henry et al. | |
| 2018/0108999 A1 | 4/2018 | Henry et al. | |
| 2018/0115040 A1 | 4/2018 | Bennett et al. | |
| 2018/0115058 A1 | 4/2018 | Henry et al. | |
| 2018/0115060 A1 | 4/2018 | Bennett et al. | |
| 2018/0115075 A1 | 4/2018 | Bennett et al. | |
| 2018/0115081 A1 | 4/2018 | Johnson et al. | |
| 2018/0123207 A1 | 5/2018 | Henry et al. | |
| 2018/0123208 A1 | 5/2018 | Henry et al. | |
| 2018/0123643 A1 | 5/2018 | Henry et al. | |
| 2018/0123836 A1 | 5/2018 | Henry et al. | |
| 2018/0151957 A1 | 5/2018 | Bennett et al. | |
| 2018/0159195 A1 | 6/2018 | Henry et al. | |
| 2018/0159196 A1 | 6/2018 | Henry et al. | |
| 2018/0159197 A1 | 6/2018 | Henry et al. | |
| 2018/0159228 A1 | 6/2018 | Britz et al. | |
| 2018/0159229 A1 | 6/2018 | Britz | |
| 2018/0159230 A1 | 6/2018 | Henry et al. | |
| 2018/0159232 A1 | 6/2018 | Henry et al. | |
| 2018/0159235 A1 | 6/2018 | Wolniansky | |
| 2018/0159238 A1 | 6/2018 | Wolniansky | |
| 2018/0159240 A1 | 6/2018 | Henry et al. | |
| 2018/0159243 A1 | 6/2018 | Britz et al. | |
| 2018/0159615 A1 | 6/2018 | Kim | |
| 2018/0166761 A1 | 6/2018 | Henry et al. | |
| 2018/0166784 A1 | 6/2018 | Johnson et al. | |
| 2018/0166785 A1 | 6/2018 | Henry et al. | |
| 2018/0166787 A1 | 6/2018 | Johnson et al. | |
| 2018/0167130 A1 | 6/2018 | Vannucci | |
| 2018/0167148 A1 | 6/2018 | Vannucci et al. | |
| 2018/0167927 A1 | 6/2018 | Beattie, Jr. et al. | |
| 2018/0262291 A1 | 9/2018 | Doster et al. | |
| 2018/0278334 A1 | 9/2018 | Ashrafi | |
| 2018/0287262 A1 | 10/2018 | Patri et al. | |
| 2018/0302162 A1 | 10/2018 | Gerszberg et al. | |
| 2018/0306716 A1* | 10/2018 | Ashrafi | G01N 33/6896 |
| 2018/0323826 A1 | 11/2018 | Vannucci et al. | |
| 2019/0013577 A1 | 1/2019 | Henry et al. | |
| 2019/0013837 A1 | 1/2019 | Henry et al. | |
| 2019/0074563 A1 | 3/2019 | Henry et al. | |
| 2019/0074564 A1 | 3/2019 | Henry et al. | |
| 2019/0074565 A1 | 3/2019 | Henry et al. | |
| 2019/0074580 A1 | 3/2019 | Henry et al. | |
| 2019/0074864 A1 | 3/2019 | Henry et al. | |
| 2019/0074865 A1 | 3/2019 | Henry et al. | |
| 2019/0074878 A1 | 3/2019 | Henry et al. | |
| 2019/0081747 A1 | 3/2019 | Barzegar et al. | |
| 2019/0104012 A1 | 4/2019 | Barzegar et al. | |
| 2019/0104419 A1 | 4/2019 | Barzegar et al. | |
| 2019/0104420 A1 | 4/2019 | Barzegar et al. | |
| 2019/0115642 A1 | 4/2019 | Henry et al. | |
| 2019/0123442 A1 | 4/2019 | Vannucci et al. | |
| 2019/0123783 A1 | 4/2019 | Henry et al. | |
| 2019/0131717 A1 | 5/2019 | Vannucci | |
| 2019/0131718 A1 | 5/2019 | Vannucci | |
| 2019/0134367 A1* | 5/2019 | Shiga | G02B 5/3016 |
| 2019/0140679 A1 | 5/2019 | Vannucci et al. | |
| 2019/0140694 A1 | 5/2019 | Henry et al. | |
| 2019/0141714 A1 | 5/2019 | Willis, III et al. | |
| 2019/0150072 A1 | 5/2019 | Barzegar | |
| 2019/0173151 A1 | 6/2019 | Henry et al. | |
| 2019/0173190 A1 | 6/2019 | Johnson et al. | |
| 2019/0173524 A1 | 6/2019 | Vannucci et al. | |
| 2019/0173542 A1 | 6/2019 | Johnson et al. | |
| 2019/0173601 A1 | 6/2019 | Wolniansky et al. | |
| 2019/0174506 A1 | 6/2019 | Willis, III et al. | |
| 2019/0181532 A1 | 6/2019 | Vannucci et al. | |
| 2019/0181683 A1 | 6/2019 | Vannucci et al. | |

FOREIGN PATENT DOCUMENTS

| | | |
|---|---|---|
| GB | 1469840 A | 4/1977 |
| GB | 2227369 A | 7/1990 |
| JP | 2004516697 A | 6/2004 |
| KR | 20020091917 | 12/2002 |
| WO | 8605327 A1 | 9/1986 |
| WO | 0133747 A1 | 5/2001 |
| WO | 2007045114 A1 | 4/2007 |
| WO | 2013008292 A1 | 1/2013 |
| WO | 2014140962 A1 | 9/2014 |
| WO | 2015087257 A2 | 6/2015 |
| WO | 2016061114 A1 | 4/2016 |
| WO | 2018106455 A1 | 6/2018 |
| WO | 2018106684 A1 | 6/2018 |

(56) References Cited

FOREIGN PATENT DOCUMENTS

| WO | 2018106915 A1 | 6/2018 |
| WO | 2018175615 A1 | 9/2018 |
| WO | 2019050752 A1 | 3/2019 |

OTHER PUBLICATIONS

International Preliminary Report on Patentability for PCT/US2017/065110 dated Jun. 20, 2019.
"International Search Report and Written Opinion", PCT/US2018/015634, dated Jun. 25, 2018, 8 pages.
Akalin, Tahsin et al., "Single-Wire Transmission Lines at Terahertz Frequencies", IEEE Transactions on Microwave Theory and Techniques, vol. 54, No. 6, 2006, 2762-2767.
Alam, M. N. et al., "Novel Surface Wave Exciters for Power Line Fault Detection and Communications", Department of Electrical Engineering, University of South Carolina, Antennas and Propagation (APSURSI), 2011 IEEE International Symposium, IEEE, 2011, 1-4.
Barlow, H. M. et al., "Surface Waves", 621.396.11 : 538.566, Paper No. 1482 Radio Section, 1953, pp. 329-341.
Corridor Systems, "A New Approach to Outdoor DAS Network Physical Layer Using E-Line Technology", Mar. 2011, 5 pages.
Doumanis, E. et al., "Conical Horn Antenna with Sprial Phase Plate for Difference Pattern Generation", 2013 7th European Conference on Antennas and Propagation (EuCAP), 2013, 1309-1312.
Elmore, Glenn et al., "A Surface Wave Transmission Line", QEX, May/Jun. 2012, pp. 3-9.
Elmore, Glenn , "Introduction to the Propagating Wave on a Single Conductor", www.corridor.biz, Jul. 27, 2009, 30 pages.
Friedman, M et al., "Low-Loss RF Transport Over Long Distances", IEEE Transactions on Microwave Theory and Techniques, vol. 49, No. 2, Feb. 2001, 8 pages.
Goubau, Georg et al., "Investigation of a Surface-Wave Line for Long Distance Transmission", 1952, 263-267.
Goubau, Georg et al., "Investigations with a Model Surface Wave Transmission Line", IRE Transactions on Antennas and Propagation, 1957, 222-227.
Goubau, Georg , "Open Wire Lines", IRE Transactions on Microwave Theory and Techniques, 1956, 197-200.
Goubau, Georg , "Single-Conductor Surface-Wave Transmission Lines", Proceedings of the I.R.E., 1951, 619-624.
Goubau, Georg , "Surface Waves and Their Application to Transmission Lines", Radio Communication Branch, Coles Signal Laboratory, Mar. 10, 1950, 1119-1128.
Goubau, Georg , "Waves on Interfaces", IRE Transactions on Antennas and Propagation, Dec. 1959, 140-146.
Jiang, Y.S. et al., "Electromagnetic orbital angular momentum in remote sensing", PIERS Proceedings, Moscow, Russia, Aug. 18-21, 2009, 1330-1337.
Luo, Hailu et al., "Reversed propagation dynamics of Laguerre-Gaussian beams in left-handed materials", Physical Review A 77.2, 023812., Feb. 20, 2008, 1-7.
Marrucci, Lorenzo , "Rotating light with light: Generation of helical modes of light by spin-to-orbital angular momentum conversion in inhomogeneous liquid crystals", International Congress on Optics and Optoelectronics. International Society for Optics and Photonics, 2007, 12 pages.
Ren-Bin, Zhong et al., "Surface plasmon wave propagation along single metal wire", Chin. Phys. B, vol. 21, No. 11, May 2, 2012, 9 pages.
Sommerfeld, A. , "On the propagation of electrodynamic waves along a wire", Annals of Physics and Chemistry New Edition, vol. 67, No. 2, 1899, 72 pages.
Villaran, Michael et al., "Condition Monitoring of Cables Task 3 Report: Condition Monitoring Techniques for Electric Cables", Brookhaven National Laboratory, Technical Report, Nov. 30, 2009, 89 pages.
Wang, Hao et al., "Dielectric Loaded Substrate Integrated Waveguide (SIW)—Plan Horn Antennas", IEEE Transactions on Antennas and Propagation, IEEE Service Center, Piscataway, NJ, US, vol. 56, No. 3, Mar. 1, 2010, 640-647.
Wang, Kanglin , "Dispersion of Surface Plasmon Polaritons on Metal Wires in the Terahertz Frequency Range", Physical Review Letters, PRL 96, 157401, 2006, 4 pages.
Xiao, Shiyi et al., "Spin-dependent optics with metasurfaces", Nanophotonics 6.1, 215-234., 2016, 215-234.
"New records set up with 'Screws of Light'", Science Daily, University of Vienna, https://www.sciencedaily.com/releases/2016/11/161116102013.htm, Nov. 16, 2016.
"Orbital angular momentum of light", Wikipedia, https://en.wikipedia.org/wiki/Orbital_angular_momentum_of_light, 8 pp, Oct. 28, 2018.
Akhtar, Fayaz et al., "Energy replenishment using renewable and traditional energy resources for sustainable wireless sensor networks: A review", Renewable and Sustainable Energy Reviews 45: 769-784, 2015.
Kedar, Debbie et al., "Urban optical wireless communication networks: The main challenges and possible solutions", IEEE Communications Magazine 42.5: S2-S7, 2004.
Krenn, Mario et al., "Communication with spatially modulated light through turbulent air across Vienna", New Journal of Physics 16.11: 113028, 2014.
Krenn, Mario et al., "Twisted light transmission over 143 km", PNAS, vol. 113 (48), Nov. 2016, 13648-13653.
Son, In Keun et al., "A survey of free space optical networks", Digital Communications and Networks 3, 2017, 67-77.
Wang, Jian et al., "Terabit free-space data transmission employing orbital angular momentum multiplexing", Nature photonics 6.7: 488, 2012.
Willner, Alan E. et al., "Optical communications using orbital angular momentum beams", Advances in Optics and Photonics 7.1, 2015, 66-106.
Yue, Zengi et al., "Angular-mementum nanometrology in an ultrathin plasmonic topological insulator film", Nature Communications, 9:4413, 7 pp, 2018.

* cited by examiner

300

400

500

550

600

700

800

900

950

1100

1200

1400

1650

2210

2700

3600

FREE-SPACE, TWISTED LIGHT OPTICAL COMMUNICATION SYSTEM

FIELD OF THE DISCLOSURE

The subject disclosure relates to free-space, twisted light optical communication system.

BACKGROUND

As smart phones and other portable devices increasingly become ubiquitous, and data usage increases, macrocell base station devices and existing wireless infrastructure in turn require higher bandwidth capability in order to address the increased demand. To provide additional mobile bandwidth, small cell deployment is being pursued, with microcells and picocells providing coverage for much smaller areas than traditional macrocells.

In addition, most homes and businesses have grown to rely on broadband data access for services such as voice, video and Internet browsing, etc. Broadband access networks include satellite, 4G or 5G wireless, power line communication, fiber, cable, and telephone networks.

BRIEF DESCRIPTION OF THE DRAWINGS

Reference will now be made to the accompanying drawings, which are not necessarily drawn to scale, and wherein.

DETAILED DESCRIPTION

Figure 1:
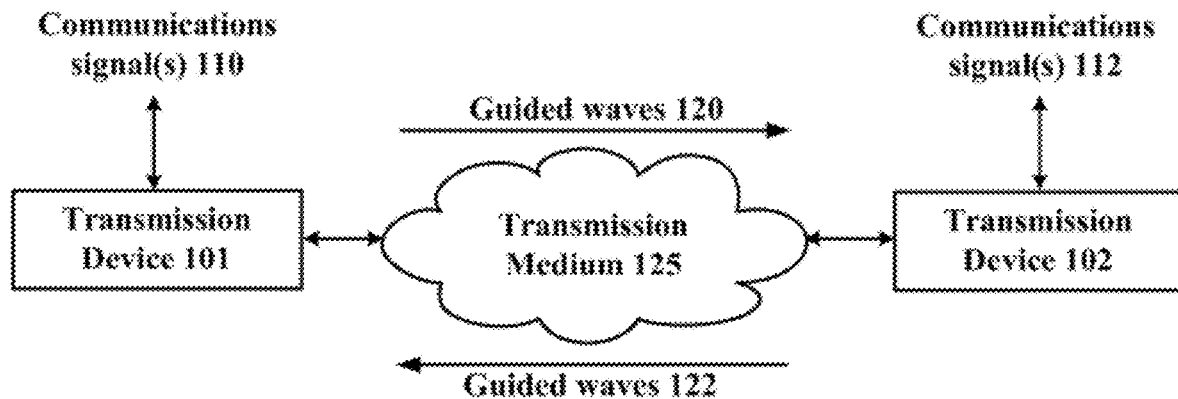
FIG. 1 is a block diagram illustrating an example, non-limiting embodiment of a guided-wave communications system in accordance with various aspects described herein.

One or more embodiments are now described with reference to the drawings, wherein like reference numerals are used to refer to like elements throughout the drawings. In the following description, for purposes of explanation, numerous details are set forth in order to provide a thorough understanding of the various embodiments. It is evident, however, that the various embodiments can be practiced without these details (and without applying to any particular networked environment or standard).

In an embodiment, a guided wave communication system is presented for sending and receiving communication signals such as data or other signaling via guided electromagnetic waves. The guided electromagnetic waves include, for example, surface waves or other electromagnetic waves that are bound to or guided by a transmission medium as described herein. It will be appreciated that a variety of transmission media can be utilized with guided wave communications without departing from example embodiments. Examples of such transmission media can include one or more of the following, either alone or in one or more combinations: wires, whether insulated or not, and whether single-stranded or multi-stranded; conductors of other shapes or configurations including unshielded twisted pair cables including single twisted pairs, Category 5e and other twisted pair cable bundles, other wire bundles, cables, rods, rails, pipes; non-conductors such as dielectric pipes, rods, rails, or other dielectric members; combinations of conductors and dielectric materials such as coaxial cables; or other guided wave transmission media.

The inducement of guided electromagnetic waves that propagate along a transmission medium can be independent of any electrical potential, charge or current that is injected or otherwise transmitted through the transmission medium as part of an electrical circuit. For example, in the case where the transmission medium is a wire, it is to be appreciated that while a small current in the wire may be formed in response to the propagation of the electromagnetic waves guided along the wire, this can be due to the propagation of the electromagnetic wave along the wire surface, and is not formed in response to electrical potential, charge or current that is injected into the wire as part of an electrical circuit. The electromagnetic waves traveling along the wire therefore do not require an electrical circuit (i.e., ground or other electrical return path) to propagate along the wire surface. The wire therefore can be a single wire transmission line that is not part of an electrical circuit. For example, electromagnetic waves can propagate along a wire configured as an electrical open circuit. Also, in some embodiments, a wire is not necessary, and the electromagnetic waves can propagate along a single line transmission medium that is not a wire including a single line transmission medium that is conductorless. Accordingly, electromagnetic waves can propagate along a physical transmission medium without requiring an electrical return path.

More generally, "guided electromagnetic waves" or "guided waves" as described by the subject disclosure are affected by the presence of a physical object that is at least a part of the transmission medium (e.g., a bare wire or other conductor, a dielectric including a dielectric core without a conductive shield and/or without an inner conductor, an insulated wire, a conduit or other hollow element whether conductive or not, a bundle of insulated wires that is coated, covered or surrounded by a dielectric or insulator or other wire bundle, or another form of solid, liquid or otherwise non-gaseous transmission medium) so as to be at least partially bound to or guided by the physical object and so as to propagate along a transmission path of the physical object. Such a physical object can operate as at least a part of a transmission medium that guides, by way of one or more interfaces of the transmission medium (e.g., an outer surface, inner surface, an interstitial spacing formed between surfaces of a transmission medium, an interior portion between the outer and the inner surfaces or other boundary between elements of the transmission medium).

In this fashion, a transmission medium may support multiple transmission paths over different surfaces of the transmission medium. For example, a stranded cable or wire bundle may support electromagnetic waves that are guided by the outer surface of the stranded cable or wire bundle, as well as electromagnetic waves that are guided by inner cable surfaces between two, three or more individual strands or wires within the stranded cable or wire bundle. For example, electromagnetic waves can be guided within interstitial areas of a stranded cable, insulated twisted pair wires, or a wire bundle. The guided electromagnetic waves of the subject disclosure are launched from a sending (transmitting) device and propagate along the transmission medium for reception by at least one receiving device. The propagation of guided electromagnetic waves, can carry energy, data and/or other signals along the transmission path from the sending device to the receiving device.

As used herein the term "conductor" (based on a definition of the term "conductor" from *IEEE* 100, *the Authoritative Dictionary of IEEE Standards Terms*, 7th Edition, 2000) means a substance or body that allows a current of electricity to pass continuously along it. The terms "insulator", "conductorless" or "nonconductor" (based on a definition of the term "insulator" from *IEEE 100, the Authoritative Dictionary of IEEE Standards Terms, 7th* Edition, 2000) means a device or material in which electrons or ions cannot be moved easily. It is possible for an insulator, or a conductorless or nonconductive material to be intermixed intentionally (e.g., doped) or unintentionally into a resulting substance with a small amount of another material having the properties of a conductor. However, the resulting substance may remain substantially resistant to a flow of a continuous electrical current along the resulting substance. Furthermore, a conductorless member such as a dielectric rod or other conductorless core lacks an inner conductor and a conductive shield.

As used herein, the term "eddy current" (based on a definition of the term "conductor" from *IEEE 100, the Authoritative Dictionary of IEEE Standards Terms, 7th* Edition, 2000) means a current that circulates in a metallic material as a result of electromotive forces induced by a variation of magnetic flux. Although it may be possible for an insulator, conductorless or nonconductive material in the foregoing embodiments to allow eddy currents that circulate within the doped or intermixed conductor and/or a very small continuous flow of an electrical current along the extent of the insulator, conductorless or nonconductive material, any such continuous flow of electrical current along such an insulator, conductorless or nonconductive material is de minimis compared to the flow of an electrical current along a conductor. Accordingly, in the subject disclosure an insulator, and a conductorless or nonconductor material are not considered to be a conductor. The term "dielectric" means an insulator that can be polarized by an applied electric field. When a dielectric is placed in an electric field, electric charges do not continuously flow through the material as they do in a conductor, but only slightly shift from their average equilibrium positions causing dielectric polarization. The terms "conductorless transmission medium or non-conductor transmission medium" can mean a transmission medium consisting of any material (or combination of materials) that may or may not contain one or more conductive elements but lacks a continuous conductor between the sending and receiving devices along the conductorless transmission medium or non-conductor transmission medium—similar or identical to the aforementioned properties of an insulator, conductorless or nonconductive material.

Unlike free space propagation of wireless signals such as unguided (or unbounded) electromagnetic waves that decrease in intensity inversely by the square of the distance traveled by the unguided electromagnetic waves, guided electromagnetic waves can propagate along a transmission medium with less loss in magnitude per unit distance than experienced by unguided electromagnetic waves.

Unlike electrical signals, guided electromagnetic waves can propagate along different types of transmission media from a sending device to a receiving device without requiring a separate electrical return path between the sending device and the receiving device. As a consequence, guided electromagnetic waves can propagate from a sending device to a receiving device along a conductorless transmission medium including a transmission medium having no conductive components (e.g., a dielectric strip, rod, or pipe), or via a transmission medium having no more than a single conductor (e.g., a single bare wire or insulated wire configured in an open electrical circuit). Even if a transmission medium includes one or more conductive components and the guided electromagnetic waves propagating along the transmission medium generate currents that flow in the one or more conductive components in a direction of the guided electromagnetic waves, such guided electromagnetic waves can propagate along the transmission medium from a sending device to a receiving device without requiring a flow of opposing currents on an electrical return path between the sending device and the receiving device (i.e., in an electrical open circuit configuration).

In a non-limiting illustration, consider electrical systems that transmit and receive electrical signals between sending and receiving devices by way of conductive media. Such systems generally rely on an electrical forward path and an electrical return path. For instance, consider a coaxial cable having a center conductor and a ground shield that are separated by an insulator. Typically, in an electrical system a first terminal of a sending (or receiving) device can be connected to the center conductor, and a second terminal of the sending (or receiving) device can be connected to the ground shield or other second conductor. If the sending device injects an electrical signal in the center conductor via the first terminal, the electrical signal will propagate along the center conductor causing forward currents in the center conductor, and return currents in the ground shield or other second conductor. The same conditions apply for a two terminal receiving device.

In contrast, consider a guided wave communication system such as described in the subject disclosure, which can utilize different embodiments of a transmission medium (including among others a coaxial cable) for transmitting and receiving guided electromagnetic waves without requiring an electrical return path. In one embodiment, for example, the guided wave communication system of the subject disclosure can be configured to induce guided electromagnetic waves that propagate along an outer surface of a coaxial cable. Although the guided electromagnetic waves can cause forward currents on the ground shield, the guided electromagnetic waves do not require return currents on, for example, the center conductor to enable the guided electromagnetic waves to propagate along the outer surface of the coaxial cable. The same can be said of other transmission media used by a guided wave communication system for the transmission and reception of guided electromagnetic waves. For example, guided electromagnetic waves induced by the guided wave communication system on a bare wire, an insulated wire, or a dielectric transmission medium (e.g., a dielectric core with no conductive materials), can propagate along the bare wire, the insulated bare wire, or the dielectric transmission medium without requiring return currents on an electrical return path.

Consequently, electrical systems that require forward and return conductors for carrying corresponding forward and reverse currents on conductors to enable the propagation of electrical signals injected by a sending device are distinct from guided wave systems that induce guided electromagnetic waves on an interface of a transmission medium without requiring an electrical return path to enable the propagation of the guided electromagnetic waves along the interface of the transmission medium. It is also noted that a transmission medium having an electrical return path (e.g., ground) for purposes of conducting currents (e.g., a power line) can be used to contemporaneously propagate guided electromagnetic waves along the transmission medium. However, the propagation of the guided electromagnetic waves is not dependent on the electrical currents flowing through the transmission medium. For example, if the electrical currents flowing through the transmission medium stop flowing for any reason (e.g., a power outage), guided electromagnetic waves propagating along the transmission medium can continue to propagate without interruption.

It is further noted that guided electromagnetic waves as described in the subject disclosure can have an electromagnetic field structure that lies primarily or substantially on an outer surface of a transmission medium so as to be bound to or guided by the outer surface of the transmission medium and so as to propagate non-trivial distances on or along the outer surface of the transmission medium. In other embodiments, guided electromagnetic waves can have an electromagnetic field structure that substantially lies above an outer surface of a transmission medium, but is nonetheless bound to or guided by the transmission medium and so as to propagate non-trivial distances on or along the transmission medium. In other embodiments, guided electromagnetic waves can have an electromagnetic field structure that has a field strength that is de minimis at the outer surface, below the outer surface, and/or in proximity to the outer surface of a transmission medium, but is nonetheless bound to or guided by the transmission medium and so as to propagate non-trivial distances along the transmission medium.

In other embodiments, guided electromagnetic waves can have an electromagnetic field structure that lies primarily or substantially below an outer surface of a transmission medium so as to be bound to or guided by an inner material of the transmission medium (e.g., dielectric material) and so as to propagate non-trivial distances within the inner material of the transmission medium. In other embodiments, guided electromagnetic waves can have an electromagnetic field structure that lies within a region that is partially below and partially above an outer surface of a transmission medium so as to be bound to or guided by this region of the transmission medium and so as to propagate non-trivial distances along this region of the transmission medium. It will be appreciated that electromagnetic waves that propagate along a transmission medium or are otherwise guided by a transmission medium (i.e., guided electromagnetic waves) can have an electric field structure such as described in one or more of the foregoing embodiments. The desired electromagnetic field structure in an embodiment may vary based upon a variety of factors, including the desired transmission distance, the characteristics of the transmission medium itself, environmental conditions/characteristics outside of the transmission medium (e.g., presence of rain, fog, humidity, atmospheric conditions, etc.), and characteristics of an electromagnetic wave that are configurable by a launcher (or coupler) as will be described below (e.g., configurable wave mode, configurable electromagnetic field structure, configurable polarity, configurable wavelength, configurable bandwidth, and so on).

Various embodiments described herein relate to coupling devices, that can be referred to as "waveguide coupling devices", "waveguide couplers" or more simply as "couplers", "coupling devices" or "launchers" for launching/inducing and/or receiving/extracting guided electromagnetic waves to and from a transmission medium. A wavelength of the guided electromagnetic waves can be small compared to one or more dimensions of the coupling device and/or the transmission medium such as the circumference of a wire or other cross sectional dimension. Such electromagnetic waves can operate at millimeter wave frequencies (e.g., 30 to 300 GHz), or lower than microwave frequencies such as 300 MHz to 30 GHz. Electromagnetic waves can be induced to propagate along a transmission medium by a coupling device, such as: a strip, arc or other length of dielectric material; a millimeter wave integrated circuit (MMIC), a horn, monopole, dipole, rod, slot, patch, planar or other antenna; an array of antennas; a magnetic resonant cavity or other resonant coupler; a coil, a strip line, a coaxial waveguide, a hollow waveguide, or other waveguide and/or other coupling device.

In operation, the coupling device receives an electromagnetic wave from a transmitter or transmission medium. The electromagnetic field structure of the electromagnetic wave can be carried below an outer surface of the coupling device, substantially on the outer surface of the coupling device, within a hollow cavity of the coupling device, can be radiated from a coupling device or a combination thereof. When the coupling device is in close proximity to a transmission medium, at least a portion of an electromagnetic wave can couple from the coupling device to the transmission medium, and continues to propagate as guided electromagnetic waves along the transmission medium. In a reciprocal fashion, a coupling device can receive or extract at least a portion of a guided electromagnetic waves propagating along a transmission medium and transfer these electromagnetic waves to a receiver. The guided electromagnetic waves launched and/or received by the coupling device propagate along the transmission medium from a sending device to a receiving device without requiring an electrical return path between the sending device and the receiving device. In this circumstance, the transmission medium acts as a waveguide to support the propagation of the guided electromagnetic waves from the sending device to the receiving device.

According to an example embodiment, a surface wave is a type of guided wave that is guided by a surface of a transmission medium, such as an exterior or outer surface or an interior or inner surface including an interstitial surface of the transmission medium such as the interstitial area between wires in a multi-stranded cable, insulated twisted pair wires, or wire bundle, and/or another surface of the transmission medium that is adjacent to or exposed to another type of medium having different properties (e.g., dielectric properties). Indeed, in an example embodiment, a surface of the transmission medium that guides a surface wave can represent a transitional surface between two different types of media. For example, in the case of a bare wire, the surface of the wire can be the outer or exterior conductive surface of the bare wire or uninsulated wire that is exposed to air or free space.

As another example, in the case of insulated wire, the surface of the wire can be the conductive portion of the wire, an exterior surface of the insulation of the wire, an inner region of the insulation of the wire, a gap formed between the insulation and the conductor of the wire, or a combination thereof. Accordingly, a surface of the transmission medium can be any one of an inner surface of an insulator surface of a wire or a conductive surface of the wire that is separated by a gap composed of, for example, air or free space.

A surface of a transmission medium can otherwise be any material region of the transmission medium. The surface that guides an electromagnetic wave can depend upon the relative differences in the properties (e.g., dielectric properties) of the insulator, air, and/or the conductor and further dependent on the frequency and propagation mode or modes of the guided wave.

According to an example embodiment, the term "about" a wire or other transmission medium used in conjunction with a guided wave can include fundamental guided wave propagation modes such as a guided wave having a circular or substantially circular field pattern/distribution, a symmetrical electromagnetic field pattern/distribution (e.g., electric field or magnetic field) or other fundamental mode pattern at least partially around a wire or other transmission medium. Unlike Zenneck waves that propagate along a single planar surface of a planar transmission medium, the guided electromagnetic waves of the subject disclosure that are bound to a transmission medium can have electromagnetic field patterns that surround or circumscribe, at least in part, a non-planar surface of the transmission medium with electromagnetic energy in all directions, or in all but a finite number of azimuthal null directions characterized by field strengths that approach zero field strength for infinitesimally small azimuthal widths.

For example, such non-circular field distributions can be unilateral or multi-lateral with one or more axial lobes characterized by relatively higher field strength and/or one or more nulls directions of zero field strength or substantially zero-field strength or null regions characterized by relatively low-field strength, zero-field strength and/or substantially zero-field strength. Further, the field distribution can otherwise vary as a function of azimuthal orientation around a transmission medium such that one or more angular regions around the transmission medium have an electric or magnetic field strength (or combination thereof) that is higher than one or more other angular regions of azimuthal orientation, according to an example embodiment. It will be appreciated that the relative orientations or positions of the guided wave higher order modes, particularly asymmetrical modes, can vary as the guided wave travels along the wire.

In addition, when a guided wave propagates "about" a wire or other type of transmission medium, it can do so according to a guided wave propagation mode that includes not only the fundamental wave propagation modes (e.g., zero order modes), but additionally or alternatively, non-fundamental wave propagation modes such as higher-order guided wave modes (e.g., $1^{st}$ order modes, $2^{nd}$ order modes, etc.). Higher-order modes include symmetrical modes that have a circular or substantially circular electric or magnetic field distribution and/or a symmetrical electric or magnetic field distribution, or asymmetrical modes and/or other guided (e.g., surface) waves that have non-circular and/or asymmetrical field distributions around the wire or other transmission medium. For example, the guided electromagnetic waves of the subject disclosure can propagate along a transmission medium from the sending device to the receiving device or along a coupling device via one or more guided wave modes such as a fundamental transverse magnetic (TM) TM00 mode (or Goubau mode), a fundamental hybrid mode (EH or HE) "EH00" mode or "HE00" mode, a transverse electromagnetic "TEMnm" mode, a total internal reflection (TIR) mode or any other mode such as EHnm, HEnm or TMnm, where n and/or m have integer values greater than or equal to 0, and other fundamental, hybrid and non-fundamental wave modes.

As used herein, the term "guided wave mode" refers to a guided wave propagation mode of a transmission medium, coupling device or other system component of a guided wave communication system that propagates for non-trivial distances along the length of the transmission medium, coupling device or other system component.

As used herein, the term "millimeter-wave" can refer to electromagnetic waves/signals that fall within the "millimeter-wave frequency band" of 30 GHz to 300 GHz. The term "microwave" can refer to electromagnetic waves/signals that fall within a "microwave frequency band" of 300 MHz to 300 GHz. The term "radio frequency" or "RF" can refer to electromagnetic waves/signals that fall within the "radio frequency band" of 10 kHz to 1 THz. It is appreciated that wireless signals, electrical signals, and guided electromagnetic waves as described in the subject disclosure can be configured to operate at any desirable frequency range, such as, for example, at frequencies within, above or below millimeter-wave and/or microwave frequency bands. In particular, when a coupling device or transmission medium includes a conductive element, the frequency of the guided electromagnetic waves that are carried by the coupling device and/or propagate along the transmission medium can be below the mean collision frequency of the electrons in the conductive element. Further, the frequency of the guided electromagnetic waves that are carried by the coupling device and/or propagate along the transmission medium can be a non-optical frequency, e.g., a radio frequency below the range of optical frequencies that begins at 1 THz.

It is further appreciated that a transmission medium as described in the subject disclosure can be configured to be opaque or otherwise resistant to (or at least substantially reduce) a propagation of electromagnetic waves operating at optical frequencies (e.g., greater than 1 THz).

As used herein, the term "antenna" can refer to a device that is part of a transmitting or receiving system to transmit/radiate or receive free space wireless signals.

In accordance with one or more embodiments, a device includes a processing system having a processor and a memory that stores executable instructions. The executable instructions, when executed by the processing system, facilitate performance of operations that include receiving digital input data. A twist number is determined based on the digital input data, wherein the twist number corresponds to a predetermined orbital angular momentum. An adjustment value is determined based on the twist number, and multiple orbital angular momentum modulators are controlled, wherein the multiple orbital angular momentum modulators are adapted to change orbital angular momenta of an input, free-space optical beam according to the adjustment value. Application of a free-space light beam to the multiple orbital angular momentum modulators applies orbital angular momenta to the input, free-space optical beam resulting in a modulated free-space optical beam having a predetermined number of twists based on the predetermined orbital angular momentum.

In accordance with one or more embodiments, a process that includes obtaining, by a processing system including a processor, input data. A twist number is identified by the processing system based on the input data, wherein the twist number corresponds to a predetermined orbital angular momentum. An adjustment value is determined by the processing system based on the twist number, and multiple orbital angular momentum modulators are controlled by the processing system. The multiple orbital angular momentum modulators are adapted to change orbital angular momenta of an input optical beam according to the adjustment value. Application of a light beam to the multiple orbital angular momentum modulators applies orbital angular momenta to the input optical beam resulting in a modulated optical beam having a predetermined number of twists based on the predetermined orbital angular momentum In accordance with one or more embodiments, a non-transitory, machine-readable medium, includes executable instructions that, when executed by a processing system including a processor, facilitate performance of operations. The operations include determining a twist number based on digital input data, wherein the twist number corresponds to a predetermined orbital angular momentum of a photon. An adjustment value is generated based on the twist number, and multiple orbital angular momentum modulators are adjusted, wherein the modulators are adapted to change orbital angular momenta of photons of an input optical beam according to the adjustment value. Application of a light beam to the multiple orbital angular momentum modulators applies orbital angular momenta to the input optical beam resulting in a modulated optical beam having a predetermined number of twists based on the predetermined orbital angular momentum.

Referring now to FIG. 1, a block diagram 100 illustrating an example, non-limiting embodiment of a guided wave communications system is shown. In operation, a transmission device 101 receives one or more communication signals 110 from a communication network or other communications device that includes data and generates guided waves 120 to convey the data via the transmission medium 125 to the transmission device 102. The transmission device 102 receives the guided waves 120 and converts them to communication signals 112 that include the data for transmission to a communications network or other communications device. The guided waves 120 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing via differing wave propagation modes and via other modulation and access strategies.

The communication network or networks can include a wireless communication network such as a mobile data network, a cellular voice and data network, a wireless local area network (e.g., WiFi or an IEEE 802.xx network), a satellite communications network, a personal area network or other wireless network. The communication network or networks can also include a wired communication network such as a telephone network, an Ethernet network, a local area network, a wide area network such as the Internet, a broadband access network, a cable network, a fiber optic network, or other wired network. The communication devices can include a network edge device, bridge device or home gateway, a set-top box, broadband modem, telephone adapter, access point, base station, or other fixed communication device, a mobile communication device such as an automotive gateway or automobile, laptop computer, tablet, smartphone, cellular telephone, or other communication device.

In an example embodiment, the guided wave communication system 100 can operate in a bi-directional fashion where transmission device 102 receives one or more communication signals 112 from a communication network or device that includes other data and generates guided waves 122 to convey the other data via the transmission medium 125 to the transmission device 101. In this mode of operation, the transmission device 101 receives the guided waves 122 and converts them to communication signals 110 that include the other data for transmission to a communications network or device. The guided waves 122 can be modulated to convey data via a modulation technique such as phase shift keying, frequency shift keying, quadrature amplitude modulation, amplitude modulation, multi-carrier modulation such as orthogonal frequency division multiplexing and via multiple access techniques such as frequency division multiplexing, time division multiplexing, code division multiplexing, multiplexing, multiplexing via differing wave propagation modes and via other modulation and access strategies.

The transmission medium 125 can include a cable having at least one inner portion surrounded by a dielectric material such as an insulator or other dielectric cover, coating or other dielectric material, the dielectric material having an outer surface and a corresponding circumference. In an example embodiment, the transmission medium 125 operates as a single-wire transmission line to guide the transmission of an electromagnetic wave. When the transmission medium 125 is implemented as a single wire transmission system, it can include a wire. The wire can be insulated or uninsulated, and single-stranded or multi-stranded (e.g., braided). In other embodiments, the transmission medium 125 can contain conductors of other shapes or configurations including wire bundles, cables, rods, rails, pipes. In addition, the transmission medium 125 can include non-conductors such as dielectric pipes, rods, rails, or other dielectric members; combinations of conductors and dielectric materials, conductors without dielectric materials or other guided wave transmission media and/or consist essentially of non-conductors such as dielectric pipes, rods, rails, or other dielectric members that operate without a continuous conductor such as an inner conductor or a conductive shield. It should be noted that the transmission medium 125 can otherwise include any of the transmission media previously discussed.

Further, as previously discussed, the guided waves 120 and 122 can be contrasted with radio transmissions over free space/air or conventional propagation of electrical power or signals through the conductor of a wire via an electrical circuit. In addition to the propagation of guided waves 120 and 122, the transmission medium 125 may optionally contain one or more wires that propagate electrical power or other communication signals in a conventional manner as a part of one or more electrical circuits.

Figure 2:
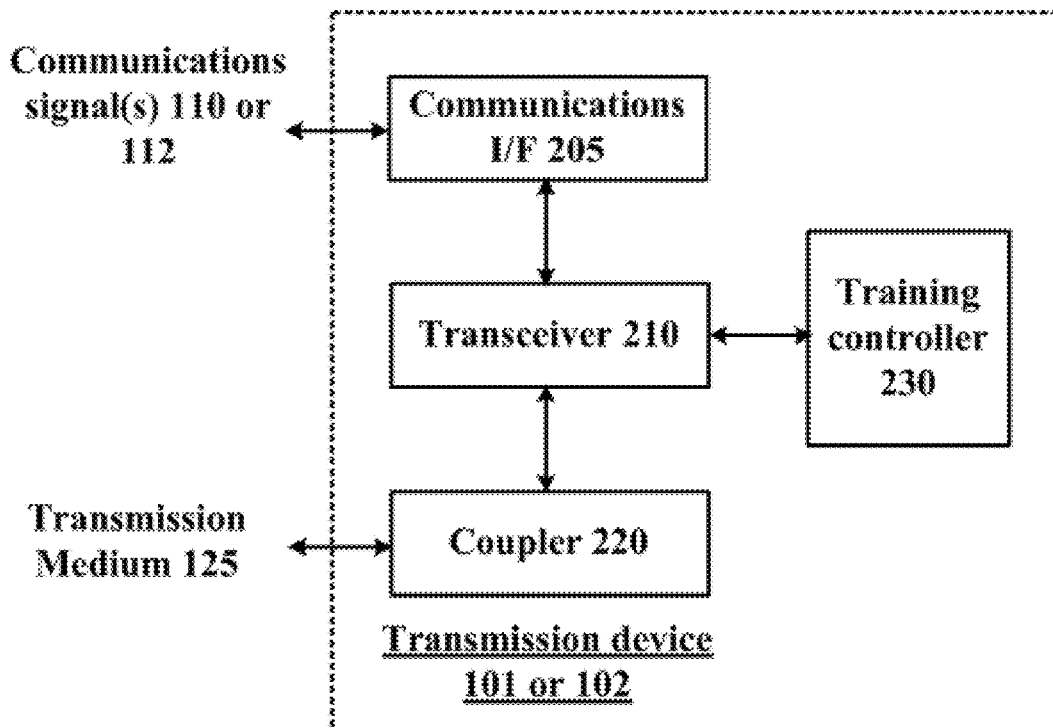
FIG. 2 is a block diagram illustrating an example, non-limiting embodiment of a transmission device in accordance with various aspects described herein.

Referring now to FIG. 2, a block diagram 200 illustrating an example, non-limiting embodiment of a transmission device is shown. The transmission device 101 or 102 includes a communications interface (I/F) 205, a transceiver 210 and a coupler 220.

In an example of operation, the communications interface 205 receives a communication signal 110 or 112 that includes data. In various embodiments, the communications interface 205 can include a wireless interface for receiving a wireless communication signal in accordance with a wireless standard protocol such as LTE or other cellular voice and data protocol, WiFi or an 802.11 protocol, WIMAX protocol, Ultra Wideband protocol, Bluetooth® protocol, Zigbee® protocol, a direct broadcast satellite (DBS) or other satellite communication protocol or other wireless protocol. In addition or in the alternative, the communications interface 205 includes a wired interface that operates in accordance with an Ethernet protocol, universal serial bus (USB) protocol, a data over cable service interface specification (DOCSIS) protocol, a digital subscriber line (DSL) protocol, a Firewire (IEEE 1394) protocol, or other wired protocol. In additional to standards-based protocols, the communications interface 205 can operate in conjunction with other wired or wireless protocol. In addition, the communications interface 205 can optionally operate in conjunction with a protocol stack that includes multiple protocol layers including a MAC protocol, transport protocol, application protocol, etc.

In an example of operation, the transceiver 210 generates an electromagnetic wave based on the communication signal 110 or 112 to convey the data. The electromagnetic wave has at least one carrier frequency and at least one corresponding wavelength. The carrier frequency can be within a millimeter-wave frequency band of 30 GHz-300 GHz, such as 60 GHz or a carrier frequency in the range of 30-40 GHz or a lower frequency band of 300 MHz-30 GHz in the microwave frequency range such as 26-30 GHz, 11 GHz, or 3-6 GHz, but it will be appreciated that other carrier frequencies are possible in other embodiments. In one mode of operation, the transceiver 210 merely upconverts the communications signal or signals 110 or 112 for transmission of the electromagnetic signal in the microwave or millimeter-wave band as a guided electromagnetic wave that is guided by or bound to the transmission medium 125. In another mode of operation, the communications interface 205 either converts the communication signal 110 or 112 to a baseband or near baseband signal or extracts the data from the communication signal 110 or 112 and the transceiver 210 modulates a high-frequency carrier with the data, the baseband or near baseband signal for transmission. It should be appreciated that the transceiver 210 can modulate the data received via the communication signal 110 or 112 to preserve one or more data communication protocols of the communication signal 110 or 112 either by encapsulation in the payload of a different protocol or by simple frequency shifting. In the alternative, the transceiver 210 can otherwise translate the data received via the communication signal 110 or 112 to a protocol that is different from the data communication protocol or protocols of the communication signal 110 or 112.

In an example of operation, the coupler 220 couples the electromagnetic wave to the transmission medium 125 as a guided electromagnetic wave to convey the communications signal or signals 110 or 112. While the prior description has focused on the operation of the transceiver 210 as a transmitter, the transceiver 210 can also operate to receive electromagnetic waves that convey other data from the single wire transmission medium via the coupler 220 and to generate communications signals 110 or 112, via communications interface 205 that includes the other data. Consider embodiments where an additional guided electromagnetic wave conveys other data that also propagates along the transmission medium 125. The coupler 220 can also couple this additional electromagnetic wave from the transmission medium 125 to the transceiver 210 for reception.

The transmission device 101 or 102 includes an optional training controller 230. In an example embodiment, the training controller 230 is implemented by a standalone processor or a processor that is shared with one or more other components of the transmission device 101 or 102. The training controller 230 selects the carrier frequencies, modulation schemes and/or guided wave modes for the guided electromagnetic waves based on testing of the transmission medium 125, environmental conditions and/or feedback data received by the transceiver 210 from at least one remote transmission device coupled to receive the guided electromagnetic wave.

In an example embodiment, a guided electromagnetic wave transmitted by a remote transmission device 101 or 102 conveys data that also propagates along the transmission medium 125. The data from the remote transmission device 101 or 102 can be generated to include the feedback data. In operation, the coupler 220 also couples the guided electromagnetic wave from the transmission medium 125 and the transceiver receives the electromagnetic wave and processes the electromagnetic wave to extract the feedback data.

In an example embodiment, the training controller 230 operates based on the feedback data to evaluate a plurality of candidate frequencies, modulation schemes and/or transmission modes to select a carrier frequency, modulation scheme and/or transmission mode to enhance performance, such as throughput, signal strength, reduce propagation loss, etc.

Consider the following example: a transmission device 101 begins operation under control of the training controller 230 by sending a plurality of guided waves as test signals such as pilot waves or other test signals at a corresponding plurality of candidate frequencies and/or candidate modes directed to a remote transmission device 102 coupled to the transmission medium 125. The guided waves can include, in addition or in the alternative, test data. The test data can indicate the particular candidate frequency and/or guided-wave mode of the signal. In an embodiment, the training controller 230 at the remote transmission device 102 receives the test signals and/or test data from any of the guided waves that were properly received and determines the best candidate frequency and/or guided wave mode, a set of acceptable candidate frequencies and/or guided wave modes, or a rank ordering of candidate frequencies and/or guided wave modes. This selection of candidate frequenc(ies) or/and guided-mode(s) are generated by the training controller 230 based on one or more optimizing criteria such as received signal strength, bit error rate, packet error rate, signal to noise ratio, propagation loss, etc. The training controller 230 generates feedback data that indicates the selection of candidate frequenc(ies) or/and guided wave mode(s) and sends the feedback data to the transceiver 210 for transmission to the transmission device 101. The transmission device 101 and 102 can then communicate data with one another based on the selection of candidate frequenc (ies) or/and guided wave mode(s).

In other embodiments, the guided electromagnetic waves that contain the test signals and/or test data are reflected back, repeated back or otherwise looped back by the remote transmission device 102 to the transmission device 101 for reception and analysis by the training controller 230 of the transmission device 101 that initiated these waves. For example, the transmission device 101 can send a signal to the remote transmission device 102 to initiate a test mode where a physical reflector is switched on the line, a termination impedance is changed to cause reflections, a loop back mode is switched on to couple electromagnetic waves back to the source transmission device 102, and/or a repeater mode is enabled to amplify and retransmit the electromagnetic waves back to the source transmission device 102. The training controller 230 at the source transmission device 102 receives the test signals and/or test data from any of the guided waves that were properly received and determines selection of candidate frequenc(ies) or/and guided wave mode(s).

While the procedure above has been described in a start-up or initialization mode of operation, each transmission device 101 or 102 can send test signals, evaluate candidate frequencies or guided wave modes via non-test conditions such as normal transmissions or otherwise evaluate candidate frequencies or guided wave modes at other times or continuously as well. In an example embodiment, the communication protocol between the transmission devices 101 and 102 can include an on-request or periodic test mode where either full testing or more limited testing of a subset of candidate frequencies and guided wave modes are tested and evaluated. In other modes of operation, the re-entry into such a test mode can be triggered by a degradation of performance due to a disturbance, weather conditions, etc. In an example embodiment, the receiver bandwidth of the transceiver 210 is either sufficiently wide or swept to receive all candidate frequencies or can be selectively adjusted by the training controller 230 to a training mode where the receiver bandwidth of the transceiver 210 is sufficiently wide or swept to receive all candidate frequencies.

Figure 3:
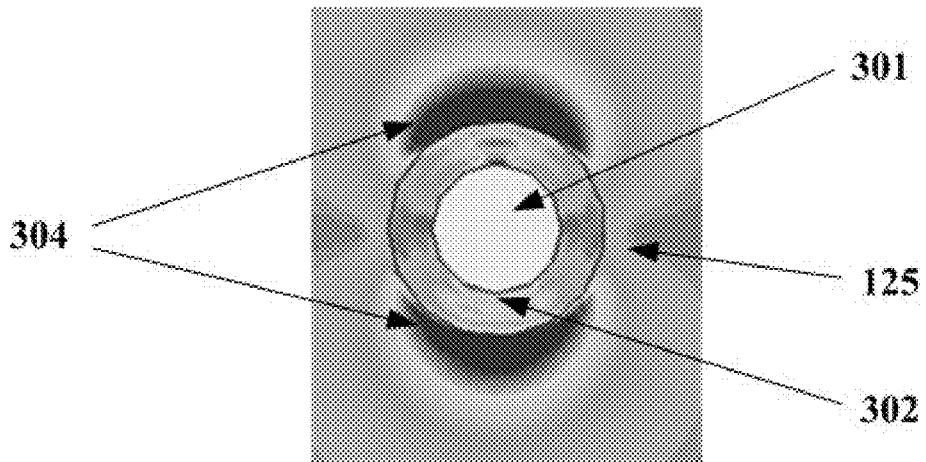
FIG. 3 is a graphical diagram illustrating an example, non-limiting embodiment of an electromagnetic field distribution in accordance with various aspects described herein.

Referring now to FIG. 3, a graphical diagram 300 illustrating an example, non-limiting embodiment of an electromagnetic field distribution is shown. In this embodiment, a transmission medium 125 in air includes an inner conductor 301 and an insulating jacket 302 of dielectric material, as shown in cross section. The diagram 300 includes different gray-scales that represent differing electromagnetic field strengths generated by the propagation of the guided wave having a non-circular and non-fundamental guided wave mode.

In particular, the electromagnetic field distribution corresponds to a modal "sweet spot" that enhances guided electromagnetic wave propagation along an insulated transmission medium and reduces end-to-end transmission loss. In this particular mode, electromagnetic waves are guided by the transmission medium 125 to propagate along an outer surface of the transmission medium—in this case, the outer surface of the insulating jacket 302. Electromagnetic waves are partially embedded in the insulator and partially radiating on the outer surface of the insulator. In this fashion, electromagnetic waves are "lightly" coupled to the insulator so as to enable electromagnetic wave propagation at long distances with low propagation loss.

As shown, the guided wave has a field structure that lies primarily or substantially outside of the transmission medium 125 that serves to guide the electromagnetic waves. The regions inside the conductor 301 have little or no field. Likewise regions inside the insulating jacket 302 have low field strength. The majority of the electromagnetic field strength is distributed in the lobes 304 at the outer surface of the insulating jacket 302 and in close proximity thereof. The presence of a non-circular and non-fundamental guided wave mode is shown by the high electromagnetic field strengths at the top and bottom of the outer surface of the insulating jacket 302 (in the orientation of the diagram)—as opposed to very small field strengths on the other sides of the insulating jacket 302.

The example shown corresponds to a 38 GHz electromagnetic wave guided by a wire with a diameter of 1.1 cm and a dielectric insulation of thickness of 0.36 cm. Because the electromagnetic wave is guided by the transmission medium 125 and the majority of the field strength is concentrated in the air outside of the insulating jacket 302 within a limited distance of the outer surface, the guided wave can propagate longitudinally down the transmission medium 125 with very low loss. In the example shown, this "limited distance" corresponds to a distance from the outer surface that is less than half the largest cross sectional dimension of the transmission medium 125. In this case, the largest cross sectional dimension of the wire corresponds to the overall diameter of 1.82 cm, however, this value can vary with the size and shape of the transmission medium 125. For example, should the transmission medium 125 be of a rectangular shape with a height of 0.3 cm and a width of 0.4 cm, the largest cross sectional dimension would be the diagonal of 0.5 cm and the corresponding limited distance would be 0.25 cm. The dimensions of the area containing the majority of the field strength also vary with the frequency, and in general, increase as carrier frequencies decrease.

It should also be noted that the components of a guided wave communication system, such as couplers and transmission media can have their own cut-off frequencies for each guided wave mode. The cut-off frequency generally sets forth the lowest frequency that a particular guided wave mode is designed to be supported by that particular component. In an example embodiment, the particular non-circular and non-fundamental mode of propagation shown is induced on the transmission medium 125 by an electromagnetic wave having a frequency that falls within a limited range (such as Fc to 2Fc) of the cut-off frequency Fc for this particular non-fundamental mode. The cut-off frequency Fc is particular to the characteristics of transmission medium 125. For embodiments as shown that include an inner conductor 301 surrounded by an insulating jacket 302, this cutoff frequency can vary based on the dimensions and properties of the insulating jacket 302 and potentially the dimensions and properties of the inner conductor 301 and can be determined experimentally to have a desired mode pattern. It should be noted however, that similar effects can be found for a hollow dielectric or insulator without an inner conductor or conductive shield. In this case, the cutoff frequency can vary based on the dimensions and properties of the hollow dielectric or insulator.

At frequencies lower than the cut-off frequency, the non-circular mode is difficult to induce in the transmission medium 125 and fails to propagate for all but trivial distances. As the frequency increases above the limited range of frequencies about the cut-off frequency, the non-circular mode shifts more and more inward of the insulating jacket 302. At frequencies much larger than the cut-off frequency, the field strength is no longer concentrated outside of the insulating jacket, but primarily inside of the insulating jacket 302. While the transmission medium 125 provides strong guidance to the electromagnetic wave and propagation is still possible, ranges are more limited by increased losses due to propagation within the insulating jacket 302—as opposed to the surrounding air.

Figure 4:
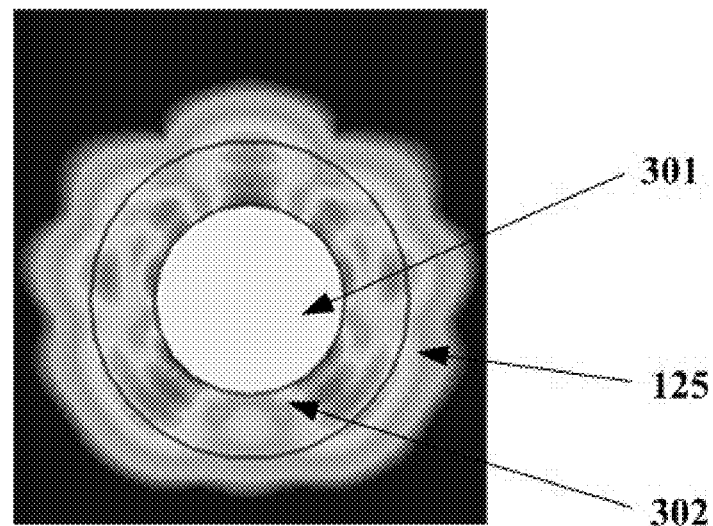
FIG. 4 is a graphical diagram illustrating an example, non-limiting embodiment of an electromagnetic field distribution in accordance with various aspects described herein.

Referring now to FIG. 4, a graphical diagram 400 illustrating an example, non-limiting embodiment of an electromagnetic field distribution is shown. In particular, a cross section diagram 400, similar to FIG. 3 is shown with common reference numerals used to refer to similar elements. The example shown corresponds to a 60 GHz wave guided by a wire with a diameter of 1.1 cm and a dielectric insulation of thickness of 0.36 cm. Because the frequency of the guided wave is above the limited range of the cut-off frequency of this particular non-fundamental mode, much of the field strength has shifted inward of the insulating jacket 302. In particular, the field strength is concentrated primarily inside of the insulating jacket 302. While the transmission medium 125 provides strong guidance to the electromagnetic wave and propagation is still possible, ranges are more limited when compared with the embodiment of FIG. 3, by increased losses due to propagation within the insulating jacket 302.

Figure 5A:
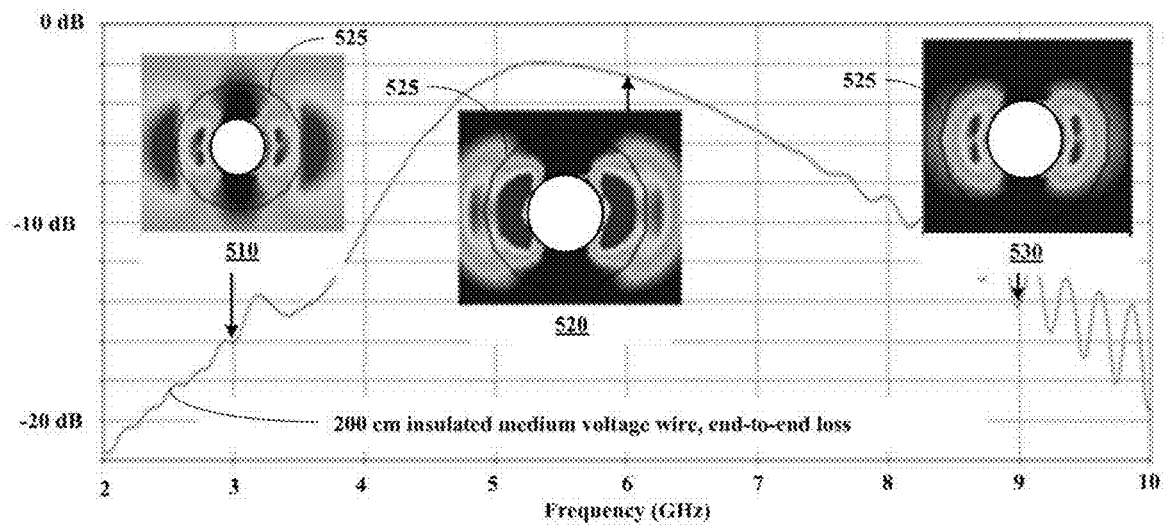
FIG. 5A is a graphical diagram illustrating an example, non-limiting embodiment of a frequency response in accordance with various aspects described herein.

Referring now to FIG. 5A, a graphical diagram illustrating an example, non-limiting embodiment of a frequency response is shown. In particular, diagram 500 presents a graph of end-to-end loss (in dB) as a function of frequency, overlaid with electromagnetic field distributions 510, 520 and 530 at three points for a 200 cm insulated medium voltage wire. The boundary between the insulator and the surrounding air is represented by reference numeral 525 in each electromagnetic field distribution.

As discussed in conjunction with FIG. 3, an example of a desired non-circular mode of propagation shown is induced on the transmission medium 125 by an electromagnetic wave having a frequency that falls within a limited range (such as Fc to 2Fc) of the lower cut-off frequency Fc of the transmission medium for this particular non-circular mode. In particular, the electromagnetic field distribution 520 at 6 GHz falls within this modal "sweet spot" that enhances electromagnetic wave propagation along an insulated transmission medium and reduces end-to-end transmission loss. In this particular mode, guided waves are partially embedded in the insulator and partially radiating on the outer surface of the insulator. In this fashion, the electromagnetic waves are "lightly" coupled to the insulator so as to enable guided electromagnetic wave propagation at long distances with low propagation loss.

At lower frequencies represented by the electromagnetic field distribution 510 at 3 GHz, the non-circular mode radiates more heavily generating higher propagation losses. At higher frequencies represented by the electromagnetic field distribution 530 at 9 GHz, the non-circular mode shifts more and more inward of the insulating jacket providing too much absorption, again generating higher propagation losses.

Figure 5B:
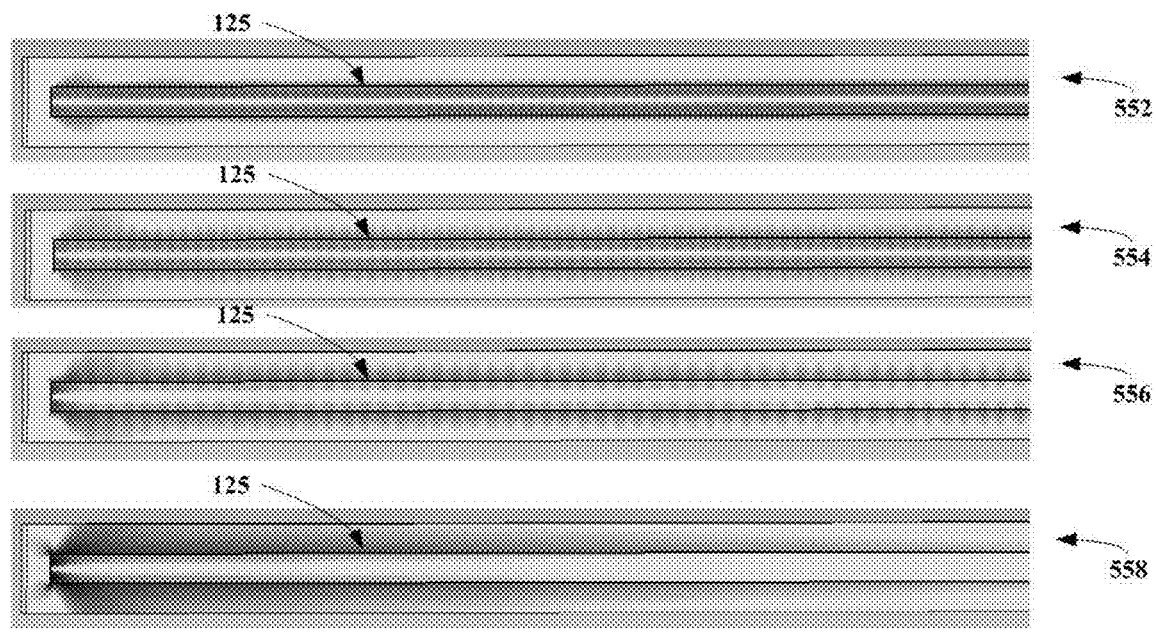
FIG. 5B is a graphical diagram illustrating example, non-limiting embodiments of a longitudinal cross-section of an insulated wire depicting fields of guided electromagnetic waves at various operating frequencies in accordance with various aspects described herein.

Referring now to FIG. 5B, a graphical diagram 550 illustrating example, non-limiting embodiments of a longitudinal cross-section of a transmission medium 125, such as an insulated wire, depicting fields of guided electromagnetic waves at various operating frequencies is shown. As shown in diagram 556, when the guided electromagnetic waves are at approximately the cutoff frequency ($f_c$) corresponding to the modal "sweet spot", the guided electromagnetic waves are loosely coupled to the insulated wire so that absorption is reduced, and the fields of the guided electromagnetic waves are bound sufficiently to reduce the amount radiated into the environment (e.g., air). Because absorption and radiation of the fields of the guided electromagnetic waves is low, propagation losses are consequently low, enabling the guided electromagnetic waves to propagate for longer distances.

As shown in diagram 554, propagation losses increase when an operating frequency of the guide electromagnetic waves increases above about two-times the cutoff frequency ($f_c$)—or as referred to, above the range of the "sweet spot". More of the field strength of the electromagnetic wave is driven inside the insulating layer, increasing propagation losses. At frequencies much higher than the cutoff frequency ($f_c$) the guided electromagnetic waves are strongly bound to the insulated wire as a result of the fields emitted by the guided electromagnetic waves being concentrated in the insulation layer of the wire, as shown in diagram 552. This in turn raises propagation losses further due to absorption of the guided electromagnetic waves by the insulation layer. Similarly, propagation losses increase when the operating frequency of the guided electromagnetic waves is substantially below the cutoff frequency ($f_c$), as shown in diagram 558. At frequencies much lower than the cutoff frequency ($f_c$) the guided electromagnetic waves are weakly (or nominally) bound to the insulated wire and thereby tend to radiate into the environment (e.g., air), which in turn, raises propagation losses due to radiation of the guided electromagnetic waves.

Figure 6:
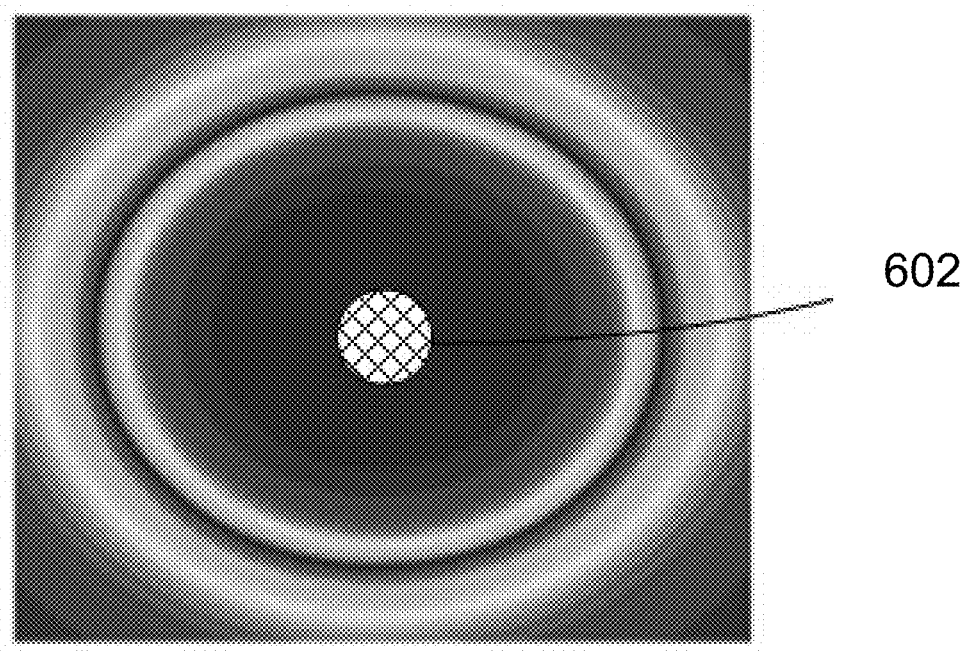
FIG. 6 is a graphical diagram illustrating an example, non-limiting embodiment of an electromagnetic field distribution in accordance with various aspects described herein.

Referring now to FIG. 6, a graphical diagram 600 illustrating an example, non-limiting embodiment of an electromagnetic field distribution is shown. In this embodiment, a transmission medium 602 is a bare wire, as shown in cross section. The diagram 600 includes different gray-scales that represent differing electromagnetic field strengths generated by the propagation of a guided wave having a symmetrical and fundamental TM00 guided wave mode at a single carrier frequency.

In this particular mode, electromagnetic waves are guided by the transmission medium 602 to propagate along an outer surface of the transmission medium—in this case, the outer surface of the bare wire. Electromagnetic waves are "lightly" coupled to the wire so as to enable electromagnetic wave propagation at long distances with low propagation loss. As shown, the guided wave has a field structure that lies substantially outside of the transmission medium 602 that serves to guide the electromagnetic waves. The regions inside the conductor of the transmission medium 602 have little or no field strength.

Figure 7:
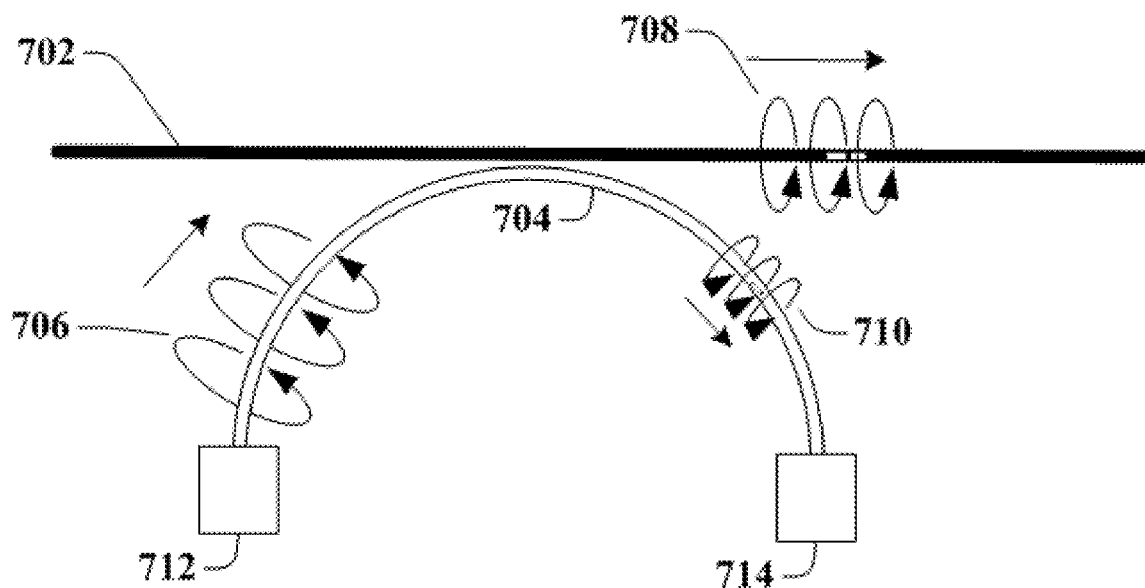
FIG. 7 is a block diagram illustrating an example, non-limiting embodiment of an arc coupler in accordance with various aspects described herein.

Referring now to FIG. 7, a block diagram 700 illustrating an example, non-limiting embodiment of an arc coupler is shown. In particular a coupling device is presented for use in a transmission device, such as transmission device 101 or 102 presented in conjunction with FIG. 1. The coupling device includes an arc coupler 704 coupled to a transmitter circuit 712 and termination or damper 714. The arc coupler 704 can be made of a dielectric material, or other low-loss insulator (e.g., Teflon, polyethylene, etc.), or made of a conducting (e.g., metallic, non-metallic, etc.) material, or any combination of the foregoing materials. As shown, the arc coupler 704 operates as a waveguide and has a wave 706 propagating as a guided wave, within and about a waveguide surface of the arc coupler 704. In the embodiment shown, at least a portion of the arc coupler 704 can be placed near a wire 702 or other transmission medium, (such as transmission medium 125), in order to facilitate coupling between the arc coupler 704 and the wire 702 or other transmission medium, as described herein to launch the guided wave 708 on the wire. The arc coupler 704 can be placed such that a portion of the curved arc coupler 704 is tangential to, and parallel or substantially parallel to the wire 702. The portion of the arc coupler 704 that is parallel to the wire can be an apex of the curve, or any point where a tangent of the curve is parallel to the wire 702. When the arc coupler 704 is positioned or placed thusly, the wave 706 travelling along the arc coupler 704 couples, at least in part, to the wire 702, and propagates as guided wave 708 around or about the wire surface of the wire 702 and longitudinally along the wire 702. The guided wave 708 can be characterized as a surface wave or other electromagnetic wave that is guided by or bound to the wire 702 or other transmission medium.

A portion of the wave 706 that does not couple to the wire 702 propagates as a wave 710 along the arc coupler 704. It will be appreciated that the arc coupler 704 can be configured and arranged in a variety of positions in relation to the wire 702 to achieve a desired level of coupling or non-coupling of the wave 706 to the wire 702. For example, the curvature and/or length of the arc coupler 704 that is parallel or substantially parallel, as well as its separation distance (which can include zero separation distance in an embodiment), to the wire 702 can be varied without departing from example embodiments. Likewise, the arrangement of arc coupler 704 in relation to the wire 702 may be varied based upon considerations of the respective intrinsic characteristics (e.g., thickness, composition, electromagnetic properties, etc.) of the wire 702 and the arc coupler 704, as well as the characteristics (e.g., frequency, energy level, etc.) of the waves 706 and 708.

The guided wave 708 stays parallel or substantially parallel to the wire 702, even as the wire 702 bends and flexes. Bends in the wire 702 can increase transmission losses, which are also dependent on wire diameters, frequency, and materials. If the dimensions of the arc coupler 704 are chosen for efficient power transfer, most of the power in the wave 706 is transferred to the wire 702, with little power remaining in wave 710. It will be appreciated that the guided wave 708 can still be multi-modal in nature (discussed herein), including having modes that are non-circular, non-fundamental and/or asymmetric, while traveling along a path that is parallel or substantially parallel to the wire 702, with or without a fundamental transmission mode. In an embodiment, non-circular, non-fundamental and/or asymmetric modes can be utilized to minimize transmission losses and/or obtain increased propagation distances.

It is noted that the term "parallel" is generally a geometric construct which often is not exactly achievable in real systems. Accordingly, the term "parallel" as utilized in the subject disclosure represents an approximation rather than an exact configuration when used to describe embodiments disclosed in the subject disclosure. In an embodiment, "substantially parallel" can include approximations that are within 30 degrees of true parallel in all dimensions.

In an embodiment, the wave 706 can exhibit one or more wave propagation modes. The arc coupler modes can be dependent on the shape and/or design of the coupler 704. The one or more arc coupler modes of wave 706 can generate, influence, or impact one or more wave propagation modes of the guided wave 708 propagating along wire 702. It should be particularly noted however that the guided wave modes present in the guided wave 706 may be the same or different from the guided wave modes of the guided wave 708. In this fashion, one or more guided wave modes of the guided wave 706 may not be transferred to the guided wave 708, and further one or more guided wave modes of guided wave 708 may not have been present in guided wave 706. It should also be noted that the cut-off frequency of the arc coupler 704 for a particular guided wave mode may be different than the cutoff frequency of the wire 702 or other transmission medium for that same mode. For example, while the wire 702 or other transmission medium may be operated slightly above its cutoff frequency for a particular guided wave mode, the arc coupler 704 may be operated well above its cut-off frequency for that same mode for low loss, slightly below its cut-off frequency for that same mode to, for example, induce greater coupling and power transfer, or some other point in relation to the arc coupler's cutoff frequency for that mode.

In an embodiment, the wave propagation modes on the wire 702 can be similar to the arc coupler modes since both waves 706 and 708 propagate about the outside of the arc coupler 704 and wire 702 respectively. In some embodiments, as the wave 706 couples to the wire 702, the modes can change form, or new modes can be created or generated, due to the coupling between the arc coupler 704 and the wire 702. For example, differences in size, material, and/or impedances of the arc coupler 704 and wire 702 may create additional modes not present in the arc coupler modes and/or suppress some of the arc coupler modes. The wave propagation modes can comprise the fundamental transverse magnetic mode (TM00), where only small magnetic fields extend in the direction of propagation, and the electric field extends radially outwards and then longitudinally while the guided wave propagates along the wire. This guided wave mode can be donut shaped, where only a portion of the electromagnetic fields exist within the arc coupler 704 or wire 702.

While the waves 706 and 708 can comprise a fundamental TM mode, the waves 706 and 708, also or in the alternative, can comprise non-fundamental TM modes. While particular wave propagation modes are discussed above, other wave propagation modes in or along the coupler and/or along the wire are likewise possible such as transverse electric (TE) and hybrid (EH or HE) modes, based on the frequencies employed, the design of the arc coupler 704, the dimensions and composition of the wire 702, as well as its surface characteristics, its insulation if present, the electromagnetic properties of the surrounding environment, etc. It should be noted that, depending on the frequency, the electrical and physical characteristics of the wire 702 and the particular wave propagation modes that are generated, guided wave 708 can travel along the conductive surface of an oxidized uninsulated wire, an unoxidized uninsulated wire, an insulated wire and/or along the insulating surface of an insulated wire.

In an embodiment, a diameter of the arc coupler 704 is smaller than the diameter of the wire 702. For the millimeter-band wavelength being used, the arc coupler 704 supports a single waveguide mode that makes up wave 706. This single waveguide mode can change as it couples to the wire 702 as guided wave 708. If the arc coupler 704 were larger, more than one waveguide mode can be supported, but these additional waveguide modes may not couple to the wire 702 as efficiently, and higher coupling losses can result. However, in some alternative embodiments, the diameter of the arc coupler 704 can be equal to or larger than the diameter of the wire 702, for example, where higher coupling losses are desirable or when used in conjunction with other techniques to otherwise reduce coupling losses (e.g., impedance matching with tapering, etc.).

In an embodiment, the wavelength of the waves 706 and 708 are comparable in size, or smaller than a circumference of the arc coupler 704 and the wire 702. In an example, if the wire 702 has a diameter of 0.5 cm, and a corresponding circumference of around 1.5 cm, the wavelength of the transmission is around 1.5 cm or less, corresponding to a frequency of 70 GHz or greater. In another embodiment, a suitable frequency of the transmission and the carrier-wave signal is in the range of 30-100 GHz, perhaps around 30-60 GHz, and around 38 GHz in one example. In an embodiment, when the circumference of the arc coupler 704 and wire 702 is comparable in size to, or greater, than a wavelength of the transmission, the waves 706 and 708 can exhibit multiple wave propagation modes including fundamental and/or non-fundamental (symmetric and/or asymmetric, circular and/or non-circular) modes that propagate over sufficient distances to support various communication systems described herein. The waves 706 and 708 can therefore comprise more than one type of electric and magnetic field configuration. In an embodiment, as the guided wave 708 propagates down the wire 702, the electrical and magnetic field configurations will remain the same from end to end of the wire 702. In other embodiments, as the guided wave 708 encounters interference (distortion or obstructions) or loses energy due to transmission losses or scattering, the electric and magnetic field configurations can change as the guided wave 708 propagates down wire 702.

In an embodiment, the arc coupler 704 can be composed of nylon, Teflon, polyethylene, a polyamide, or other plastics. In other embodiments, other dielectric materials can be employed. The wire surface of wire 702 can be metallic with either a bare metallic surface, or can be insulated using plastic, dielectric, insulator or other coating, jacket or sheathing. In an embodiment, a dielectric or otherwise non-conducting/insulated waveguide can be paired with either a bare/metallic wire or insulated wire. In other embodiments, a metallic and/or conductive waveguide can be paired with a bare/metallic wire or insulated wire. In an embodiment, an oxidation layer on the bare metallic surface of the wire 702 (e.g., resulting from exposure of the bare metallic surface to oxygen/air) can also provide insulating or dielectric properties similar to those provided by some insulators or sheathings.

It is noted that the graphical representations of waves 706, 708 and 710 are presented merely to illustrate the principles that wave 706 induces or otherwise launches a guided wave 708 on a wire 702 that operates, for example, as a single wire transmission line. Wave 710 represents the portion of wave 706 that remains on the arc coupler 704 after the generation of guided wave 708. The actual electric and magnetic fields generated as a result of such wave propagation may vary depending on the frequencies employed, the particular wave propagation mode or modes, the design of the arc coupler 704, the dimensions and composition of the wire 702, as well as its surface characteristics, its optional insulation, the electromagnetic properties of the surrounding environment, etc.

It is noted that arc coupler 704 can include a termination circuit or damper 714 at the end of the arc coupler 704 that can absorb leftover radiation or energy from wave 710. The termination circuit or damper 714 can prevent and/or minimize the leftover radiation or energy from wave 710 reflecting back toward transmitter circuit 712. In an embodiment, the termination circuit or damper 714 can include termination resistors, absorbing materials and/or other components that perform impedance matching to attenuate reflection. In some embodiments, if the coupling efficiencies are high enough, and/or wave 710 is sufficiently small, it may not be necessary to use a termination circuit or damper 714. For the sake of simplicity, these transmitter 712 and termination circuits or dampers 714 may not be depicted in the other figures, but in those embodiments, transmitter and termination circuits or dampers may possibly be used.

Further, while a single arc coupler 704 is presented that generates a single guided wave 708, multiple arc couplers 704 placed at different points along the wire 702 and/or at different azimuthal orientations about the wire can be employed to generate and receive multiple guided waves 708 at the same or different frequencies, at the same or different phases, at the same or different wave propagation modes.

Figure 8:
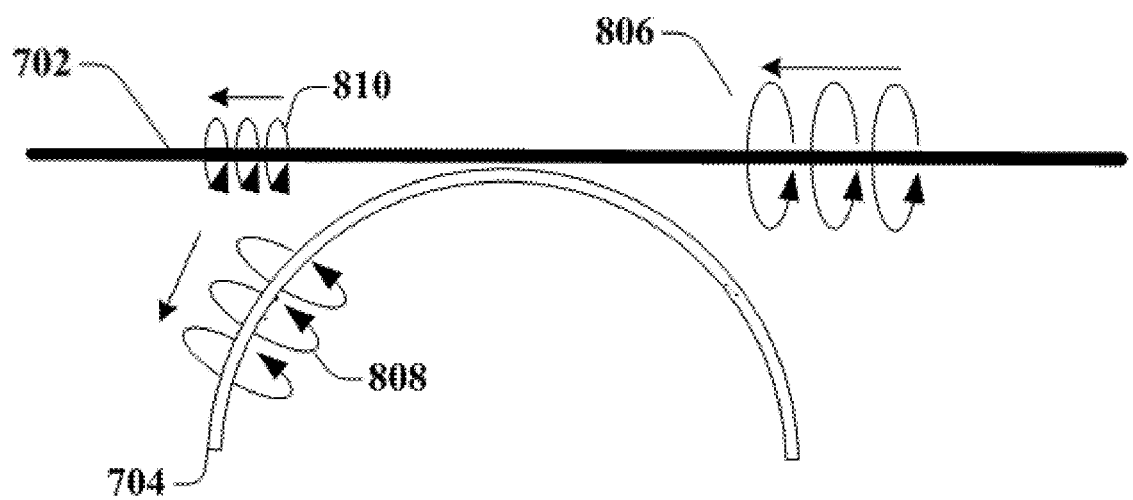
FIG. 8 is a block diagram illustrating an example, non-limiting embodiment of an arc coupler in accordance with various aspects described herein.

FIG. 8, a block diagram 800 illustrating an example, non-limiting embodiment of an arc coupler is shown. In the embodiment shown, at least a portion of the coupler 704 can be placed near a wire 702 or other transmission medium, (such as transmission medium 125), in order to facilitate coupling between the arc coupler 704 and the wire 702 or other transmission medium, to extract a portion of the guided wave 806 as a guided wave 808 as described herein. The arc coupler 704 can be placed such that a portion of the curved arc coupler 704 is tangential to, and parallel or substantially parallel to the wire 702. The portion of the arc coupler 704 that is parallel to the wire can be an apex of the curve, or any point where a tangent of the curve is parallel to the wire 702. When the arc coupler 704 is positioned or placed thusly, the wave 806 travelling along the wire 702 couples, at least in part, to the arc coupler 704, and propagates as guided wave 808 along the arc coupler 704 to a receiving device (not expressly shown). A portion of the wave 806 that does not couple to the arc coupler propagates as wave 810 along the wire 702 or other transmission medium.

In an embodiment, the wave 806 can exhibit one or more wave propagation modes. The arc coupler modes can be dependent on the shape and/or design of the coupler 704. The one or more modes of guided wave 806 can generate, influence, or impact one or more guide-wave modes of the guided wave 808 propagating along the arc coupler 704. It should be particularly noted however that the guided wave modes present in the guided wave 806 may be the same or different from the guided wave modes of the guided wave 808. In this fashion, one or more guided wave modes of the guided wave 806 may not be transferred to the guided wave 808, and further one or more guided wave modes of guided wave 808 may not have been present in guided wave 806.

Figure 9A:
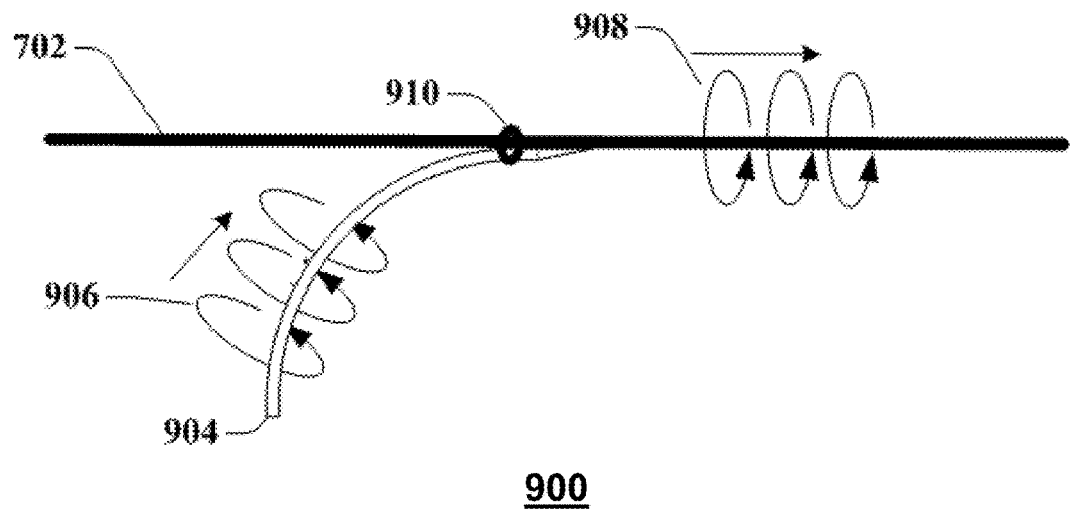
FIG. 9A is a block diagram illustrating an example, non-limiting embodiment of a stub coupler in accordance with various aspects described herein.

Referring now to FIG. 9A, a block diagram 900 illustrating an example, non-limiting embodiment of a stub coupler is shown. In particular a coupling device that includes stub coupler 904 is presented for use in a transmission device, such as transmission device 101 or 102 presented in conjunction with FIG. 1. The stub coupler 904 can be made of a dielectric material, or other low-loss insulator (e.g., Teflon, polyethylene and etc.), or made of a conducting (e.g., metallic, non-metallic, etc.) material, or any combination of the foregoing materials. As shown, the stub coupler 904 operates as a waveguide and has a wave 906 propagating as a guided wave within and about a waveguide surface of the stub coupler 904. In the embodiment shown, at least a portion of the stub coupler 904 can be placed near a wire 702 or other transmission medium, (such as transmission medium 125), in order to facilitate coupling between the stub coupler 904 and the wire 702 or other transmission medium, as described herein to launch the guided wave 908 on the wire.

In an embodiment, the stub coupler 904 is curved, and an end of the stub coupler 904 can be tied, fastened, or otherwise mechanically coupled to a wire 702. When the end of the stub coupler 904 is fastened to the wire 702, the end of the stub coupler 904 is parallel or substantially parallel to the wire 702. Alternatively, another portion of the dielectric waveguide beyond an end can be fastened or coupled to wire 702 such that the fastened or coupled portion is parallel or substantially parallel to the wire 702. The fastener 910 can be a nylon cable tie or other type of non-conducting/dielectric material that is either separate from the stub coupler 904 or constructed as an integrated component of the stub coupler 904. The stub coupler 904 can be adjacent to the wire 702 without surrounding the wire 702.

Like the arc coupler 704 described in conjunction with FIG. 7, when the stub coupler 904 is placed with the end parallel to the wire 702, the guided wave 906 travelling along the stub coupler 904 couples to the wire 702, and propagates as guided wave 908 about the wire surface of the wire 702. In an example embodiment, the guided wave 908 can be characterized as a surface wave or other electromagnetic wave.

It is noted that the graphical representations of waves 906 and 908 are presented merely to illustrate the principles that wave 906 induces or otherwise launches a guided wave 908 on a wire 702 that operates, for example, as a single wire transmission line. The actual electric and magnetic fields generated as a result of such wave propagation may vary depending on one or more of the shape and/or design of the coupler, the relative position of the dielectric waveguide to the wire, the frequencies employed, the design of the stub coupler 904, the dimensions and composition of the wire 702, as well as its surface characteristics, its optional insulation, the electromagnetic properties of the surrounding environment, etc.

In an embodiment, an end of stub coupler 904 can taper towards the wire 702 in order to increase coupling efficiencies. Indeed, the tapering of the end of the stub coupler 904 can provide impedance matching to the wire 702 and reduce reflections, according to an example embodiment of the subject disclosure. For example, an end of the stub coupler 904 can be gradually tapered in order to obtain a desired level of coupling between waves 906 and 908 as illustrated in FIG. 9A.

In an embodiment, the fastener 910 can be placed such that there is a short length of the stub coupler 904 between the fastener 910 and an end of the stub coupler 904. Maximum coupling efficiencies are realized in this embodiment when the length of the end of the stub coupler 904 that is beyond the fastener 910 is at least several wavelengths long for whatever frequency is being transmitted.

Figure 9B:
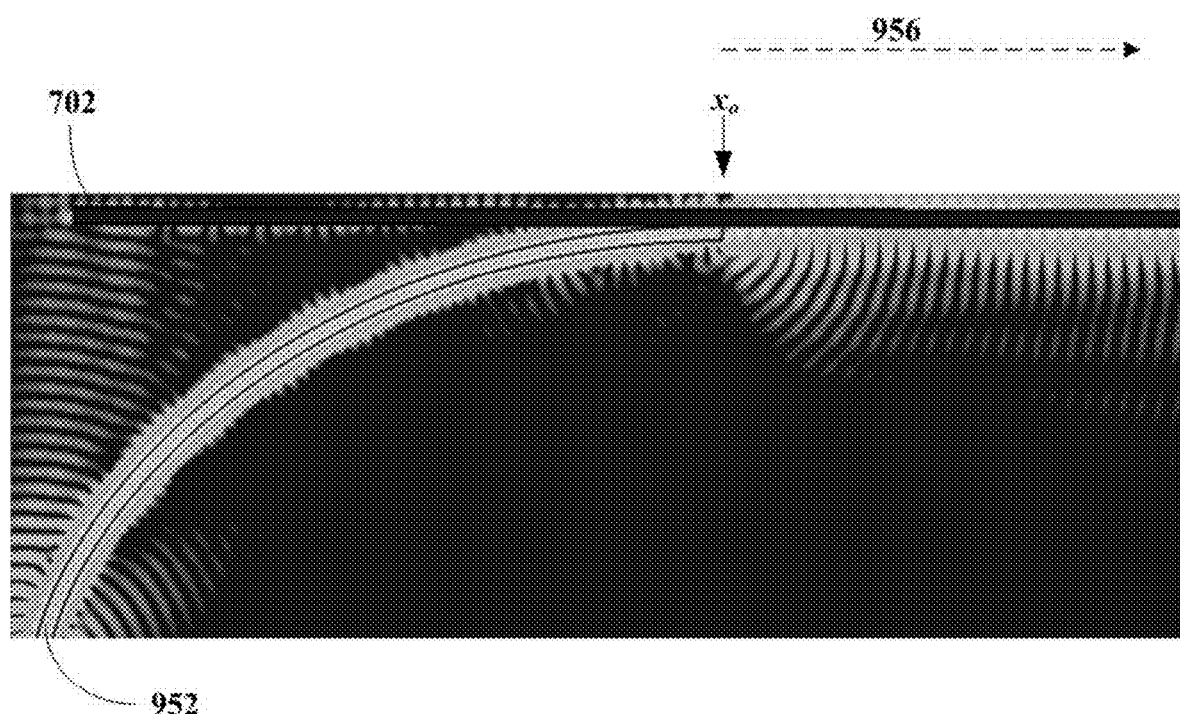
FIG. 9B is a diagram illustrating an example, non-limiting embodiment of an electromagnetic distribution in accordance with various aspects described herein.

Turning now to FIG. 9B, a diagram 950 illustrating an example, non-limiting embodiment of an electromagnetic distribution in accordance with various aspects described herein is shown. In particular, an electromagnetic distribution is presented in two dimensions for a transmission device that includes coupler 952, shown in an example stub coupler constructed of a dielectric material. The coupler 952 couples an electromagnetic wave for propagation as a guided wave along an outer surface of a wire 702 or other transmission medium.

The coupler 952 guides the electromagnetic wave to a junction at $x_0$ via a symmetrical guided wave mode. While some of the energy of the electromagnetic wave that propagates along the coupler 952 is outside of the coupler 952, the majority of the energy of this electromagnetic wave is contained within the coupler 952. The junction at $x_0$ couples the electromagnetic wave to the wire 702 or other transmission medium at an azimuthal angle corresponding to the bottom of the transmission medium. This coupling induces an electromagnetic wave that is guided to propagate along the outer surface of the wire 702 or other transmission medium via at least one guided wave mode in direction 956. The majority of the energy of the guided electromagnetic wave is outside or, but in close proximity to the outer surface of the wire 702 or other transmission medium. In the example shown, the junction at $x_0$ forms an electromagnetic wave that propagates via both a fundamental TM00 mode and at least one non-fundamental mode, such as the first order mode presented in conjunction with FIG. 3, that skims the surface of the wire 702 or other transmission medium.

It is noted that the graphical representations of guided waves are presented merely to illustrate an example of guided wave coupling and propagation. The actual electric and magnetic fields generated as a result of such wave propagation may vary depending on the frequencies employed, the design and/or configuration of the coupler 952, the dimensions and composition of the wire 702 or other transmission medium, as well as its surface characteristics, its insulation if present, the electromagnetic properties of the surrounding environment, etc.

Figure 10:
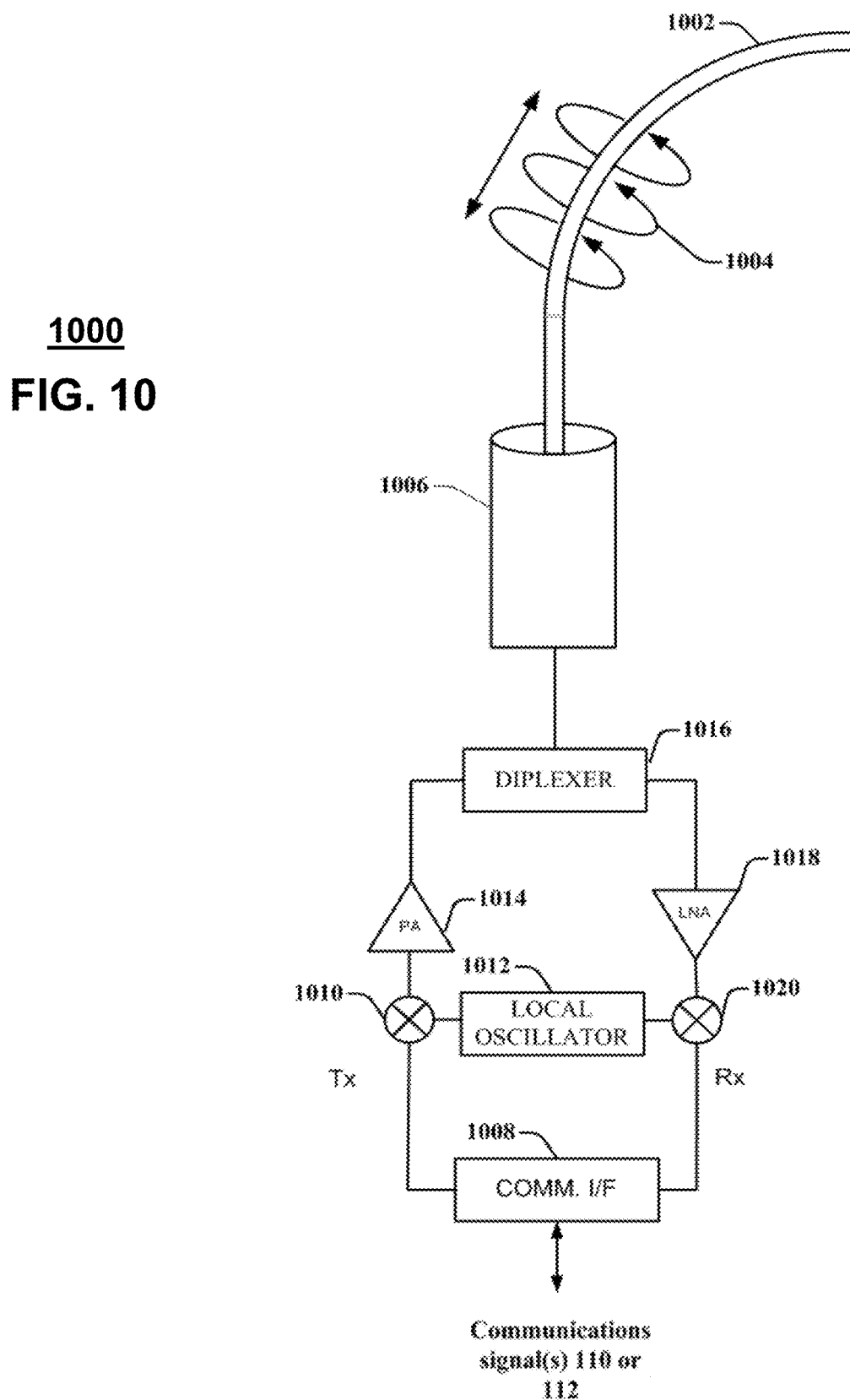
FIG. 10 is a block diagram illustrating an example, non-limiting embodiment of a coupler and transceiver in accordance with various aspects described herein.

Turning now to FIG. 10, illustrated is a block diagram 1000 of an example, non-limiting embodiment of a coupler and transceiver system in accordance with various aspects described herein. The system is an example of transmission device 101 or 102. In particular, the communications interface 1008 is an example of communications interface 205, the stub coupler 1002 is an example of coupler 220, and the transmitter/receiver device 1006, diplexer 1016, power amplifier 1014, low noise amplifier 1018, frequency mixers 1010 and 1020 and local oscillator 1012 collectively form an example of transceiver 210.

In operation, the transmitter/receiver device 1006 launches and receives waves (e.g., guided wave 1004 onto stub coupler 1002). The guided waves 1004 can be used to transport signals received from and sent to a host device, base station, mobile devices, a building or other device by way of a communications interface 1008. The communications interface 1008 can be an integral part of system 1000. Alternatively, the communications interface 1008 can be tethered to system 1000. The communications interface 1008 can comprise a wireless interface for interfacing to the host device, base station, mobile devices, a building or other device utilizing any of various present or future wireless signaling protocols (e.g., LTE, WiFi, WiMAX, IEEE 802.xx, 5G, etc.) including an infrared protocol such as an infrared data association (IrDA) protocol or other line of sight optical protocol. The communications interface 1008 can also comprise a wired interface such as a fiber optic line, coaxial cable, twisted pair, category 5 (CAT-5) cable or other suitable wired or optical mediums for communicating with the host device, base station, mobile devices, a building or other device via a protocol such as an Ethernet protocol, universal serial bus (USB) protocol, a data over cable service interface specification (DOCSIS) protocol, a digital subscriber line (DSL) protocol, a Firewire (IEEE 1394) protocol, or other wired or optical protocol. For embodiments where system 1000 functions as a repeater, the communications interface 1008 may not be necessary.

The output signals (e.g., Tx) of the communications interface 1008 can be combined with a carrier wave (e.g., millimeter-wave carrier wave) generated by a local oscillator 1012 at frequency mixer 1010. Frequency mixer 1010 can use heterodyning techniques or other frequency shifting techniques to frequency shift the output signals from communications interface 1008. For example, signals sent to and from the communications interface 1008 can be modulated signals such as orthogonal frequency division multiplexed (OFDM) signals formatted in accordance with a Long-Term Evolution (LTE) wireless protocol or other wireless 3G, 4G, 5G or higher voice and data protocol, a Zigbee®, WIMAX, UltraWideband or IEEE 802.11 wireless protocol; a wired protocol such as an Ethernet protocol, universal serial bus (USB) protocol, a data over cable service interface specification (DOCSIS) protocol, a digital subscriber line (DSL) protocol, a Firewire (IEEE 1394) protocol or other wired or wireless protocol. In an example embodiment, this frequency conversion can be done in the analog domain, and as a result, the frequency shifting can be done without regard to the type of communications protocol used by a base station, mobile devices, or in-building devices. As new communications technologies are developed, the communications interface 1008 can be upgraded (e.g., updated with software, firmware, and/or hardware) or replaced and the frequency shifting and transmission apparatus can remain, simplifying upgrades. The carrier wave can then be sent to a power amplifier ("PA") 1014 and can be transmitted via the transmitter receiver device 1006 via the diplexer 1016.

Signals received from the transmitter/receiver device 1006 that are directed towards the communications interface 1008 can be separated from other signals via diplexer 1016. The received signal can then be sent to low noise amplifier ("LNA") 1018 for amplification. A frequency mixer 1020, with help from local oscillator 1012 can downshift the received signal (which is in the millimeter-wave band or around 38 GHz in some embodiments) to the native frequency. The communications interface 1008 can then receive the transmission at an input port (Rx).

In an embodiment, transmitter/receiver device 1006 can include a cylindrical or non-cylindrical metal (which, for example, can be hollow in an embodiment, but not necessarily drawn to scale) or other conducting or non-conducting waveguide and an end of the stub coupler 1002 can be placed in or in proximity to the waveguide or the transmitter/ receiver device 1006 such that when the transmitter/receiver device 1006 generates a transmission, the guided wave couples to stub coupler 1002 and propagates as a guided wave 1004 about the waveguide surface of the stub coupler 1002. In some embodiments, the guided wave 1004 can propagate in part on the outer surface of the stub coupler 1002 and in part inside the stub coupler 1002. In other embodiments, the guided wave 1004 can propagate substantially or completely on the outer surface of the stub coupler 1002. In yet other embodiments, the guided wave 1004 can propagate substantially or completely inside the stub coupler 1002. In this latter embodiment, the guided wave 1004 can radiate at an end of the stub coupler 1002 (such as the tapered end shown in FIG. 4) for coupling to a transmission medium such as a wire 702 of FIG. 7. Similarly, if guided wave 1004 is incoming (coupled to the stub coupler 1002 from a wire 702), guided wave 1004 then enters the transmitter/receiver device 1006 and couples to the cylindrical waveguide or conducting waveguide. While transmitter/receiver device 1006 is shown to include a separate waveguide—an antenna, cavity resonator, klystron, magnetron, travelling wave tube, or other radiating element can be employed to induce a guided wave on the coupler 1002, with or without the separate waveguide.

In an embodiment, stub coupler 1002 can be wholly constructed of a dielectric material (or another suitable insulating material), without any metallic or otherwise conducting materials therein. Stub coupler 1002 can be composed of nylon, Teflon, polyethylene, a polyamide, other plastics, or other materials that are non-conducting and suitable for facilitating transmission of electromagnetic waves at least in part on an outer surface of such materials. In another embodiment, stub coupler 1002 can include a core that is conducting/metallic, and have an exterior dielectric surface. Similarly, a transmission medium that couples to the stub coupler 1002 for propagating electromagnetic waves induced by the stub coupler 1002 or for supplying electromagnetic waves to the stub coupler 1002 can, in addition to being a bare or insulated wire, be wholly constructed of a dielectric material (or another suitable insulating material), without any metallic or otherwise conducting materials therein.

It is noted that although FIG. 10 shows that the opening of transmitter receiver device 1006 is much wider than the stub coupler 1002, this is not to scale, and that in other embodiments the width of the stub coupler 1002 is comparable or slightly smaller than the opening of the hollow waveguide. It is also not shown, but in an embodiment, an end of the coupler 1002 that is inserted into the transmitter/receiver device 1006 tapers down in order to reduce reflection and increase coupling efficiencies. The stub coupler 1002 can be representative of the arch coupler 704 of FIGS. 7 and 8, the stub coupler 904 of FIG. 9A, the coupler 952, or any other couplers described in the subject disclosure.

Before coupling to the stub coupler 1002, the one or more waveguide modes of the guided wave generated by the transmitter/receiver device 1006 can couple to the stub coupler 1002 to induce one or more wave propagation modes of the guided wave 1004. The wave propagation modes of the guided wave 1004 can be different than the hollow metal waveguide modes due to the different characteristics of the hollow metal waveguide and the dielectric waveguide. For instance, wave propagation modes of the guided wave 1004 can comprise the fundamental transverse magnetic mode (TM$_{00}$), where only small magnetic fields extend in the direction of propagation, HE$_{11}$ or other modes supported by the stub coupler 1002 that generate one or more desired wave modes on the transmission medium. The fundamental transverse electromagnetic mode wave propagation mode may or may not exist inside a waveguide that is hollow. Therefore, the hollow metal waveguide modes that are used by transmitter/receiver device 1006 are waveguide modes, such as TE$_{01}$ or TE$_{11}$, that can propagate inside a circular, rectangular or other hollow metallic waveguide and couple effectively and efficiently to wave propagation modes of stub coupler 1002.

It will be appreciated that other constructs or combinations of the transmitter/receiver device 1006 and stub coupler 1002 are possible.

Figure 11:
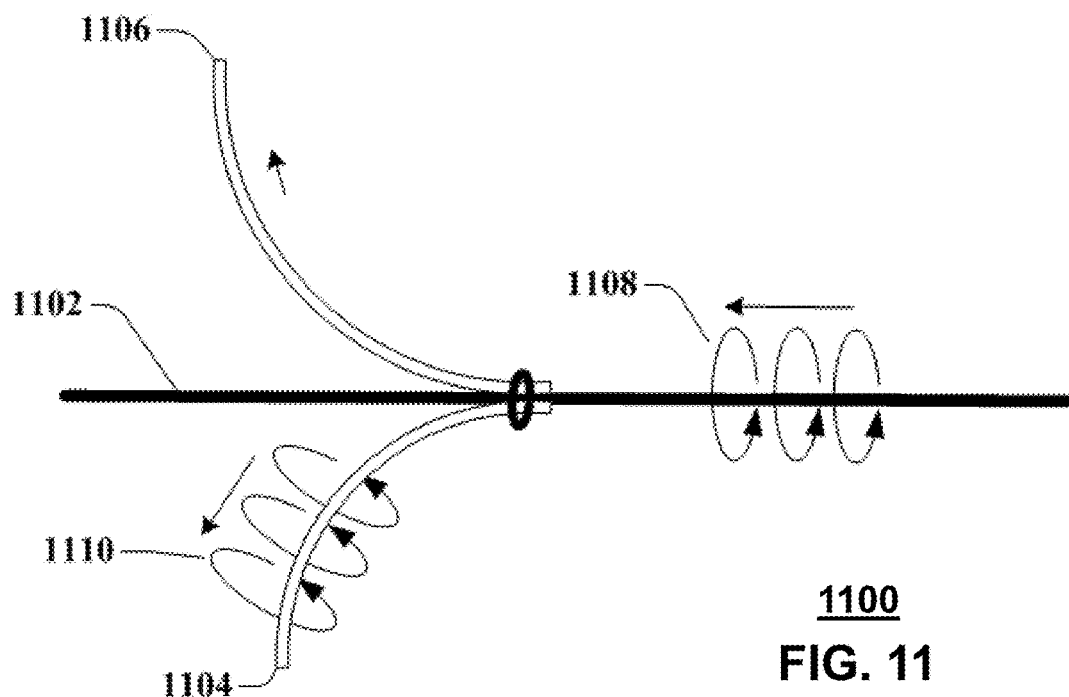
FIG. 11 is a block diagram illustrating an example, non-limiting embodiment of a dual stub coupler in accordance with various aspects described herein.

Referring now to FIG. 11, a block diagram 1100 illustrating an example, non-limiting embodiment of a dual stub coupler is shown. In particular, a dual coupler design is presented for use in a transmission device, such as transmission device 101 or 102 presented in conjunction with FIG. 1. In an embodiment, two or more couplers (such as the stub couplers 1104 and 1106) can be positioned around a wire 1102 in order to receive guided wave 1108. In an embodiment, one coupler is enough to receive the guided wave 1108. In that case, guided wave 1108 couples to coupler 1104 and propagates as guided wave 1110. If the field structure of the guided wave 1108 oscillates or undulates around the wire 1102 due to the particular guided wave mode(s) or various outside factors, then coupler 1106 can be placed such that guided wave 1108 couples to coupler 1106. In some embodiments, four or more couplers can be placed around a portion of the wire 1102, e.g., at 90 degrees or another spacing with respect to each other, in order to receive guided waves that may oscillate or rotate around the wire 1102, that have been induced at different azimuthal orientations or that have non-fundamental or higher order modes that, for example, have lobes and/or nulls or other asymmetries that are orientation dependent. However, it will be appreciated that there may be less than or more than four couplers placed around a portion of the wire 1102 without departing from example embodiments.

It should be noted that while couplers 1106 and 1104 are illustrated as stub couplers, any other of the coupler designs described herein including arc couplers, antenna or horn couplers, magnetic couplers, etc., could likewise be used. It will also be appreciated that while some example embodiments have presented a plurality of couplers around at least a portion of a wire 1102, this plurality of couplers can also be considered as part of a single coupler system having multiple coupler subcomponents. For example, two or more couplers can be manufactured as single system that can be installed around a wire in a single installation such that the couplers are either pre-positioned or adjustable relative to each other (either manually or automatically with a controllable mechanism such as a motor or other actuator) in accordance with the single system.

Receivers coupled to couplers 1106 and 1104 can use diversity combining to combine signals received from both couplers 1106 and 1104 in order to maximize the signal quality. In other embodiments, if one or the other of the couplers 1104 and 1106 receive a transmission that is above a predetermined threshold, receivers can use selection diversity when deciding which signal to use. Further, while reception by a plurality of couplers 1106 and 1104 is illustrated, transmission by couplers 1106 and 1104 in the same configuration can likewise take place. In particular, a wide range of multi-input multi-output (MIMO) transmission and reception techniques can be employed for transmissions where a transmission device, such as transmission device 101 or 102 presented in conjunction with FIG. 1 includes multiple transceivers and multiple couplers. For example, such MIMO transmission and reception techniques include precoding, spatial multiplexing, diversity coding and guided wave mode division multiplexing applied to transmission and reception by multiple couplers/launchers that operate on a transmission medium with one or more surfaces that support guided wave communications.

It is noted that the graphical representations of waves 1108 and 1110 are presented merely to illustrate the principles that guided wave 1108 induces or otherwise launches a wave 1110 on a coupler 1104. The actual electric and magnetic fields generated as a result of such wave propagation may vary depending on the frequencies employed, the design of the coupler 1104, the dimensions and composition of the wire 1102, as well as its surface characteristics, its insulation if any, the electromagnetic properties of the surrounding environment, etc.

Figure 12:
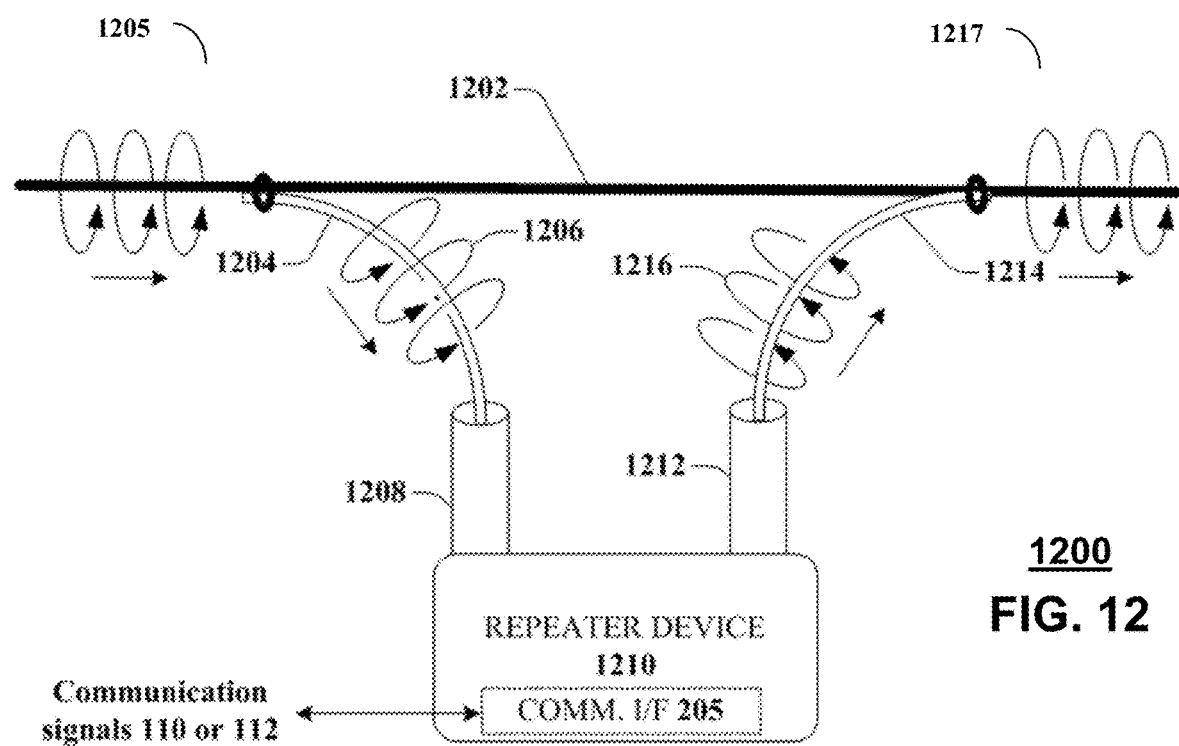
FIG. 12 is a block diagram illustrating an example, non-limiting embodiment of a repeater system in accordance with various aspects described herein.

Referring now to FIG. 12, a block diagram 1200 illustrating an example, non-limiting embodiment of a repeater system is shown. In particular, a repeater device 1210 is presented for use in a transmission device, such as transmission device 101 or 102 presented in conjunction with FIG. 1. In this system, two couplers 1204 and 1214 can be placed near a wire 1202 or other transmission medium such that guided waves 1205 propagating along the wire 1202 are extracted by coupler 1204 as wave 1206 (e.g. as a guided wave), and then are boosted or repeated by repeater device 1210 and launched as a wave 1216 (e.g. as a guided wave) onto coupler 1214. The wave 1216 can then be launched on the wire 1202 and continue to propagate along the wire 1202 as a guided wave 1217. In an embodiment, the repeater device 1210 can receive at least a portion of the power utilized for boosting or repeating through magnetic coupling with the wire 1202, for example, when the wire 1202 is a power line or otherwise contains a power-carrying conductor. It should be noted that while couplers 1204 and 1214 are illustrated as stub couplers, any other of the coupler designs described herein including arc couplers, antenna or horn couplers, magnetic couplers, or the like, could likewise be used.

In some embodiments, repeater device 1210 can repeat the transmission associated with wave 1206, and in other embodiments, repeater device 1210 can include a communications interface 205 that extracts data or other signals from the wave 1206 for supplying such data or signals to another network and/or one or more other devices as communication signals 110 or 112 and/or receiving communication signals 110 or 112 from another network and/or one or more other devices and launch guided wave 1216 having embedded therein the received communication signals 110 or 112. In a repeater configuration, receiver waveguide 1208 can receive the wave 1206 from the coupler 1204 and transmitter waveguide 1212 can launch guided wave 1216 onto coupler 1214 as guided wave 1217. Between receiver waveguide 1208 and transmitter waveguide 1212, the signal embedded in guided wave 1206 and/or the guided wave 1216 itself can be amplified to correct for signal loss and other inefficiencies associated with guided wave communications or the signal can be received and processed to extract the data contained therein and regenerated for transmission. In an embodiment, the receiver waveguide 1208 can be configured to extract data from the signal, process the data to correct for data errors utilizing for example error correcting codes, and regenerate an updated signal with the corrected data. The transmitter waveguide 1212 can then transmit guided wave 1216 with the updated signal embedded therein. In an embodiment, a signal embedded in guided wave 1206 can be extracted from the transmission and processed for communication with another network and/or one or more other devices via communications interface 205 as communication signals 110 or 112. Similarly, communication signals 110 or 112 received by the communications interface 205 can be inserted into a transmission of guided wave 1216 that is generated and launched onto coupler 1214 by transmitter waveguide 1212.

It is noted that although FIG. 12 shows guided wave transmissions 1206 and 1216 entering from the left and exiting to the right respectively, this is merely a simplification and is not intended to be limiting. In other embodiments, receiver waveguide 1208 and transmitter waveguide 1212 can also function as transmitters and receivers respectively, allowing the repeater device 1210 to be bi-directional.

In an embodiment, repeater device 1210 can be placed at locations where there are discontinuities or obstacles on the wire 1202 or other transmission medium. In the case where the wire 1202 is a power line, these obstacles can include transformers, connections, utility poles, and other such power line devices. The repeater device 1210 can help the guided (e.g., surface) waves jump over these obstacles on the line and boost the transmission power at the same time. In other embodiments, a coupler can be used to jump over the obstacle without the use of a repeater device. In that embodiment, both ends of the coupler can be tied or fastened to the wire, thus providing a path for the guided wave to travel without being blocked by the obstacle.

Figure 13:
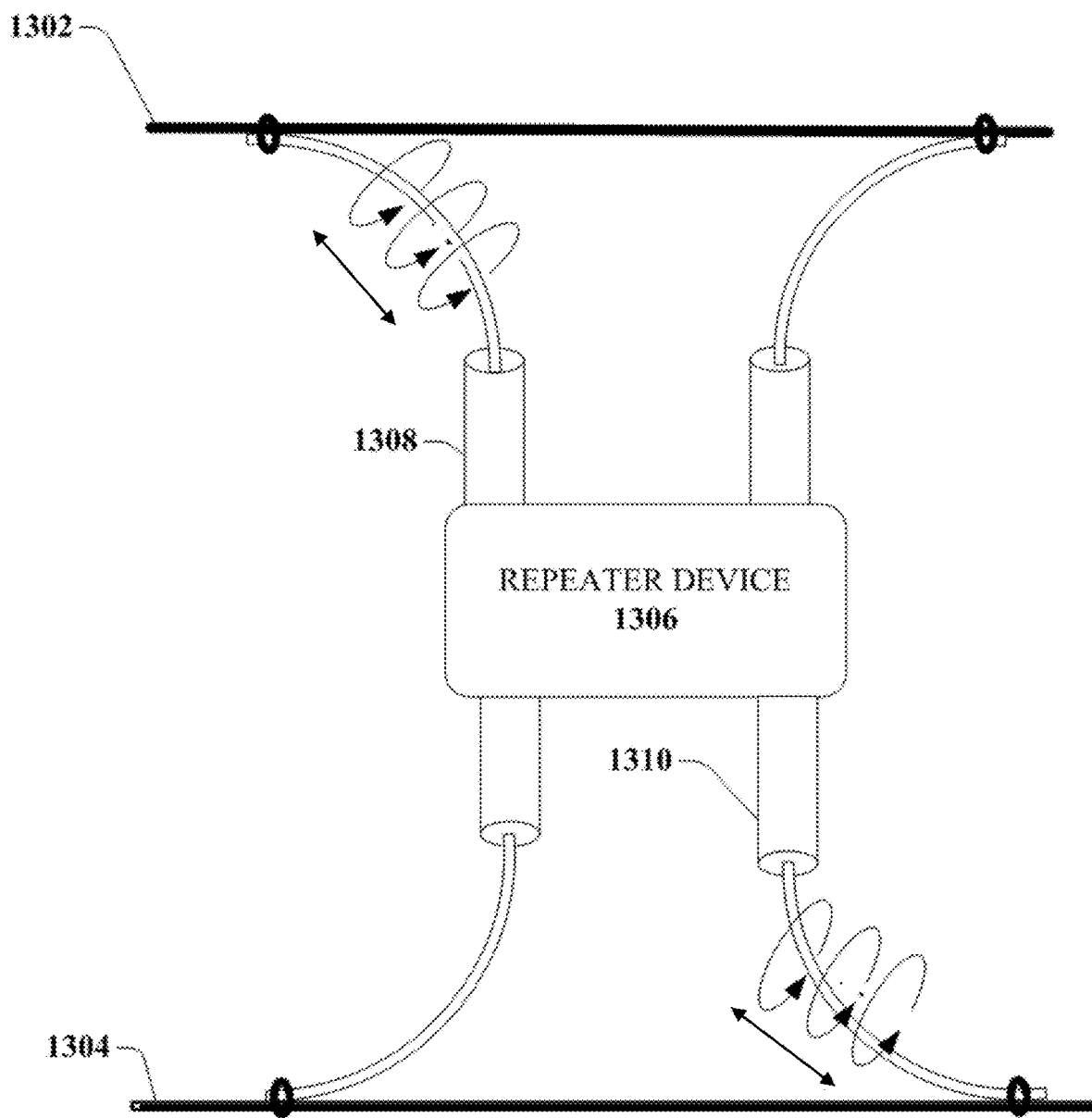
FIG. 13 illustrates a block diagram illustrating an example, non-limiting embodiment of a bidirectional repeater in accordance with various aspects described herein.

Turning now to FIG. 13, illustrated is a block diagram 1300 of an example, non-limiting embodiment of a bidirectional repeater in accordance with various aspects described herein. In particular, a bidirectional repeater device 1306 is presented for use in a transmission device, such as transmission device 101 or 102 presented in conjunction with FIG. 1. It should be noted that while the couplers are illustrated as stub couplers, any other of the coupler designs described herein including arc couplers, antenna or horn couplers, magnetic couplers, or the like, could likewise be used. The bidirectional repeater 1306 can employ diversity paths in the case of when two or more wires or other transmission media are present. Since guided wave transmissions have different transmission efficiencies and coupling efficiencies for transmission medium of different types such as insulated wires, un-insulated wires or other types of transmission media and further, if exposed to the elements, can be affected by weather, and other atmospheric conditions, it can be advantageous to selectively transmit on different transmission media at certain times. In various embodiments, the various transmission media can be designated as a primary, secondary, tertiary, etc. whether or not such designation indicates a preference of one transmission medium over another.

In the embodiment shown, the transmission media include an insulated or uninsulated wire 1302 and an insulated or uninsulated wire 1304 (referred to herein as wires 1302 and 1304, respectively). The repeater device 1306 uses a receiver coupler 1308 to receive a guided wave traveling along wire 1302 and repeats the transmission using transmitter waveguide 1310 as a guided wave along wire 1304. In other embodiments, repeater device 1306 can switch from the wire 1304 to the wire 1302, or can repeat the transmissions along the same paths. Repeater device 1306 can include sensors, or be in communication with sensors (or a network management system 1601 depicted in FIG. 16A) that indicate conditions that can affect the transmission. Based on the feedback received from the sensors, the repeater device 1306 can make the determination about whether to keep the transmission along the same wire, or transfer the transmission to the other wire.

Figure 14:
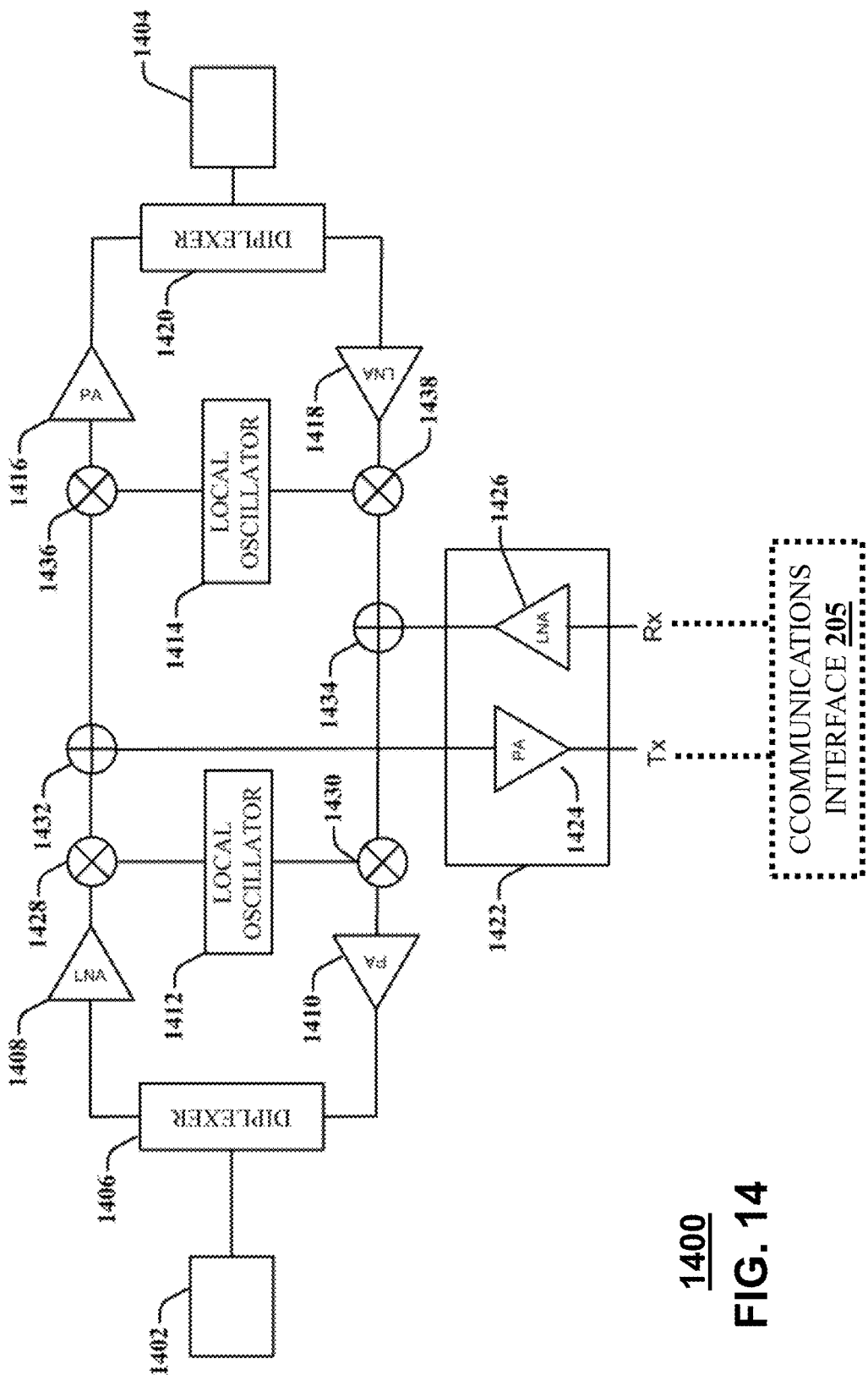
FIG. 14 is a block diagram illustrating an example, non-limiting embodiment of a waveguide system in accordance with various aspects described herein.

Turning now to FIG. 14, illustrated is a block diagram 1400 illustrating an example, non-limiting embodiment of a bidirectional repeater system. In particular, a bidirectional repeater system is presented for use in a transmission device, such as transmission device 101 or 102 presented in conjunction with FIG. 1. The bidirectional repeater system includes waveguide coupling devices 1402 and 1404 that receive and transmit transmissions from other coupling devices located in a distributed antenna system or backhaul system.

In various embodiments, waveguide coupling device 1402 can receive a transmission from another waveguide coupling device, wherein the transmission has a plurality of subcarriers. Diplexer 1406 can separate the transmission from other transmissions, and direct the transmission to low-noise amplifier ("LNA") 1408. A frequency mixer 1428, with help from a local oscillator 1412, can downshift the transmission (which is in the millimeter-wave band or around 38 GHz in some embodiments) to a lower frequency, such as a cellular band (~1.9 GHz) for a distributed antenna system, a native frequency, or other frequency for a backhaul system. An extractor (or demultiplexer) 1432 can extract the signal on a subcarrier and direct the signal to an output component 1422 for optional amplification, buffering or isolation by power amplifier 1424 for coupling to communications interface 205. The communications interface 205 can further process the signals received from the power amplifier 1424 or otherwise transmit such signals over a wireless or wired interface to other devices such as a base station, mobile devices, a building, etc. For the signals that are not being extracted at this location, extractor 1432 can redirect them to another frequency mixer 1436, where the signals are used to modulate a carrier wave generated by local oscillator 1414. The carrier wave, with its subcarriers, is directed to a power amplifier ("PA") 1416 and is retransmitted by waveguide coupling device 1404 to another system, via diplexer 1420.

An LNA 1426 can be used to amplify, buffer or isolate signals that are received by the communication interface 205 and then send the signal to a multiplexer 1434 which merges the signal with signals that have been received from waveguide coupling device 1404. The signals received from coupling device 1404 have been split by diplexer 1420, and then passed through LNA 1418, and downshifted in frequency by frequency mixer 1438. When the signals are combined by multiplexer 1434, they are upshifted in frequency by frequency mixer 1430, and then boosted by PA 1410, and transmitted to another system by waveguide coupling device 1402. In an embodiment bidirectional repeater system can be merely a repeater without the output device 1422. In this embodiment, the multiplexer 1434 would not be utilized and signals from LNA 1418 would be directed to mixer 1430 as previously described. It will be appreciated that in some embodiments, the bidirectional repeater system could also be implemented using two distinct and separate unidirectional repeaters. In an alternative embodiment, a bidirectional repeater system could also be a booster or otherwise perform retransmissions without downshifting and upshifting. Indeed in example embodiment, the retransmissions can be based upon receiving a signal or guided wave and performing some signal or guided wave processing or reshaping, filtering, and/or amplification, prior to retransmission of the signal or guided wave.

Figure 15:
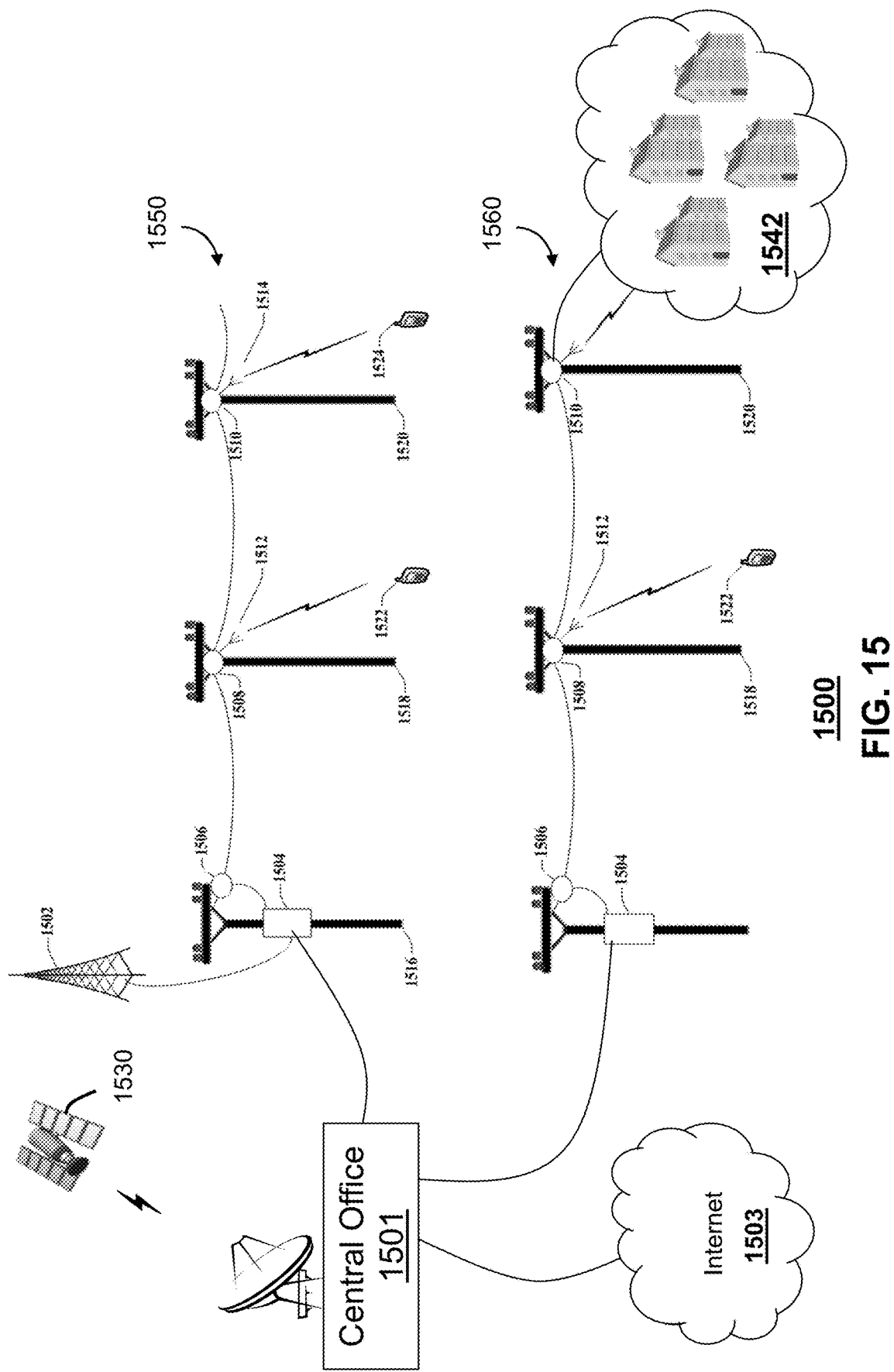
FIG. 15 is a block diagram illustrating an example, non-limiting embodiment of a guided-wave communications system in accordance with various aspects described herein.

Referring now to FIG. 15, a block diagram 1500 illustrating an example, non-limiting embodiment of a guided wave communications system is shown. This diagram depicts an exemplary environment in which a guided wave communication system, such as the guided wave communication system presented in conjunction with FIG. 1, can be used.

To provide network connectivity to additional base station devices, a backhaul network that links the communication cells (e.g., macrocells and macrocells) to network devices of a core network correspondingly expands. Similarly, to provide network connectivity to a distributed antenna system, an extended communication system that links base station devices and their distributed antennas is desirable. A guided wave communication system 1500 such as shown in FIG. 15 can be provided to enable alternative, increased or additional network connectivity and a waveguide coupling system can be provided to transmit and/or receive guided wave (e.g., surface wave) communications on a transmission medium such as a wire that operates as a single-wire transmission line (e.g., a utility line), and that can be used as a waveguide and/or that otherwise operates to guide the transmission of an electromagnetic wave.

The guided wave communication system 1500 can comprise a first instance of a distribution system 1550 that includes one or more base station devices (e.g., base station device 1504) that are communicably coupled to a central office 1501 and/or a macrocell site 1502. Base station device 1504 can be connected by a wired (e.g., fiber and/or cable), or by a wireless (e.g., microwave wireless) connection to the macrocell site 1502 and the central office 1501. A second instance of the distribution system 1560 can be used to provide wireless voice and data services to mobile device 1522 and to residential and/or commercial establishments 1542 (herein referred to as establishments 1542). System 1500 can have additional instances of the distribution systems 1550 and 1560 for providing voice and/or data services to mobile devices 1522-1524 and establishments 1542 as shown in FIG. 15.

Macrocells such as macrocell site 1502 can have dedicated connections to a mobile network and base station device 1504 or can share and/or otherwise use another connection. Central office 1501 can be used to distribute media content and/or provide internet service provider (ISP) services to mobile devices 1522-1524 and establishments 1542. The central office 1501 can receive media content from a constellation of satellites 1530 (one of which is shown in FIG. 15) or other sources of content, and distribute such content to mobile devices 1522-1524 and establishments 1542 via the first and second instances of the distribution system 1550 and 1560. The central office 1501 can also be communicatively coupled to the Internet 1503 for providing internet data services to mobile devices 1522-1524 and establishments 1542.

Base station device 1504 can be mounted on, or attached to, utility pole 1516. In other embodiments, base station device 1504 can be near transformers and/or other locations situated nearby a power line. Base station device 1504 can facilitate connectivity to a mobile network for mobile devices 1522 and 1524. Antennas 1512 and 1514, mounted on or near utility poles 1518 and 1520, respectively, can receive signals from base station device 1504 and transmit those signals to mobile devices 1522 and 1524 over a much wider area than if the antennas 1512 and 1514 were located at or near base station device 1504.

It is noted that FIG. 15 displays three utility poles, in each instance of the distribution systems 1550 and 1560, with one base station device, for purposes of simplicity. In other embodiments, utility pole 1516 can have more base station devices, and more utility poles with distributed antennas and/or tethered connections to establishments 1542.

A transmission device 1506, such as transmission device 101 or 102 presented in conjunction with FIG. 1, can transmit a signal from base station device 1504 to antennas 1512 and 1514 via utility or power line(s) that connect the utility poles 1516, 1518, and 1520. To transmit the signal, radio source and/or transmission device 1506 upconverts the signal (e.g., via frequency mixing) from base station device 1504 or otherwise converts the signal from the base station device 1504 to a microwave band signal and the transmission device 1506 launches a microwave band wave that propagates as a guided wave traveling along the utility line or other wire as described in previous embodiments. At utility pole 1518, another transmission device 1508 receives the guided wave (and optionally can amplify it as needed or desired or operate as a repeater to receive it and regenerate it) and sends it forward as a guided wave on the utility line or other wire. The transmission device 1508 can also extract a signal from the microwave band guided wave and shift it down in frequency or otherwise convert it to its original cellular band frequency (e.g., 1.9 GHz or other defined cellular frequency) or another cellular (or non-cellular) band frequency. An antenna 1512 can wireless transmit the downshifted signal to mobile device 1522. The process can be repeated by transmission device 1510, antenna 1514 and mobile device 1524, as necessary or desirable.

Transmissions from mobile devices 1522 and 1524 can also be received by antennas 1512 and 1514 respectively. The transmission devices 1508 and 1510 can upshift or otherwise convert the cellular band signals to microwave band and transmit the signals as guided wave (e.g., surface wave or other electromagnetic wave) transmissions over the power line(s) to base station device 1504.

Media content received by the central office 1501 can be supplied to the second instance of the distribution system 1560 via the base station device 1504 for distribution to mobile devices 1522 and establishments 1542. The transmission device 1510 can be tethered to the establishments 1542 by one or more wired connections or a wireless interface. The one or more wired connections may include without limitation, a power line, a coaxial cable, a fiber cable, a twisted pair cable, a guided wave transmission medium or other suitable wired mediums for distribution of media content and/or for providing internet services. In an example embodiment, the wired connections from the transmission device 1510 can be communicatively coupled to one or more very high bit rate digital subscriber line (VDSL) modems located at one or more corresponding service area interfaces (SAIs—not shown) or pedestals, each SAI or pedestal providing services to a portion of the establishments 1542. The VDSL modems can be used to selectively distribute media content and/or provide internet services to gateways (not shown) located in the establishments 1542. The SAIs or pedestals can also be communicatively coupled to the establishments 1542 over a wired medium such as a power line, a coaxial cable, a fiber cable, a twisted pair cable, a guided wave transmission medium or other suitable wired mediums. In other example embodiments, the transmission device 1510 can be communicatively coupled directly to establishments 1542 without intermediate interfaces such as the SAIs or pedestals.

In another example embodiment, system 1500 can employ diversity paths, where two or more utility lines or other wires are strung between the utility poles 1516, 1518, and 1520 (e.g., for example, two or more wires between poles 1516 and 1520) and redundant transmissions from base station/macrocell site 1502 are transmitted as guided waves down the surface of the utility lines or other wires. The utility lines or other wires can be either insulated or uninsulated, and depending on the environmental conditions that cause transmission losses, the coupling devices can selectively receive signals from the insulated or uninsulated utility lines or other wires. The selection can be based on measurements of the signal-to-noise ratio of the wires, or based on determined weather/environmental conditions (e.g., moisture detectors, weather forecasts, etc.). The use of diversity paths with system 1500 can enable alternate routing capabilities, load balancing, increased load handling, concurrent bi-directional or synchronous communications, spread spectrum communications, etc.

It is noted that the use of the transmission devices 1506, 1508, and 1510 in FIG. 15 are by way of example only, and that in other embodiments, other uses are possible. For instance, transmission devices can be used in a backhaul communication system, providing network connectivity to base station devices. Transmission devices 1506, 1508, and 1510 can be used in many circumstances where it is desirable to transmit guided wave communications over a wire, whether insulated or not insulated. Transmission devices 1506, 1508, and 1510 are improvements over other coupling devices due to no contact or limited physical and/or electrical contact with the wires that may carry high voltages. The transmission device can be located away from the wire (e.g., spaced apart from the wire) and/or located on the wire so long as it is not electrically in contact with the wire, as the dielectric acts as an insulator, allowing for cheap, easy, and/or less complex installation. However, as previously noted conducting or non-dielectric couplers can be employed, for example in configurations where the wires correspond to a telephone network, cable television network, broadband data service, fiber optic communications system or other network employing low voltages or having insulated transmission lines.

It is further noted, that while base station device 1504 and macrocell site 1502 are illustrated in an embodiment, other network configurations are likewise possible. For example, devices such as access points or other wireless gateways can be employed in a similar fashion to extend the reach of other networks such as a wireless local area network, a wireless personal area network or other wireless network that operates in accordance with a communication protocol such as a 802.11 protocol, WIMAX protocol, UltraWideband protocol, Bluetooth® protocol, Zigbee® protocol or other wireless protocol.

Figure 16A:
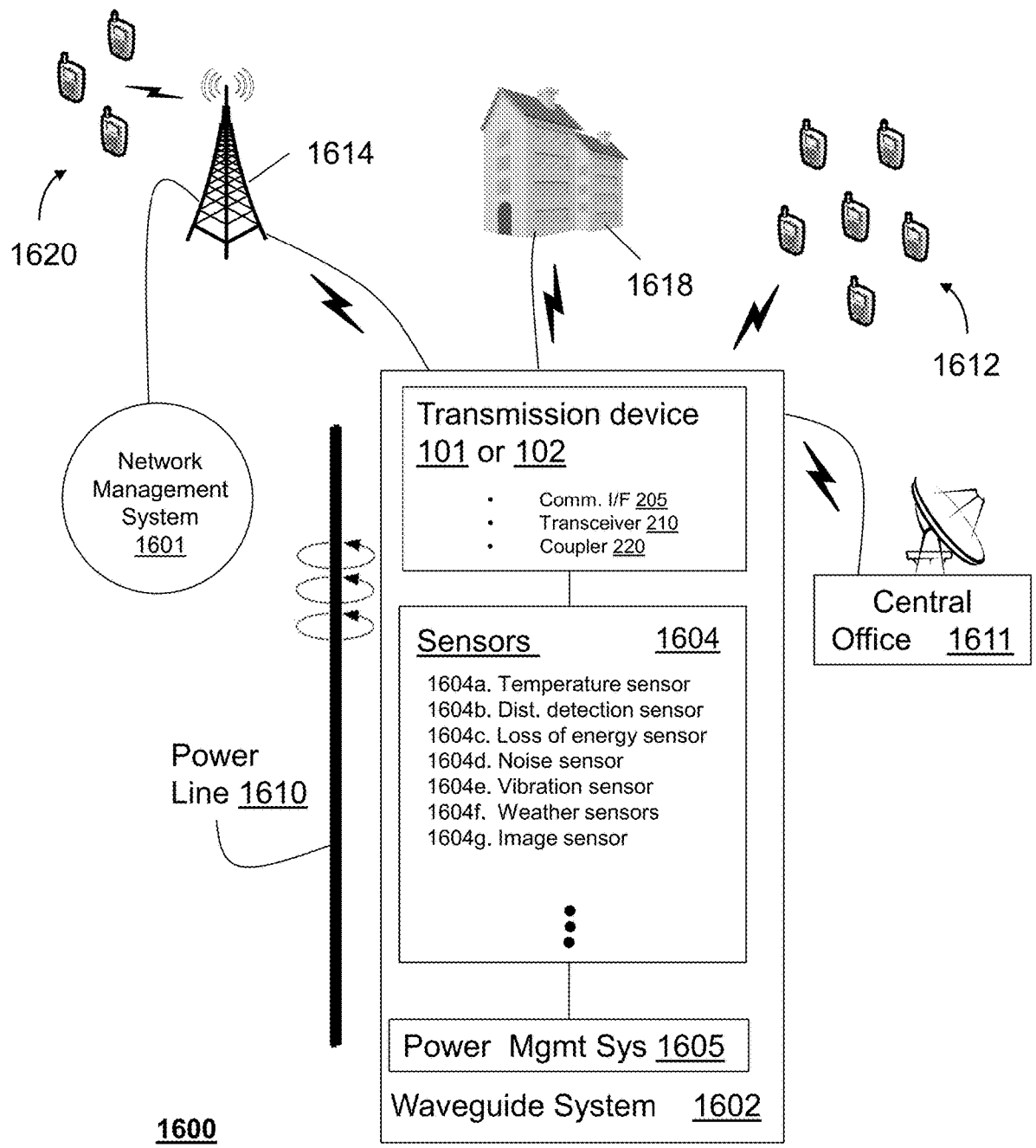
FIGS. 16A & 16B are block diagrams illustrating an example, non-limiting embodiment of a system for managing a power grid communication system in accordance with various aspects described herein.
Figure 16B:
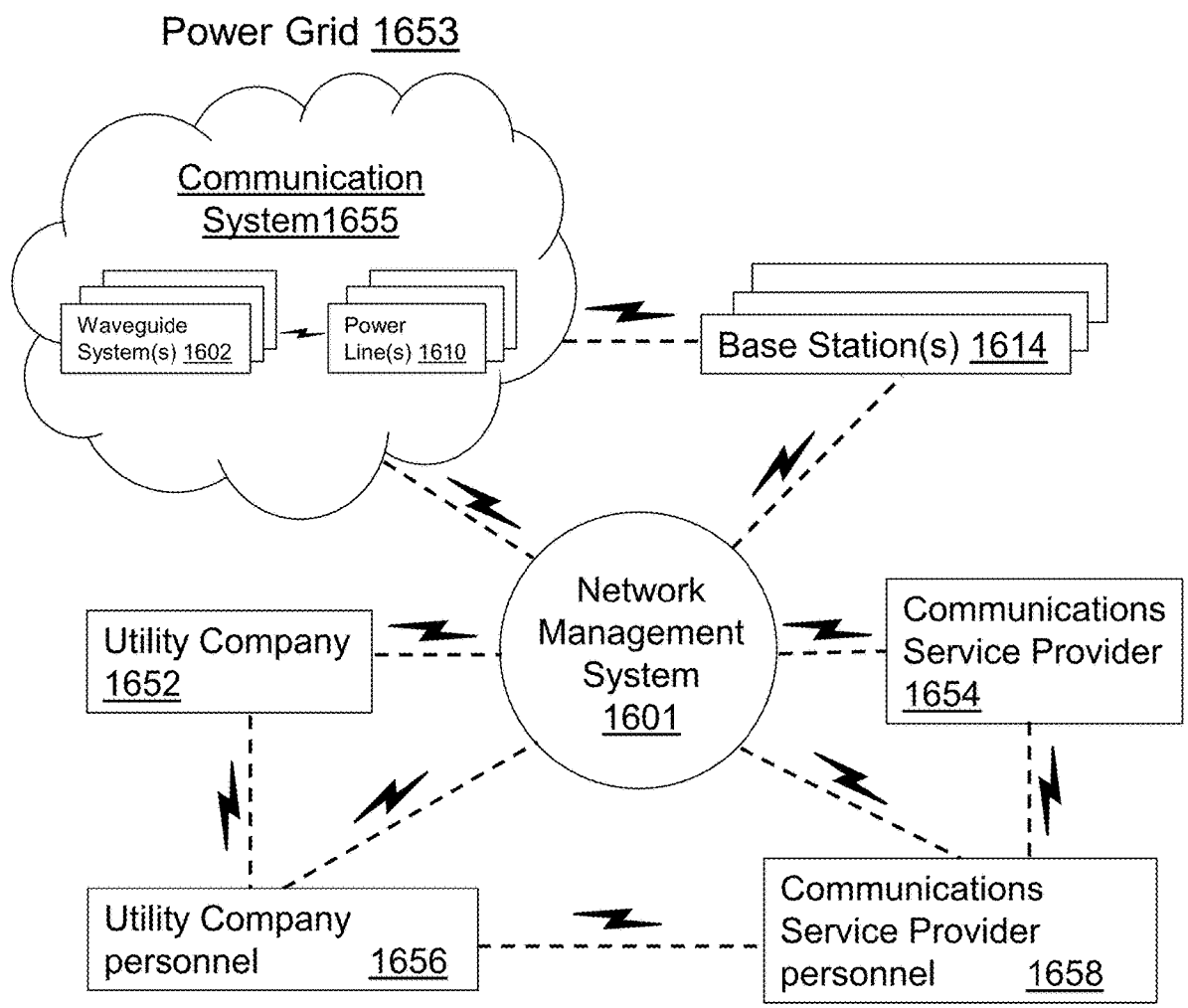

Referring now to FIGS. 16A & 16B, block diagrams illustrating an example, non-limiting embodiment of a system for managing a power grid communication system are shown. Considering FIG. 16A, a waveguide system 1602 is presented for use in a guided wave communications system 1600, such as the system presented in conjunction with FIG. 15. The waveguide system 1602 can comprise sensors 1604, a power management system 1605, a transmission device 101 or 102 that includes at least one communication interface 205, transceiver 210 and coupler 220.

The waveguide system 1602 can be coupled to a power line 1610 for facilitating guided wave communications in accordance with embodiments described in the subject disclosure. In an example embodiment, the transmission device 101 or 102 includes coupler 220 for inducing electromagnetic waves on a surface of the power line 1610 that longitudinally propagate along the surface of the power line 1610 as described in the subject disclosure. The transmission device 101 or 102 can also serve as a repeater for retransmitting electromagnetic waves on the same power line 1610 or for routing electromagnetic waves between power lines 1610 as shown in FIGS. 12-13.

The transmission device 101 or 102 includes transceiver 210 configured to, for example, up-convert a signal operating at an original frequency range to electromagnetic waves operating at, exhibiting, or associated with a carrier frequency that propagate along a coupler to induce corresponding guided electromagnetic waves that propagate along a surface of the power line 1610. A carrier frequency can be represented by a center frequency having upper and lower cutoff frequencies that define the bandwidth of the electromagnetic waves. The power line 1610 can be a wire (e.g., single stranded or multi-stranded) having a conducting surface or insulated surface. The transceiver 210 can also receive signals from the coupler 220 and down-convert the electromagnetic waves operating at a carrier frequency to signals at their original frequency.

Signals received by the communications interface 205 of transmission device 101 or 102 for up-conversion can include without limitation signals supplied by a central office 1611 over a wired or wireless interface of the communications interface 205, a base station 1614 over a wired or wireless interface of the communications interface 205, wireless signals transmitted by mobile devices 1620 to the base station 1614 for delivery over the wired or wireless interface of the communications interface 205, signals supplied by in-building communication devices 1618 over the wired or wireless interface of the communications interface 205, and/or wireless signals supplied to the communications interface 205 by mobile devices 1612 roaming in a wireless communication range of the communications interface 205. In embodiments where the waveguide system 1602 functions as a repeater, such as shown in FIGS. 12-13, the communications interface 205 may or may not be included in the waveguide system 1602.

The electromagnetic waves propagating along the surface of the power line 1610 can be modulated and formatted to include packets or frames of data that include a data payload and further include networking information (such as header information for identifying one or more destination waveguide systems 1602). The networking information may be provided by the waveguide system 1602 or an originating device such as the central office 1611, the base station 1614, mobile devices 1620, or in-building devices 1618, or a combination thereof. Additionally, the modulated electromagnetic waves can include error correction data for mitigating signal disturbances. The networking information and error correction data can be used by a destination waveguide system 1602 for detecting transmissions directed to it, and for down-converting and processing with error correction data transmissions that include voice and/or data signals directed to recipient communication devices communicatively coupled to the destination waveguide system 1602.

Referring now to the sensors 1604 of the waveguide system 1602, the sensors 1604 can comprise one or more of a temperature sensor 1604*a*, a disturbance detection sensor 1604*b*, a loss of energy sensor 1604*c*, a noise sensor 1604*d*, a vibration sensor 1604*e*, an environmental (e.g., weather) sensor 1604*f*, and/or an image sensor 1604*g*. The temperature sensor 1604*a* can be used to measure ambient temperature, a temperature of the transmission device 101 or 102, a temperature of the power line 1610, temperature differentials (e.g., compared to a setpoint or baseline, between transmission device 101 or 102 and 1610, etc.), or any combination thereof. In one embodiment, temperature metrics can be collected and reported periodically to a network management system 1601 by way of the base station 1614.

The disturbance detection sensor 1604*b* can perform measurements on the power line 1610 to detect disturbances such as signal reflections, which may indicate a presence of a downstream disturbance that may impede the propagation of electromagnetic waves on the power line 1610. A signal reflection can represent a distortion resulting from, for example, an electromagnetic wave transmitted on the power line 1610 by the transmission device 101 or 102 that reflects in whole or in part back to the transmission device 101 or 102 from a disturbance in the power line 1610 located downstream from the transmission device 101 or 102.

Signal reflections can be caused by obstructions on the power line 1610. For example, a tree limb may cause electromagnetic wave reflections when the tree limb is lying on the power line 1610, or is in close proximity to the power line 1610 which may cause a corona discharge. Other obstructions that can cause electromagnetic wave reflections can include without limitation an object that has been entangled on the power line 1610 (e.g., clothing, a shoe wrapped around a power line 1610 with a shoe string, etc.), a corroded build-up on the power line 1610 or an ice build-up. Power grid components may also impede or obstruct with the propagation of electromagnetic waves on the surface of power lines 1610. Illustrations of power grid components that may cause signal reflections include without limitation a transformer and a joint for connecting spliced power lines. A sharp angle on the power line 1610 may also cause electromagnetic wave reflections.

The disturbance detection sensor 1604*b* can comprise a circuit to compare magnitudes of electromagnetic wave reflections to magnitudes of original electromagnetic waves transmitted by the transmission device 101 or 102 to determine how much a downstream disturbance in the power line 1610 attenuates transmissions. The disturbance detection sensor 1604*b* can further comprise a spectral analyzer circuit for performing spectral analysis on the reflected waves. The spectral data generated by the spectral analyzer circuit can be compared with spectral profiles via pattern recognition, an expert system, curve fitting, matched filtering or other artificial intelligence, classification or comparison technique to identify a type of disturbance based on, for example, the spectral profile that most closely matches the spectral data. The spectral profiles can be stored in a memory of the disturbance detection sensor 1604*b* or may be remotely accessible by the disturbance detection sensor 1604*b*. The profiles can comprise spectral data that models different disturbances that may be encountered on power lines 1610 to enable the disturbance detection sensor 1604*b* to identify disturbances locally. An identification of the disturbance if known can be reported to the network management system 1601 by way of the base station 1614. The disturbance detection sensor 1604*b* can also utilize the transmission device 101 or 102 to transmit electromagnetic waves as test signals to determine a roundtrip time for an electromagnetic wave reflection. The round trip time measured by the disturbance detection sensor 1604*b* can be used to calculate a distance traveled by the electromagnetic wave up to a point where the reflection takes place, which enables the disturbance detection sensor 1604*b* to calculate a distance from the transmission device 101 or 102 to the downstream disturbance on the power line 1610.

The distance calculated can be reported to the network management system 1601 by way of the base station 1614. In one embodiment, the location of the waveguide system 1602 on the power line 1610 may be known to the network management system 1601, which the network management system 1601 can use to determine a location of the disturbance on the power line 1610 based on a known topology of the power grid. In another embodiment, the waveguide system 1602 can provide its location to the network management system 1601 to assist in the determination of the location of the disturbance on the power line 1610. The location of the waveguide system 1602 can be obtained by the waveguide system 1602 from a pre-programmed location of the waveguide system 1602 stored in a memory of the waveguide system 1602, or the waveguide system 1602 can determine its location using a GPS receiver (not shown) included in the waveguide system 1602.

The power management system 1605 provides energy to the aforementioned components of the waveguide system 1602. The power management system 1605 can receive energy from solar cells, or from a transformer (not shown) coupled to the power line 1610, or by inductive coupling to the power line 1610 or another nearby power line. The power management system 1605 can also include a backup battery and/or a super capacitor or other capacitor circuit for providing the waveguide system 1602 with temporary power. The loss of energy sensor 1604c can be used to detect when the waveguide system 1602 has a loss of power condition and/or the occurrence of some other malfunction. For example, the loss of energy sensor 1604c can detect when there is a loss of power due to defective solar cells, an obstruction on the solar cells that causes them to malfunction, loss of power on the power line 1610, and/or when the backup power system malfunctions due to expiration of a backup battery, or a detectable defect in a super capacitor. When a malfunction and/or loss of power occurs, the loss of energy sensor 1604c can notify the network management system 1601 by way of the base station 1614.

The noise sensor 1604d can be used to measure noise on the power line 1610 that may adversely affect transmission of electromagnetic waves on the power line 1610. The noise sensor 1604d can sense unexpected electromagnetic interference, noise bursts, or other sources of disturbances that may interrupt reception of modulated electromagnetic waves on a surface of a power line 1610. A noise burst can be caused by, for example, a corona discharge, or other source of noise. The noise sensor 1604d can compare the measured noise to a noise profile obtained by the waveguide system 1602 from an internal database of noise profiles or from a remotely located database that stores noise profiles via pattern recognition, an expert system, curve fitting, matched filtering or other artificial intelligence, classification or comparison technique. From the comparison, the noise sensor 1604d may identify a noise source (e.g., corona discharge or otherwise) based on, for example, the noise profile that provides the closest match to the measured noise. The noise sensor 1604d can also detect how noise affects transmissions by measuring transmission metrics such as bit error rate, packet loss rate, jitter, packet retransmission requests, etc. The noise sensor 1604d can report to the network management system 1601 by way of the base station 1614 the identity of noise sources, their time of occurrence, and transmission metrics, among other things.

The vibration sensor 1604e can include accelerometers and/or gyroscopes to detect 2D or 3D vibrations on the power line 1610. The vibrations can be compared to vibration profiles that can be stored locally in the waveguide system 1602, or obtained by the waveguide system 1602 from a remote database via pattern recognition, an expert system, curve fitting, matched filtering or other artificial intelligence, classification or comparison technique. Vibration profiles can be used, for example, to distinguish fallen trees from wind gusts based on, for example, the vibration profile that provides the closest match to the measured vibrations. The results of this analysis can be reported by the vibration sensor 1604e to the network management system 1601 by way of the base station 1614.

The environmental sensor 1604f can include a barometer for measuring atmospheric pressure, ambient temperature (which can be provided by the temperature sensor 1604a), wind speed, humidity, wind direction, and rainfall, among other things. The environmental sensor 1604f can collect raw information and process this information by comparing it to environmental profiles that can be obtained from a memory of the waveguide system 1602 or a remote database to predict weather conditions before they arise via pattern recognition, an expert system, knowledge-based system or other artificial intelligence, classification or other weather modeling and prediction technique. The environmental sensor 1604f can report raw data as well as its analysis to the network management system 1601.

The image sensor 1604g can be a digital camera (e.g., a charged coupled device or CCD imager, infrared camera, etc.) for capturing images in a vicinity of the waveguide system 1602. The image sensor 1604g can include an electromechanical mechanism to control movement (e.g., actual position or focal points/zooms) of the camera for inspecting the power line 1610 from multiple perspectives (e.g., top surface, bottom surface, left surface, right surface and so on). Alternatively, the image sensor 1604g can be designed such that no electromechanical mechanism is needed in order to obtain the multiple perspectives. The collection and retrieval of imaging data generated by the image sensor 1604g can be controlled by the network management system 1601, or can be autonomously collected and reported by the image sensor 1604g to the network management system 1601.

Other sensors that may be suitable for collecting telemetry information associated with the waveguide system 1602 and/or the power lines 1610 for purposes of detecting, predicting and/or mitigating disturbances that can impede the propagation of electromagnetic wave transmissions on power lines 1610 (or any other form of a transmission medium of electromagnetic waves) may be utilized by the waveguide system 1602.

Referring now to FIG. 16B, block diagram 1650 illustrates an example, non-limiting embodiment of a system for managing a power grid 1653 and a communication system 1655 embedded therein or associated therewith in accordance with various aspects described herein. The communication system 1655 comprises a plurality of waveguide systems 1602 coupled to power lines 1610 of the power grid 1653. At least a portion of the waveguide systems 1602 used in the communication system 1655 can be in direct communication with a base station 1614 and/or the network management system 1601. Waveguide systems 1602 not directly connected to a base station 1614 or the network management system 1601 can engage in communication sessions with either a base station 1614 or the network management system 1601 by way of other downstream waveguide systems 1602 connected to a base station 1614 or the network management system 1601.

The network management system 1601 can be communicatively coupled to equipment of a utility company 1652 and equipment of a communications service provider 1654 for providing each entity, status information associated with the power grid 1653 and the communication system 1655, respectively. The network management system 1601, the equipment of the utility company 1652, and the communications service provider 1654 can access communication devices utilized by utility company personnel 1656 and/or communication devices utilized by communications service provider personnel 1658 for purposes of providing status information and/or for directing such personnel in the management of the power grid 1653 and/or communication system 1655.

Figure 17:
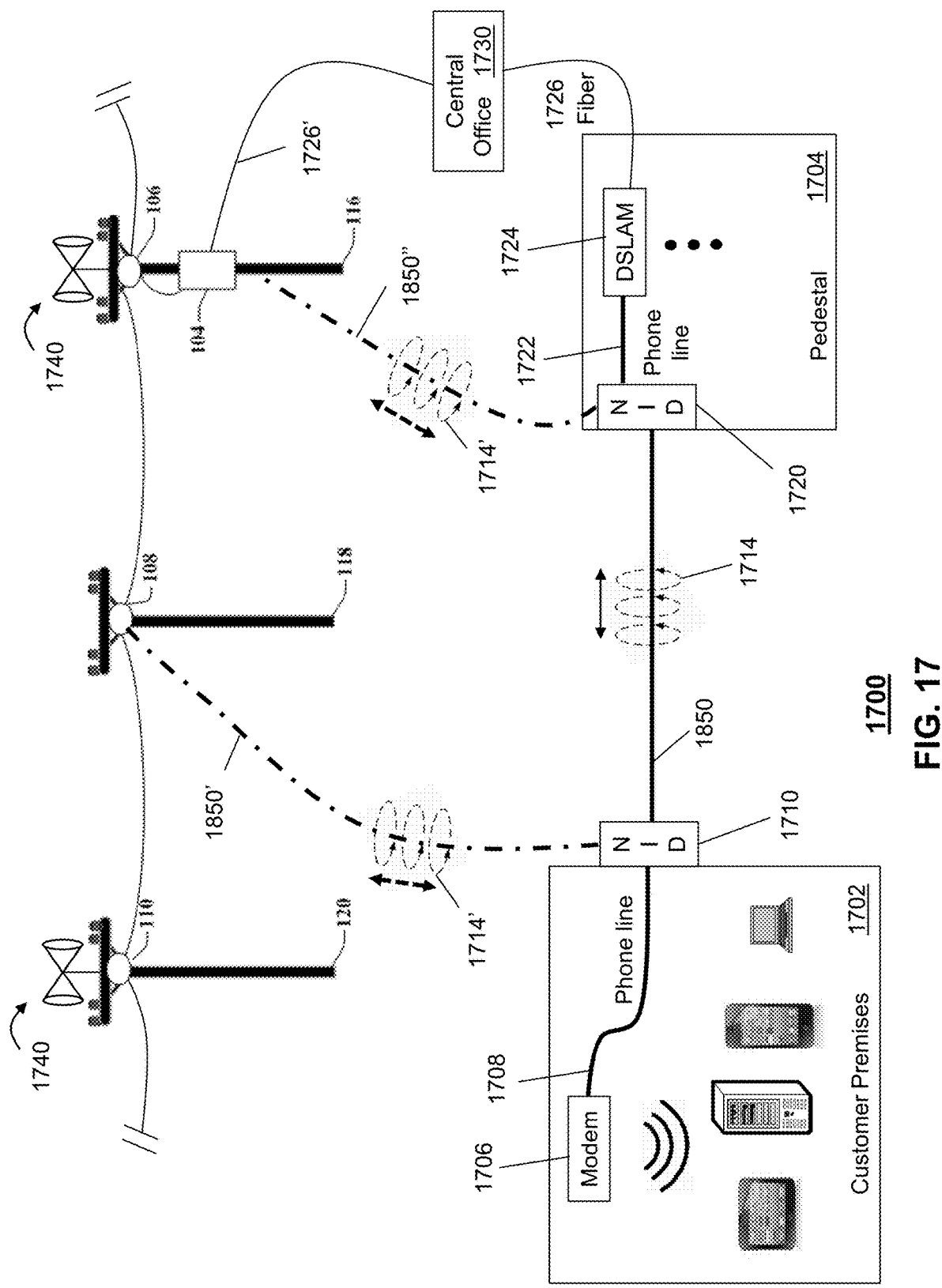
FIG. 17 is a block diagram of an example, non-limiting embodiment of a communication network in accordance with various aspects described herein.

Turning now to FIG. 17, a block diagram of an example, non-limiting embodiment of a communication network 1700 in accordance with various aspects described herein is shown. In one embodiment, for example, the waveguide system 1602 of FIG. 16A can be incorporated into network interface devices (NIDs) such as NIDs 1710 and 1720 of FIG. 17. A NID having the functionality of waveguide system 1602 can be used to enhance transmission capabilities between customer premises 1702 (enterprise or residential) and a pedestal 1704 (sometimes referred to as a service area interface or SAI).

In one embodiment, a central office 1730 can supply one or more fiber cables 1726 to the pedestal 1704. The fiber cables 1726 can provide high-speed full-duplex data services (e.g., 1-100 Gbps or higher) to mini-DSLAMs 1724 located in the pedestal 1704. The data services can be used for transport of voice, internet traffic, media content services (e.g., streaming video services, broadcast TV), and so on. In prior art systems, mini-DSLAMs 1724 typically connect to twisted pair phone lines (e.g., twisted pairs included in category 5e or Cat. 5e unshielded twisted-pair (UTP) cables that include an unshielded bundle of twisted pair cables, such as 24 gauge insulated solid wires, surrounded by an outer insulating sheath), which in turn connect to the customer premises 1702 directly. In such systems, DSL data rates taper off at 100 Mbps or less due in part to the length of legacy twisted pair cables to the customer premises 1702 among other factors.

The embodiments of FIG. 17, however, are distinct from prior art DSL systems. In the illustration of FIG. 17, a mini-DSLAM 1724, for example, can be configured to connect to NID 1720 via cable 1850. Utilizing cable 1714 between customer premises 1702 and a pedestal 1704, enables NIDs 1710 and 1720 to transmit and receive guide electromagnetic waves for uplink and downlink communications. Based on embodiments previously described, cable 1850 can be exposed to rain, or can be buried without adversely affecting electromagnetic wave propagation either in a downlink path or an uplink path so long as the electric field profile of such waves in either direction is confined at least in part or entirely within inner layers of cable 1850. In the present illustration, downlink communications represents a communication path from the pedestal 1704 to customer premises 1702, while uplink communications represents a communication path from customer premises 1702 to the pedestal 1704. In an embodiment where cable 1850 includes an inner conductor, cable 1850 can also serve the purpose of supplying power to the NID 1710 and 1720 and other equipment of the customer premises 1702 and the pedestal 1704.

In customer premises 1702, DSL signals can originate from a DSL modem 1706 (which may have a built-in router and which may provide wireless services such as WiFi to user equipment shown in the customer premises 1702). The DSL signals can be supplied to NID 1710 by a twisted pair phone 1708. The NID 1710 can utilize the integrated waveguide 1602 to launch within cable 1850 guided electromagnetic waves 1714 directed to the pedestal 1704 on an uplink path. In the downlink path, DSL signals generated by the mini-DSLAM 1724 can flow through a twisted pair phone line 1722 to NID 1720. The waveguide system 1602 integrated in the NID 1720 can convert the DSL signals, or a portion thereof, from electrical signals to guided electromagnetic waves 1714 that propagate within cable 1850 on the downlink path. To provide full duplex communications, the guided electromagnetic waves 1714 on the uplink can be configured to operate at a different carrier frequency and/or a different modulation approach than the guided electromagnetic waves 1714 on the downlink to reduce or avoid interference. Additionally, on the uplink and downlink paths, the guided electromagnetic waves 1714 are guided by a core section of cable 1850, as previously described, and such waves can be configured to have a field intensity profile that confines the guide electromagnetic waves in whole or in part in the inner layers of cable 1850. Although the guided electromagnetic waves 1714 are shown outside of cable 1850, the depiction of these waves is for illustration purposes only. For this reason, the guided electromagnetic waves 1714 are drawn with "hash marks" to indicate that they are guided by the inner layers of cable 1850.

On the downlink path, the integrated waveguide system 1602 of NID 1710 receives the guided electromagnetic waves 1714 generated by NID 1720 and converts them back to DSL signals conforming to the requirements of the DSL modem 1706. The DSL signals are then supplied to the DSL modem 1706 via a set of twisted pair wires of phone line 1708 for processing. Similarly, on the uplink path, the integrated waveguide system 1602 of NID 1720 receives the guided electromagnetic waves 1714 generated by NID 1710 and converts them back to DSL signals conforming to the requirements of the mini-DSLAM 1724. The DSL signals are then supplied to the mini-DSLAM 1724 via a set of twisted pair wires of phone line 1722 for processing. Because of the short length of phone lines 1708 and 1722, the DSL modem 1706 and the mini-DSLAM 1724 can send and receive DSL signals between themselves on the uplink and downlink at very high speeds (e.g., 1 Gbps to 60 Gbps or more). Consequently, the uplink and downlink paths can in most circumstances exceed the data rate limits of traditional DSL communications over twisted pair phone lines.

Typically, DSL devices are configured for asymmetric data rates because the downlink path usually supports a higher data rate than the uplink path. However, cable 1850 can provide much higher speeds both on the downlink and uplink paths. With a firmware update, a legacy DSL modem 1706 such as shown in FIG. 17 can be configured with higher speeds on both the uplink and downlink paths. Similar firmware updates can be made to the mini-DSLAM 1724 to take advantage of the higher speeds on the uplink and downlink paths. Since the interfaces to the DSL modem 1706 and mini-DSLAM 1724 remain as traditional twisted pair phone lines, no hardware change is necessary for a legacy DSL modem or legacy mini-DSLAM other than firmware changes and the addition of the NIDs 1710 and 1720 to perform the conversion from DSL signals to guided electromagnetic waves 1714 and vice-versa. The use of NIDs enables a reuse of legacy modems 1706 and mini-DSLAMs 1724, which in turn can substantially reduce installation costs and system upgrades. For new construction, updated versions of mini-DSLAMs and DSL modems can be configured with integrated waveguide systems to perform the functions described above, thereby eliminating the need for NIDs 1710 and 1720 with integrated waveguide systems. In this embodiment, an updated version of modem 1706 and updated version of mini-DSLAM 1724 would connect directly to cable 1850 and communicate via bidirectional guided electromagnetic wave transmissions, thereby averting a need for transmission or reception of DSL signals using twisted pair phone lines 1708 and 1722.

In an embodiment where use of cable 1850 between the pedestal 1704 and customer premises 1702 is logistically impractical or costly, NID 1710 can be configured instead to couple to a cable 1850' (similar to cable 1850 of the subject disclosure) that originates from a waveguide 108 on a utility pole 118, and which may be buried in soil before it reaches NID 1710 of the customer premises 1702. Cable 1850' can be used to receive and transmit guided electromagnetic waves 1714' between the NID 1710 and the waveguide 108. Waveguide 108 can connect via waveguide 106, which can be coupled to base station 104. Base station 104 can provide data communication services to customer premises 1702 by way of its connection to central office 1730 over fiber 1726'. Similarly, in situations where access from the central office 1730 to pedestal 1704 is not practical over a fiber link, but connectivity to base station 104 is possible via fiber link 1726', an alternate path can be used to connect to NID 1720 of the pedestal 1704 via cable 1850" (similar to cable 1850 of the subject disclosure) originating from pole 116. Cable 1850" can also be buried before it reaches NID 1720.

Figure 18A:
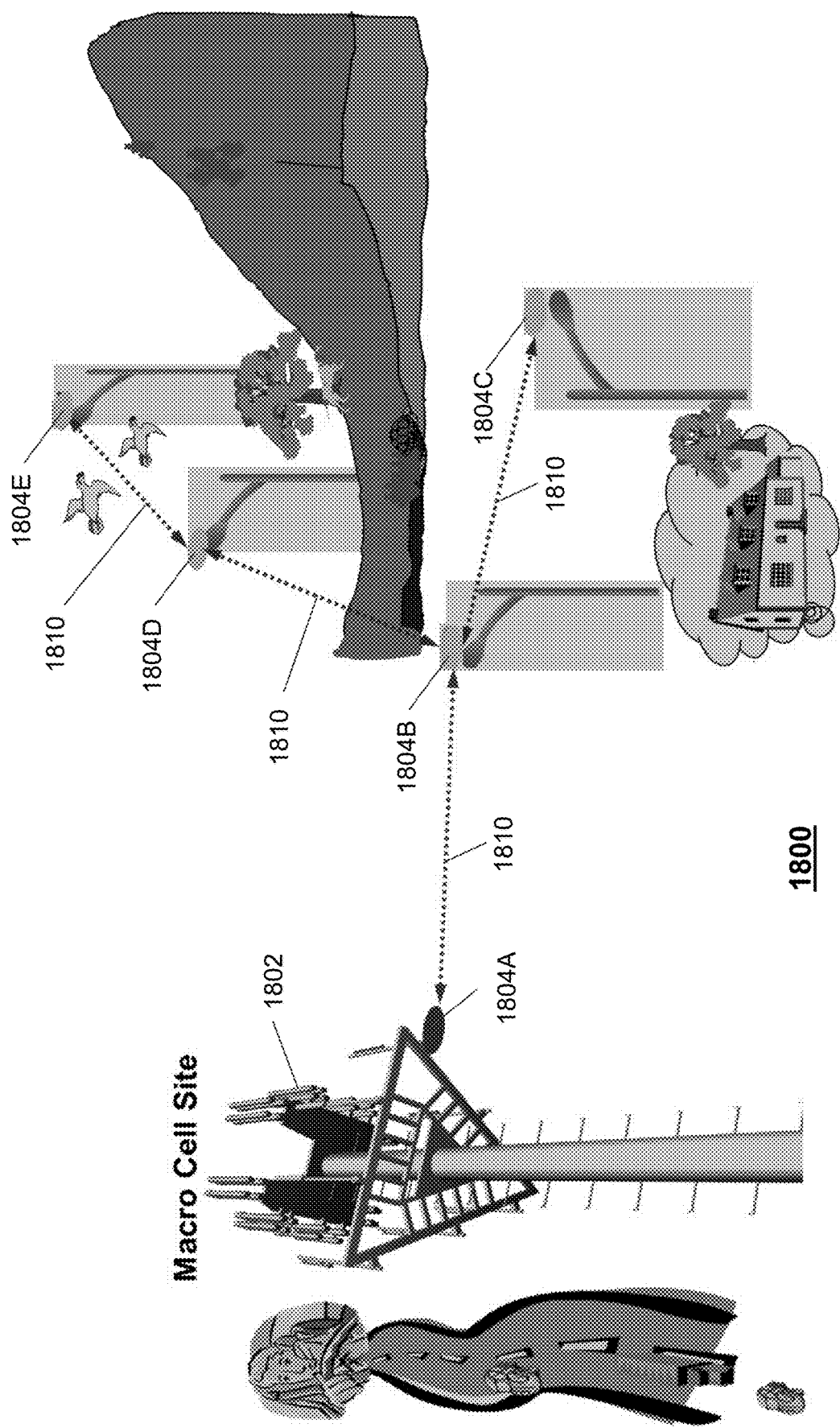
FIG. 18A is a block diagram illustrating an example, non-limiting embodiment of a communication system in accordance with various aspects described herein.

Turning now to FIG. 18A, a block diagram illustrating an example, non-limiting embodiment of a communication system 1800 in accordance with various aspects of the subject disclosure is shown. The communication system 1800 can include a macro base station 1802 such as a base station or access point having antennas that covers one or more sectors (e.g., 6 or more sectors). The macro base station 1802 can be communicatively coupled to a communication node 1804A that serves as a master or distribution node for other communication nodes 1804B-E distributed at differing geographic locations inside or beyond a coverage area of the macro base station 1802. The communication nodes 1804 operate as a distributed antenna system configured to handle communications traffic associated with client devices such as mobile devices (e.g., cell phones) and/or fixed/stationary devices (e.g., a communication device in a residence, or commercial establishment) that are wirelessly coupled to any of the communication nodes 1804. In particular, the wireless resources of the macro base station 1802 can be made available to mobile devices by allowing and/or redirecting certain mobile and/or stationary devices to utilize the wireless resources of a communication node 1804 in a communication range of the mobile or stationary devices.

The communication nodes 1804A-E can be communicatively coupled to each other over an interface 1810. In one embodiment, the interface 1810 can comprise a wired or tethered interface (e.g., fiber optic cable). In other embodiments, the interface 1810 can comprise a wireless RF interface forming a radio distributed antenna system. In various embodiments, the communication nodes 1804A-E can include one or more antennas, such as dielectric horn antennas or antenna arrays, poly rod antennas or antenna arrays or any of the other antennas described herein. The communication nodes 1804A-E can be configured to provide communication services to mobile and stationary devices according to instructions provided by the macro base station 1802. In other examples of operation however, the communication nodes 1804A-E operate merely as analog repeaters to spread the coverage of the macro base station 1802 throughout the entire range of the individual communication nodes 1804A-E.

The micro base stations (depicted as communication nodes 1804) can differ from the macro base station in several ways. For example, the communication range of the micro base stations can be smaller than the communication range of the macro base station. Consequently, the power consumed by the micro base stations can be less than the power consumed by the macro base station. The macro base station optionally directs the micro base stations as to which mobile and/or stationary devices they are to communicate with, and which carrier frequency, spectral segment(s) and/or timeslot schedule of such spectral segment(s) are to be used by the micro base stations when communicating with certain mobile or stationary devices. In these cases, control of the micro base stations by the macro base station can be performed in a master-slave configuration or other suitable control configurations. Whether operating independently or under the control of the macro base station 1802, the resources of the micro base stations can be simpler and less costly than the resources utilized by the macro base station 1802.

Figure 18B:
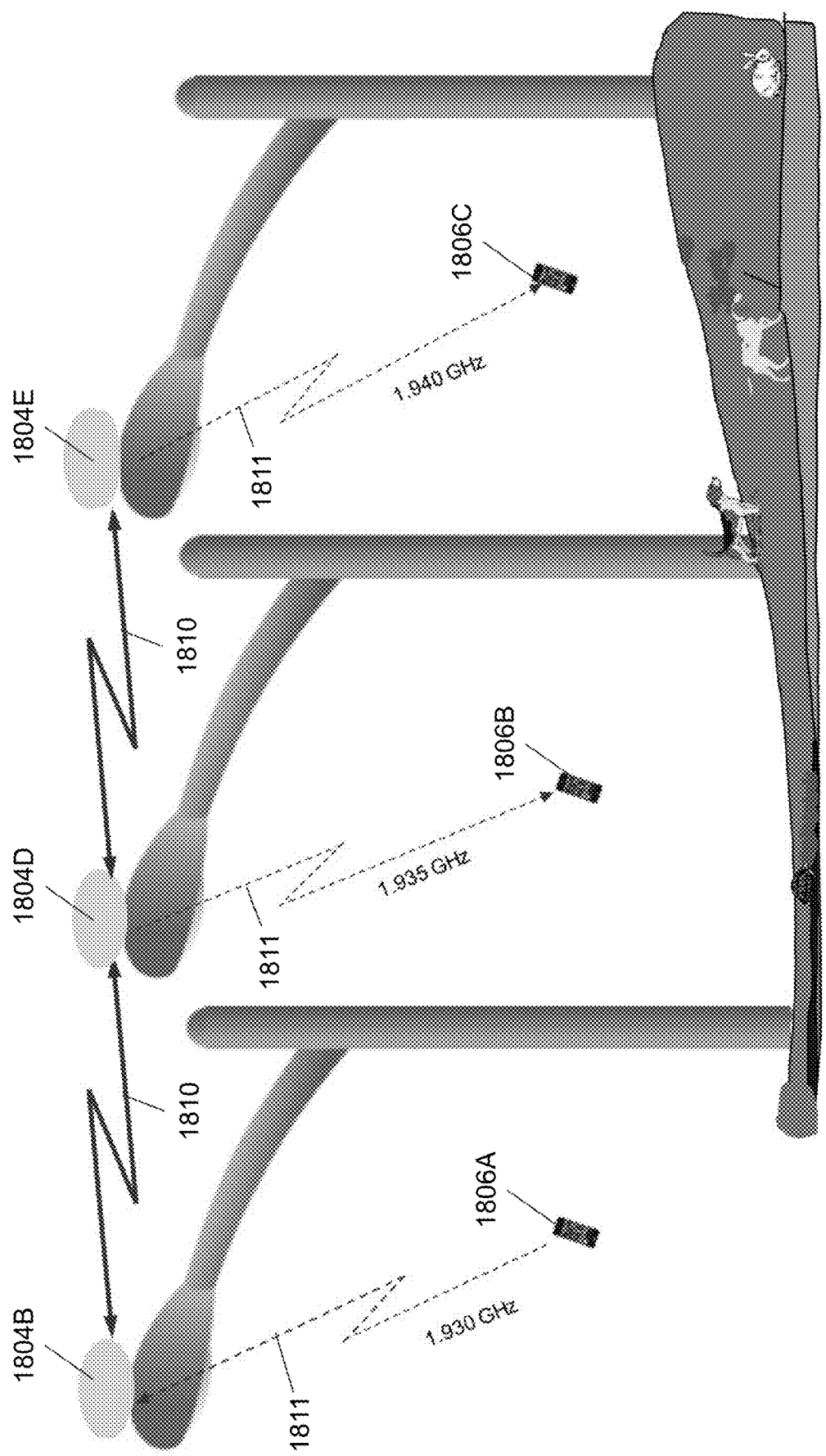
FIG. 18B is a block diagram illustrating an example, non-limiting embodiment of a portion of the communication system of FIG. 18A in accordance with various aspects described herein.

Turning now to FIG. 18B, a block diagram illustrating an example, non-limiting embodiment of the communication nodes 1804B-E of the communication system 1800 of FIG. 18A is shown. In this illustration, the communication nodes 1804B-E are placed on a utility fixture such as a light post. In other embodiments, some of the communication nodes 1804B-E can be placed on a building or a utility post or pole that is used for distributing power and/or communication lines. The communication nodes 1804B-E in these illustrations can be configured to communicate with each other over the interface 1810, which in this illustration is shown as a wireless interface. The communication nodes 1804B-E can also be configured to communicate with mobile or stationary devices 1806A-C over a wireless interface 1811 that conforms to one or more communication protocols (e.g., fourth generation (4G) wireless signals such as LTE signals or other 4G signals, fifth generation (5G) wireless signals, WiMAX, 802.11 signals, ultra-wideband signals, etc.). The communication nodes 1804 can be configured to exchange signals over the interface 1810 at an operating frequency that is may be higher (e.g., 28 GHz, 38 GHz, 60 GHz, 80 GHz or higher) than the operating frequency used for communicating with the mobile or stationary devices (e.g., 1.9 GHz) over interface 1811. The high carrier frequency and a wider bandwidth can be used for communicating between the communication nodes 1804 enabling the communication nodes 1804 to provide communication services to multiple mobile or stationary devices via one or more differing frequency bands, (e.g. a 900 MHz band, 1.9 GHz band, a 2.4 GHz band, and/or a 5.8 GHz band, etc.) and/or one or more differing protocols. In other embodiments, particularly where the interface 1810 is implemented via a guided wave communications system on a wire, a wideband spectrum in a lower frequency range (e.g. in the range of 2-6 GHz, 4-10 GHz, etc.) can be employed.

In an effort to extend Internet services to those in underserved areas, such as remote or sparsely populated, rural areas, wireless communication nodes can be provided along power line distribution networks. For example, the wireless communication nodes can be mounted on power line support structures to extend Internet services to virtually anyone who is connected to and/or located proximal to an electrical distribution grid. In some embodiments, the wireless communication nodes along the power line distribution network can form at least a portion of a communication network for transferring information between nodes of the power line distribution network.

Figure 19:
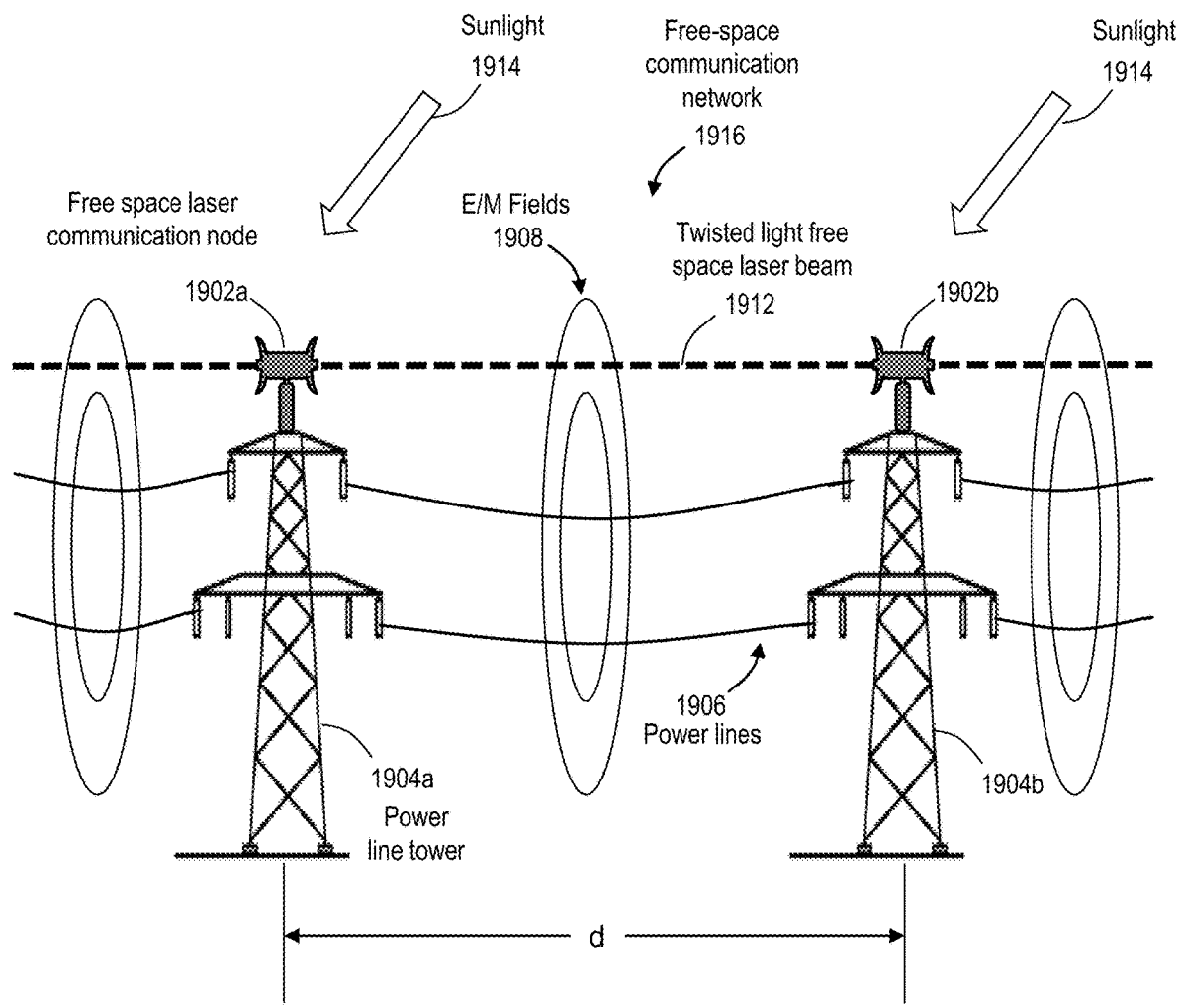
FIG. 19 is a block diagram illustrating an example, non-limiting embodiment of a free-space communication system in accordance with various aspects described herein.

FIG. 19 provides a block diagram illustrating an example, non-limiting embodiment of a free-space communication system 1900 in accordance with various aspects described herein. The communication system 1900 includes a free-space, communication network 1916 having an arrangement of wireless or free-space communication nodes 1902a, 1902b, generally 1902, mounted on power line transmission and/or distribution support structures. The free-space communication nodes 1902 communicate with each other using free-space propagation, e.g., twisted light free space laser beams 1912, without requiring the use of any tangible propagation media. The illustrative communication system 1900 includes an array of pylons 1904a, 1904b, generally 1904, arranged to support power transmission lines 1906 as might be used in the bulk movement of electrical energy from an energy generating site, such as from a power plant, to an electrical substation. Although the illustrative example relates to bulk energy transmission, it is understood that in at least some embodiments, the arrangement of wireless communication nodes 1902 can be used with power line distribution networks, e.g., between high-voltage substations and customers alone or in combination with bulky energy transmission systems. In power line transmission and/or distribution applications, the support structures can include one or more of pylons, utility poles, streetlights, architectural structures, such as bridges, dams, buildings, and the like.

In at least some applications, the wireless communication nodes 1902 incorporate highly directional, unguided or free-space communication links, such as free-space optical communications links. Free-space optical communication links can utilize electromagnet energy, e.g., light, propagating in free space to wirelessly transfer data for telecommunications and/or computer networking applications. Optical sources can include, without limitation, coherent devices, such as lasers or masers, non-coherent devices, such as light emitting diodes (LEDs), and combinations thereof. Lasers can include solid state lasers, e.g., semiconductor diode lasers, gas lasers, chemical lasers fiber lasers, photonic crystal lasers, and so on. Although the term optical sources is used, it is understood that devices may operate within and/or without a visible light region of the spectrum, e.g., within the infrared and/or ultraviolet spectra. In at least some embodiments, optical source devices can include millimeter wave and/or microwave devices, e.g., masers, and the like.

Free-space optical communication links offer many advantages, such as the possibility of high bit rates, low bit error rates, immunity to electromagnetic interference, increased security and ease of installation, just to name a few. It is generally understood, however, that terrestrial free-space optical communication links are susceptible to atmospheric conditions, such as fog, atmospheric absorption, rain, snow, pollution, interference from background sources, such as the sun. Consequently, reliable operation of free-space optical links are limited in range, e.g., to about 500 meters.

Overhead power transmission requires support structures to maintain power transmission lines at a predetermined, i.e., safe, height above the ground. The support structures, e.g., pylons 1904, are typically spaced at regular intervals along cleared pathways providing clear lines of site between adjacent pylons. To serve as suitable supports, a maximum distance "d" between adjacent pylons 1904 is also limited, typically not more than about 500 yards. The limited maximum support structure spacing and clear line-of-sight make such support structures ideal candidates for hosting nodes of a free-space optical communication network 1916.

In at least some embodiments, at least some wireless communication nodes 1902 of the power line communication network provide a backhaul network for transferring information to/from a network hub, a network operations center, a core network, a data center, and combinations thereof. Alternatively or in addition, at least some wireless communication nodes 1902 of the power line communication network provide network connectivity to a distributed antenna system, an extended communication system that links base station devices and their distributed antennas. Alternatively or in addition, at least some of the wireless communication nodes of the power line communication network are adapted for transferring information between nodes of the wireless communication network and nodes of another communication network, such as the guided wave communication system 1500 (FIG. 15), and/or incorporated into network interface devices (NIDs) such as NIDs 1710 and 1720 (FIG. 17), and/or distributed antenna system 1800 (FIGS. 18A-B) configured to handle communications traffic associated with client devices such as mobile devices (e.g., cell phones) and/or fixed/stationary devices (e.g., a communication device in a residence, or commercial establishment) that are wirelessly coupled to any of the communication nodes. In some embodiments, at least some of the wireless communication nodes are adapted for transferring information between nodes of the wireless communication network and network edge devices, subscriber premises equipment and/or user devices, such as residential gateways, vehicles, mobile devices, and/or any network-enabled device adapted for machine-to-machine (M2M) communications, e.g., according to the internet of things (IoT).

Figure 20:
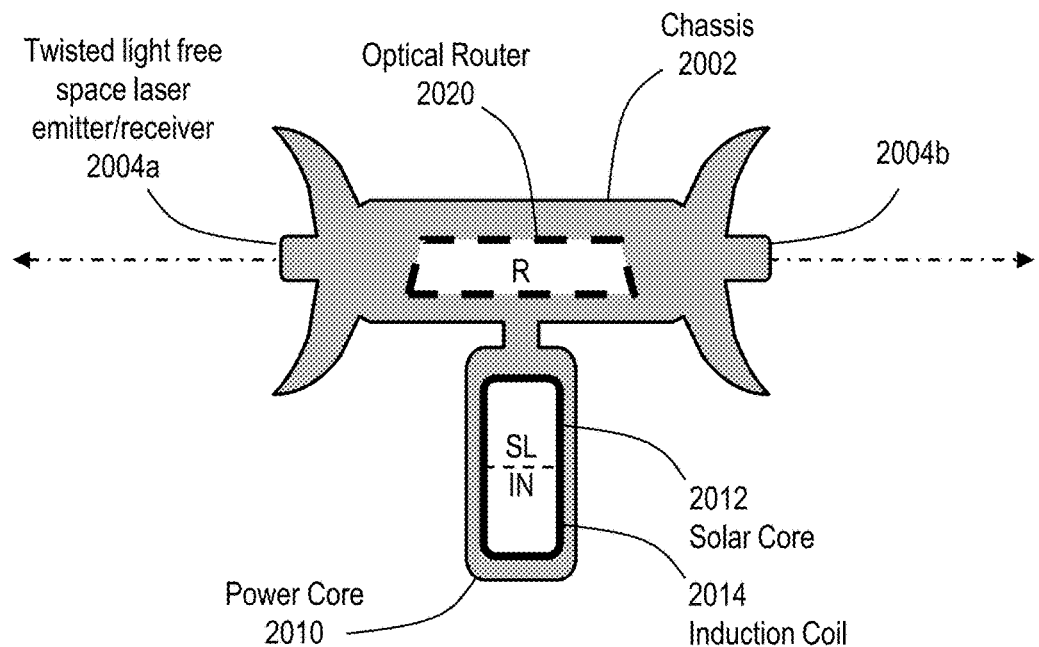
FIG. 20 is a block diagram illustrating an example, non-limiting embodiment of a free-space communication transceiver in accordance with various aspects described herein.

FIG. 20 is a block diagram illustrating an example, non-limiting embodiment of a wireless, or free-space, communication node 2000 in accordance with various aspects described herein. In at least some embodiments, one or more of the free-space, communication nodes 2000 is adapted to transfer information via angular momenta of photons. This can includes, without limitation, orbital angular momentum (OAM). An OAM mode or beam can also be interpreted as a beam with a phase front that "twists" in a helical fashion as it propagates. The OAM, or vortex, can be given a number, called a topological charge, according to how many twists the light encounters within one wavelength. The number is an integer, and can be positive or negative, depending on the direction of the twist. As disclosed herein, this number can be used to convey information, e.g., a topological charge of 20, representing 20 twists, can convey a binary information word of "10100." Accordingly, a single photon signal with 20 twists can convey an equivalent of 5 bits in traditional optical communication links. It is envisioned that the number of twists can increase without limit, subject to limitations of available devices, such as spiral phase plates.

The free-space, communication node 2000 is adapted for mounting on a support structure, such as a power line pylon 1904 (FIG. 19). The free-space, communication node 2000 includes one of a transmitter, a receiver, a transceiver 2004a comprising a transmitter and a receiver, a repeater or any combination thereof. In at least some embodiments, the various components and/or subassemblies can be mounted on and/or within a common chassis 2002. The illustrative free-space, communication node 2000 includes two transceivers 2004a, 2004b, generally 2004. A transmitter or transmitter portion of a transceiver 2004 is adapted to transmit photons along a directed path towards an intended optical receiver, e.g., at an adjacent node 1902 of the free-space communication network 1916 (FIG. 19). Likewise, a receiver or a receiver portion of the optical link transceiver 2004 is adapted to collect or otherwise receive photons along a directed path from a nearby optical transmitter, e.g., at an adjacent node 1902 of the free-space communication network 1916 (FIG. 19).

It is understood that the free-space links can be full duplex, e.g., transmitting and receiving photons simultaneously over the same free-space path. In at least some embodiments, optical devices, such as lenses, prisms, filters, screens, apertures and/or mirrors are used in the course of transmitting, collecting or otherwise processing photons at the communication node 2000. The transceivers 2004 are positioned on opposite sides of the example communication node 2000. In general, each of the one or more transmitters, receivers, repeaters or transceivers 2004 are positioned according to a line-of-sight path to a neighboring communication node 2000 forming an optical link or segment of the free-space, communication network 1916 (FIG. 19). This might include a collinear arrangement, e.g., along a longitudinal horizontal axis of the node 2000, as shown, or other angular arrangements having suitable angular displacements from the longitudinal axis in azimuth and/or elevation as dictated from locations of the adjacent nodes. LoS links may depart from straight lines to accommodate topological variations, e.g., hills and/or valleys, and/or to vary directions, e.g., as may be necessary due to potential obstructions, e.g., mountains, buildings and the like.

The free-space, wireless communication node 2000 typically includes at least some electronic devices, such as laser diodes, CCDs, micro controllers, amplifiers, filters, and/or microprocessors that require a suitable source of electrical energy for operation. In some of the illustrative embodiments disclosed herein, the free-space, wireless communication node 2000 includes an electrical power subsystem or power core 2010 adapted to supply power to electronic devices of the node 2000. The example power core 2012 includes first power harvesting circuitry 2014 adapted to capture electrical power from the electromagnetic fields of the power lines 1906 and second power harvesting circuitry 2012 adapted to capture electrical power more generally from the environment, exclusive of the power line fields. In at least some embodiments, the power core 2010 includes additional circuitry to control operation of the first and second power harvesting circuits 2012, 2014 and/or further condition captured power in a manner suitable to power devices of the wireless communication nodes 2000.

As proposed herein the wireless communication nodes 2000 are placed in close proximity to power lines 1906 (FIG. 19). However, the power lines typically operate at high-voltage levels and/or high current levels and/or at frequencies that are neither suitable nor readily accessible for operation of sensitive electronic devices. It is appreciated that electrical power carried by the power lines 1906 does produce electromagnetic fields that extend outward and away from electrical conductors of the power lines 1906. According to the proposed configuration, it is envisioned that at least a portion of the free-space communication nodes 2000 positioned on the pylons 1904 (FIG. 19) would be relatively close to the power carrying cables 1906 such that the electromagnetic fields would be relatively large.

Power line field harvesting devices, such as dipoles and/or induction coils can be provided alone or in combination with other first power harvesting circuitry 2014 to generate electrical power from the ambient electromagnetic fields of the power cables 1906. The power line field harvesting devices, when placed within relatively close proximity to at least some electrical conductors of the power lines, convert energy of the power line fields into electrical current. It is appreciated that harvesting energy in this manner will remove energy from the electrical power carried by the power lines, which would require some sort of metering or compensation arrangement to the power companies. In an effort to reduce if not eliminate any need on the power line fields, the illustrative power core 2010 includes an induction coil 2014, but other configurations, such as dipole antenna structures can be used alone or in combination with the induction coil 2014. The induction coil generates electrical power from the ambient electromagnetic fields of the power cables 1906.

In an effort to reduce if not eliminate any need on the power line fields, at least some of the illustrative embodiments of the power core 2010 include a renewable power source 2012 that provides power to the devices of the wireless communication nodes 2000. The renewable power sources is adapted to harvest energy from the environment, e.g., converting light and/or wind, into electrical energy. In at least some applications, the harvested environmental energy can power at least some of the electrical devices of the wireless communication node 1902 directly. Alternatively or in addition, the harvested energy can be stored in an energy storage device, such as a rechargeable battery. The stored energy, in turn, can be used to power the wireless communication node 1902.

In at least some embodiments, the wireless communication node 1902 includes a routing device 2020 (shown in phantom). The routing device 2020 can be adapted to facilitate a directed transfer of network traffic among one or more of the wireless communication nodes 1902, data centers, hubs, destinations, e.g., user devices, and the like. In at least some embodiments, the routing device 2020 provides an optical routing feature adapted to selectively route optical network traffic, e.g., packets, without requiring a conversion of the optical packets to electrical signals.

Figure 21:
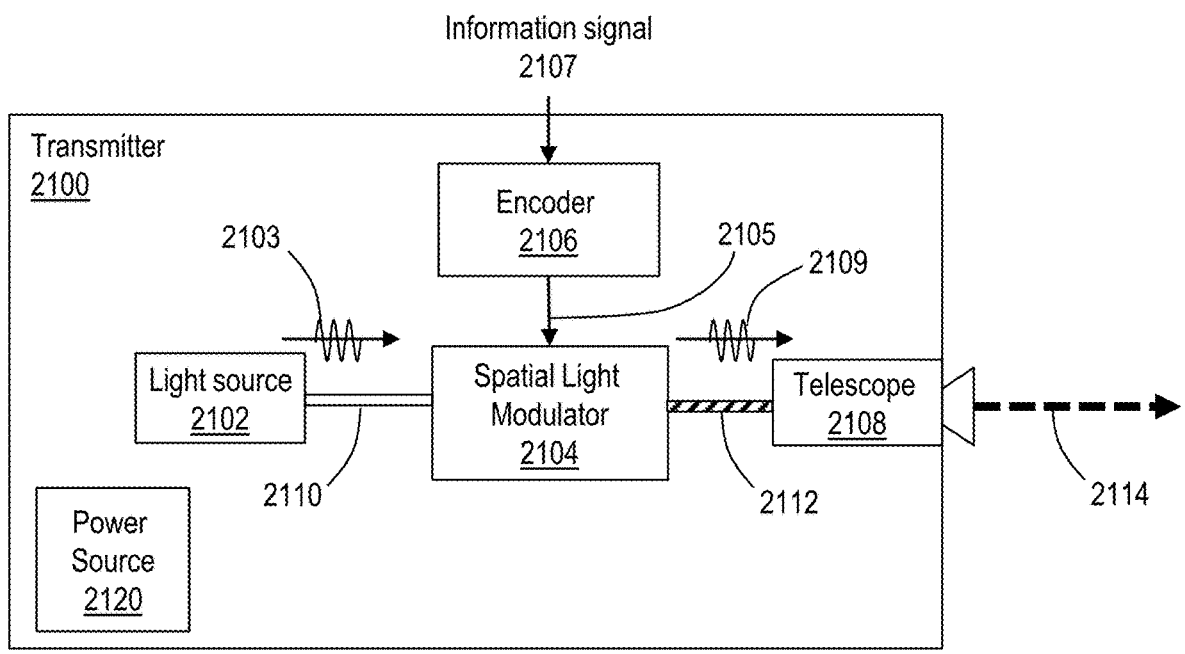
FIG. 21 is a block diagram illustrating an example, non-limiting embodiment of a free-space communication transmitter in accordance with various aspects described herein.

FIG. 21 is a block diagram illustrating an example, non-limiting embodiment of a transmitter 2100 adapted to transfer information according to OAM in accordance with various aspects described herein. The example transmitter 2100 includes an electromagnetic source, such as a light source 2102, a spatial light modulator 2104, an optical device, such as a telescope 2108, an encoder 2106 and a power source 2120. The light source 2102 can include any of the light sources disclosed herein, such as lasers, LEDs, masers and the like. The light source 2102 is adapted to provide a light signal 2103 that can be directed towards the spatial light modulator 2104. In some embodiments, the light signal 2103 is a coherent light signal directed from the light source 2102 toward the spatial light modulator 2104. In some embodiments, the light signal 2103 can be directed according to a free space link, e.g., an unguided laser beam emitted from the light source 2102. Alternatively or in addition, the light signal 2103 can be directed toward the spatial light modulator 2104 according to a light guiding structure 2110, such as a waveguide, a light pipe, and/or an optical fiber.

The spatial light modulator 2104 is adapted to apply an OAM to at least a portion of the light signal 2103 received at the spatial light modulator 2104. As disclosed further herein, a phase front of the light signal 2103 can be twisted by the spatial light modulator 2104 to produce a twisted light signal or vortex 2109. The encoder 2106 is adapted to encode an information signal 2107 into an encoded information signal 2105. Photons of the twisted light signal 2109 have an OAM that is determined at least in part by the encoded information signal 2105. For example, a portion of the information signal, e.g., a predetermined number of bits of a binary information signal, is encoded into a corresponding code word. The code word can indicate a number of twists that relates to the OAM of the twisted light signal 2109. Accordingly, the example spatial light modulator 2104 applies a predetermined OAM value, e.g., number of spins or twists to the light signal 2103 based on the code word resulting in the twisted light signal 2109. The encoding process can be applied in similar manner to subsequent portions of the information signal to determine subsequent portions of the encoded information signal 2105. The subsequent portions of the encoded information signal 2105, in turn, apply corresponding twists to the light signal resulting in subsequent portions of the twisted light signal 2109. For example, the number of twists can change based on the information signal 2107 via the encoded information signal 2105.

The transmitter 2100 is adapted to transmit the twisted light signal 2109 along a directed path towards an intended optical receiver, e.g., at an adjacent node 1902 of the free-space communication network 1916 (FIG. 19). In at least some embodiments, the twisted light signal 2109 is directed toward the optical device 2108. In some embodiments, the twisted light signal 2109 is directed from the light source 2102 toward the spatial light modulator 2104. In some embodiments, the light signal 2103 can be directed from spatial light modulator 2104 according to a free space link, e.g., an unguided twisted laser beam 2109 emitted from the spatial light modulator 2104. Alternatively or in addition, the twisted light signal 2109 can be directed toward the optical device 2108 according to a light guiding structure 2112, such as a waveguide, a light pipe, and/or an optical fiber.

The optical device 2108 can include one or more of a lens, a mirror, a prism, a filter, an aperture or a combination thereof. According to the illustrative example, the optical device 2108 includes a telescope 2108. In at least some embodiments, the telescope 2108 expands a diameter of the twisted light signal 2109 to produce an expanded diameter twisted light beam 2114. Alternatively or in addition, the telescope reduces a divergence of the twisted light signal 2109 along a free-space, optical link.

Figure 22A:
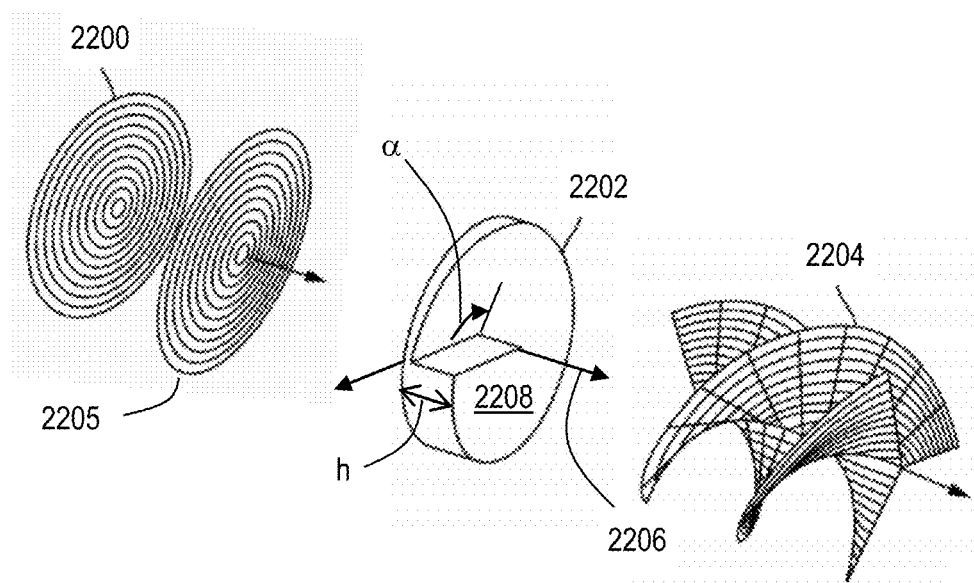
FIG. 22A is a schematic diagram illustrating an example generation of a twisted light beam by passing a light beam through a spiral phase plate in accordance with various aspects described herein.

FIG. 22A is a schematic diagram illustrating an example generation of a twisted light beam 2204 by passing a light beam 2200 through a spiral phase plate 2202 in accordance with various aspects described herein. According to the illustrative example an OAM modulator, such as a spiral phase plate 2202 is used to convert an input light beam 2200 into an OAM beam 2204 with a charge number, l=+3. According to the illustrative example, the input light beam is a Gaussian beam presenting a wavefront 2205 that becomes distorted by passing through the spiral phase plate 2202. The distortion results in a helical shape of the OAM beam 2204 with l=+3, i.e., three spins per optical wavelength in a positive reference direction. In some embodiments, another spiral phase plate is a conjugate of the 2202. The conjugate spiral phase plate, when applied to the OAM beam 2204 may convert the OAM beam 2204 back into a Gaussian beam, effectively reversing the process of the spiral phase plate 2202. The spiral phase plate 2202 receives the light beam 2202 according to free-space light beam propagation. The spiral phase plate 2202 generates the twisted light beam 2204 from the free-space light beam 2202, and the twisted light beam 2204 is adapted for free-space propagation without the need of coupling to any propagation structure.

The spiral phase plate 2202 can include a spiral-shaped device presenting a height and/or thickness "h" that may increase smoothly and uniformly as an azimuthal angle "α" about an optical axis 2206 increases from 0 to 2π. A height difference "Δh" of the spiral phase plate 2202 can be determined using a formula $\Delta h = l \cdot \lambda/(n-1)$, in which "n" represents a refractive index of a plate material 2208, "λ" represents a wavelength of the input light beam, and "l" represents a plate charge number, e.g., an OAM charge obtainable after propagating the input light beam 2200, e.g., a Gaussian beam, through the spiral phase plate 2202.

In some embodiments, the spiral phase plates 2202 are static. Static spiral phase plates 2202 can include spiral-shaped pieces of crystal and/or plastic that are engineered specifically to a predetermined topological charge and incident wavelength. Adjustable spiral phase plates 2202 can be made by providing an adjustable separation, e.g., by moving a wedge between two sides of a split or cracked piece of plastic. It is envisioned that other devices can be used to produce vortices of the OAM beam 2204, such as a hologram, a deformable mirror, a birefringent liquid crystal plate, sometimes referred to as a q-plate. For example, a q-plate with a topological charge "q" can generate a ±2q charge vortex in the OAM beam 2204 based on polarization of the input beam.

Typically, a photon, or group of photons of a common wave front and/or pulse can be twisted by being passed through a special type of optical device or lens, such as a spiral phase plate. In at least some embodiments, a physical orientation of the spiral phase plate determines the number of twists. Thus, like turning a dial, the plate can be adjusted to obtain a specific number of twists. It is understood that higher order numbers can be achieved by using a series of different plates encoded for various orders of magnitude.

Figure 22B:
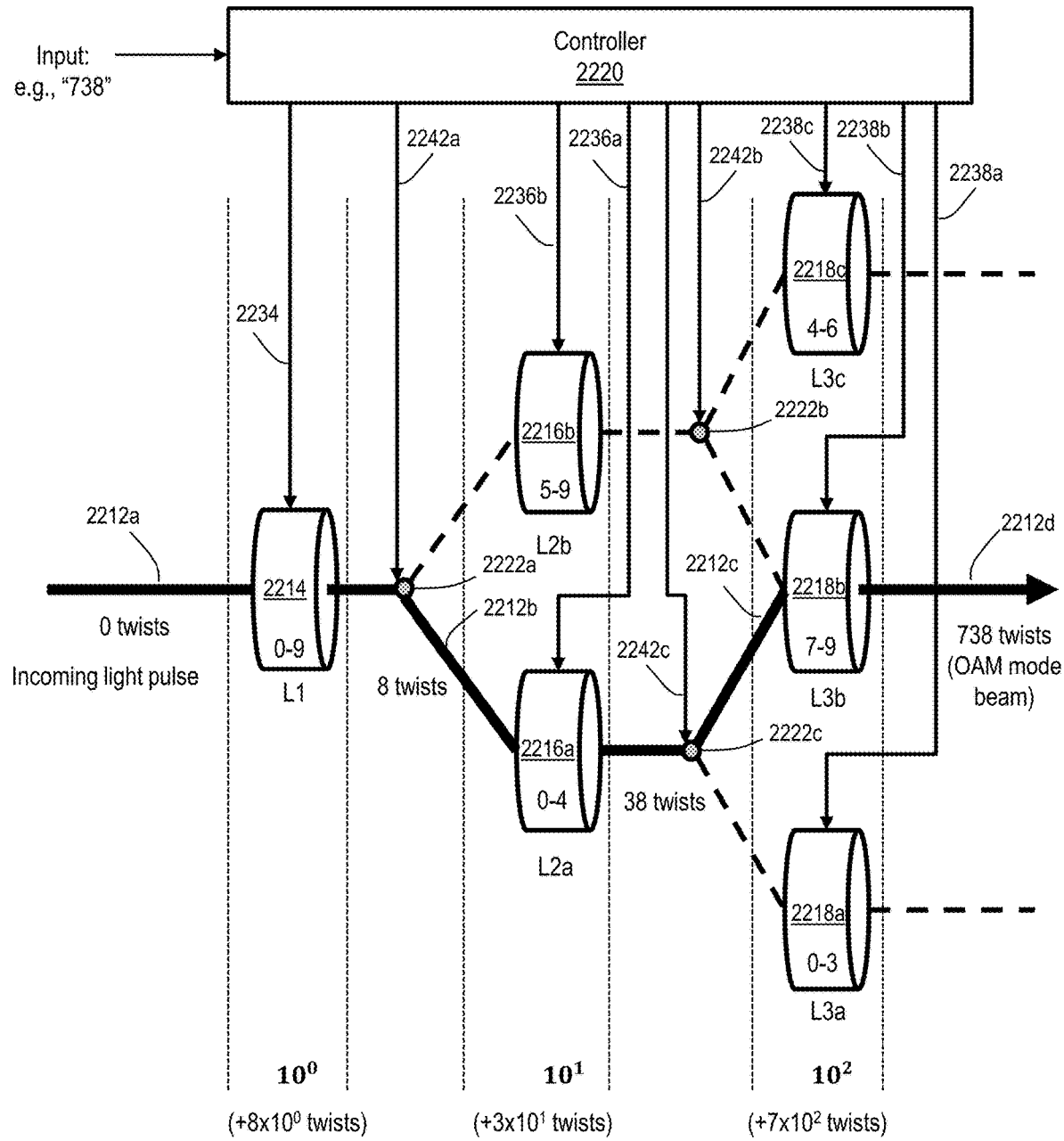
FIG. 22B is a block diagram illustrating an example, non-limiting embodiment of a spatial light modulator of a free-space communication system in accordance with various aspects described herein.

FIG. 22B is a block diagram illustrating an example, non-limiting embodiment of a spatial light modulator 2210 of a free-space communication system in accordance with various aspects described herein. The spatial light modulator 2210 can encode a twisted light message, e.g., corresponding to a twisted-light modem write. The spatial light modulator 2210 includes a first-level spatial light modulating element 2214 adapted to modulate an orbital angular momentum of an input optical beam 2212a, e.g., a Gaussian beam. In at least some embodiments, the first-level spatial light modulating element 2214 is an adjustable element adapted to modulate the orbital angular momentum of the input optical beam 2212a according to a first value, e.g., a first selectable charge number. In the illustrative example, the first selectable charge number can be selected over a range of 0-9, with the selected value being representative of a first number of "twists" applied to the input optical beam 2212a.

The spatial light modulator 2210 also includes a controller 2220 in communication with the first-level spatial light modulating element 2214. In operation, the controller 2220 provides a first-level control signal 2234 to the first-level spatial light modulating element 2214, which is adapted to adjust, or modulate the orbital angular momentum of the input optical beam 2212a according to the first-level control signal 2234. According to the illustrative example, the value selected is 8, such that the first-level spatial light modulating element 2214 applies 8 twists to the angular momentum of the input optical beam 2212a to produce a first-level twisted beam 2212b having 8 twists.

In at least some embodiments, the spatial light modulator 2210 includes more than one spatial light modulating element arranged and adapted to collectively modulate the orbital angular momentum of an input optical beam. For example, a single input optical beam can be applied to more than one spatial light modulating element, sequentially and/or simultaneously, to produce an output twisted beam 2212*d* having a predetermined number of twists based on a collective arrangement and/or settings of the more than one spatial light modulating elements. The output twisted beam 2212*d* is a free-space beam that can be directed to one or more other communication nodes and/or network devices via free-space propagation, without requiring a coupling of any sort to any propagation medium.

According to the illustrative, non-limiting example, the spatial light modulator 2210 includes two second-level spatial light modulating elements 2216*a*, 2216*b*, generally 2216. In at least some embodiments, the two second-level spatial light modulating elements 2214 are also adjustable elements adapted to modulate the orbital angular momentum of the first-level twisted beam 2212*b* according to a second value, e.g., a second selectable charge number. In the illustrative example, the second selectable charge number extends over a range of 0-9, which is shared across the two second-level spatial light modulating elements 2216. Namely, a first second-level spatial light modulating elements 2216*a* can be adjusted over a range of 0-4, while a second second-level spatial light modulating elements 2216*b* can be adjusted over a range of 5-9, the ranges collectively spanning 0-9. According to the example spatial light modulator 2210, the controller 2220 provides one second-level control signal 2236*a* to one of the second-level spatial light modulating elements 2216*a* and another second-level control signal 2236*b* to another one of the second-level spatial light modulating elements 2216*b*. According to the illustrative example, a value selected by the one second-level control signal 2236*a* is 3, such that the second-level spatial light modulating element 2216*a* applies 30 twists to the angular momentum of the input optical beam 2212*a* to produce a second-level twisted beam 2212*c* having 30+8=38 twists.

The illustrative example includes a first switchable element 2222*a* adapted to direct the first-level twisted beam 2212*b* to a selected one of the one or the another second-level spatial light modulating elements 2216*a*, 2216*b*. The first switchable element 2222*a* operates according to a first switch control signal 2242*a* provided by the controller 2220. It is understood that in at least some examples, the controller 2220 includes logic by way of circuits and/or machine readable instructions that can be applied to generate or otherwise affect one or more of the various control signals output by the controller 2220. According to the illustrative example, the first switchable element 2222*a* receives the first switch control signal 2242*a* that selects the one of the second-level spatial light modulating elements 2216*a* to direct the first-level twisted beam 2212*b* to the one of the second-level spatial light modulating elements 2216*a*. This particular selection is made, because the selected element 2216*a* is the one adapted to operate over a range, i.e., 0-4, including the selected value, i.e., 3. Had the selected value been between 5-9, i.e., to apply 50-90 twists, then the logic of the controller 2220 would have selected the another one of the second-level spatial light modulating elements 2216*b*.

According to the illustrative, non-limiting example, the spatial light modulator 2210 includes three third-level spatial light modulating elements 2218*a*, 2218*b*, 2218*c* generally 2218. In at least some embodiments, the three third-level spatial light modulating elements 22148 are also adjustable elements adapted to modulate the orbital angular momentum of the second-level twisted beam 2212*c* according to a third value, e.g., a third selectable charge number. In the illustrative example, the third selectable charge number also extends over a range of 0-9, which is shared across the three third-level spatial light modulating elements 2218. Namely, a first, third-level spatial light modulating element 2218*a* can be adjusted over a range of 0-3, while a second, third-level spatial light modulating element 2218*b* can be adjusted over a range of 7-9, and a third, third-level spatial light modulating element 2218*c* can be adjusted over a range of 4-6, the ranges collectively spanning 0-9.

According to the example spatial light modulator 2210, the controller 2220 provides a first, third-level control signal 2238*a* to the first, third-level spatial light modulating elements 2218*a*, a second, third-level control signal 2238*b* to the second, third-level spatial light modulating elements 2218*b*, and a third, third-level control signal 2238*c* to the third, third-level spatial light modulating elements 2218*c*. According to the illustrative example, a value selected by the second, third-level control signal 2238*b* is 7, such that the third-level spatial light modulating element 2218*b* applies 700 twists to the angular momentum of the second-level twisted beam 2212*c* to produce a third-level twisted beam 2212*c* having 700+30+8=738 twists.

The illustrative example includes a second and third switchable elements 2222*b*, 2222*c* adapted to direct the second-level twisted beam 2212*c* to a selected one of the first, second or third, third-level spatial light modulating elements 2218*a*, 2218*b*, 2218*c*. The second and third switchable elements 2222*b*, 2222*c* operate according to second and third switch control signals 2242*b*, 2242*c*, respectively provided by the controller 2220. According to the illustrative example, the third switchable element 2222*c* receives the third switch control signal 2242*c* that selects the second, third-level spatial light modulating elements 2218*b* to direct the second-level twisted beam 2212*c* to the second, third-level spatial light modulating element 2218*b*. This particular selection is made, because the selected element 2218*b* is the one adapted to operate over a range, i.e., 7-9, including the selected value, i.e., 7. Had the selected value been between 0-3, i.e., to apply 0-300 twists, or between 4-6, to apply 400-600 twists, then the logic of the controller 2220 would have selected another one of the third-level spatial light modulating elements 2218*a*, 2218*c*.

In at least some embodiments, the controller 2220 derives an adjustment value based on the number of twists. The illustrative example of FIG. 22B encodes twists according to powers of 10. This approach allows each level, e.g., level of spatial light modulating elements 2214, 2216, 2218 to be adapted, or optimized to contribute a fine set of values, e.g., powers of 10. For example, 738 twists are required for a particular photon according to the encoder output signal. Each level of spatial light modulating element 2214, 2216, 2218 adds a certain range of values. Namely, the first level 2214 can only add 0-9 twists, while the second level 2216 can add 0, 10, 20, 30, . . . 90 twists, and the third level 2218 can add 0, 100, 200, . . . 900 twists. In some embodiments, the adjustment value can include one or more of the modulator level control signals, e.g., the first-level control signal 234, the second-level control signal 236*a*, 236*b*, and the third-level control signals 2238*a*, 238*b*, 238*c*. Alternatively or in addition, the adjustment value can include one or more of the first, second and third switch control signals 2242*a*, 2242*b*, 2242*c* alone or in combination with the one or more of the the first-level control signal 234, the second-level control signal 236*a*, 236*b*, and the third-level control signals 2238*a*, 238*b*, 238*c*.

The configuration of the example spatial light modulator 2210 can support optimization of mechanical components, such as the spiral phase plates. Instead of using a single spiral phase plate with granularity to support 1000 different twist values, e.g., the example 738 twists, several spiral phase plates are used having different granularities. It is envisioned that such an approach would reduce costs, increase speed and accuracy, because the different granularities provide larger targets to aim the impingent beam at, e.g., 1 out of 10 positions of a single spiral phase plate, instead of 1 out of 1000 positions.

In at least some embodiments, the controller 2220 receives an input value corresponding to a predetermined number of twists, e.g., 738. The controller 2220 generates one or more of the various signals 2234, 2236, 2238, 2242 to configure the adjustable spiral phase plates and to select the appropriate switching and/or light beam directing to direct the optical beam to the appropriate spiral phase plates to apply a number of twists to the input light beam 2212a that corresponds to the input value, e.g., 738 twists.

Figure 23A:
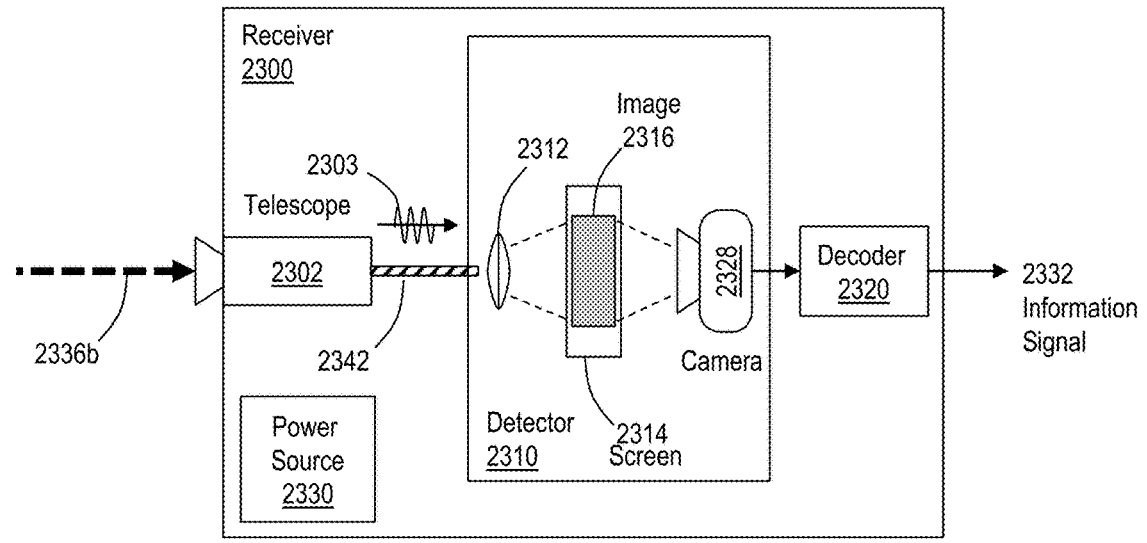
FIG. 23A is a block diagram illustrating an example, non-limiting embodiment of a free-space communication receiver in accordance with various aspects described herein.

FIG. 23A is a block diagram illustrating an example, non-limiting embodiment of a free-space communication receiver 2300 in accordance with various aspects described herein. The receiver 2300 can decode a twisted light message, e.g., corresponding to a twisted-light modem read. The receiver 2300 can be a receiver portion of the optical link transceiver 2004, which is adapted to collect or otherwise receive photons along a directed path from a nearby optical transmitter, e.g., at an adjacent node 1902 of the free-space communication network 1916 (FIG. 19). It is understood that the free-space links can be full duplex, e.g., transmitting and receiving photons simultaneously over the same free-space path. In at least some embodiments, optical devices, such as lenses, prisms, filters, screens, apertures and/or mirrors are used in the course of transmitting, collecting or otherwise processing photons at the communication node 2000.

The example receiver 2300 includes an optical device, such as a telescope 2302, a detector, or spatial light demodulator, 2310, a decoder 2320 and a power source 2330. The telescope 2302 is adapted to collect photons of a twisted light beam and to direct the captured photons to the detector 2310 by way of a received light beam 2303. In some embodiments, the received light beam 2303 can be directed toward the detector 2310 according to a free space link, e.g., an unguided beam from the telescope 2302. Alternatively or in addition, the received light beam 2303 can be directed toward the detector 2310 according to a light guiding structure 2342, such as a waveguide, a light pipe, and/or an optical fiber.

The detector 2310 is adapted to process the received light beam 2303 including twisted light to obtain physical parameters related to the orbital angular momentum, such as a number of twists. In at least some embodiments, the detector 2310 includes an image surface 2314 upon which an image 2316 produced in part by the received light beam 2303 is produced. The image 2316 can include one or more of an amplitude image, a phase image or an interference pattern. One or more of the images 2316 can be obtained by the received light beam 2303 directly. In some embodiments, the image is produced in cooperation with one or more optical elements 2312, such as lenes, filters, apertures, mirrors, prisms, and the like. Alternatively or in addition, one or more of the images 2316 can be obtained by combining the received light beam 2303 with another light beam. For example, an interference pattern can be formed according to an interference producing combination of the received light beam 2303 and a Gaussian beam. An image capture device or detector, such as a camera 2328 and/or a charged coupled device, can be positioned to access the images 2316. In at least some embodiments, the image capture device 2328 captures a copy of the image 2316 and provides the captured image for further processing. For example, further processing of the captured image can include determining a number of twists present in the received light beam 2303. The number of twists can be provided to the decoder 2320, which provides a decoded value based on the detected number of twists.

The optical device, or telescope 2302, can include one or more of a lens, a mirror, a prism, a filter, an aperture or a combination thereof. In at least some embodiments, the telescope 2302 reduces a diameter of a free-space twisted light beam to produce narrow diameter or focused twisted light beam 2303.

Figure 23B:
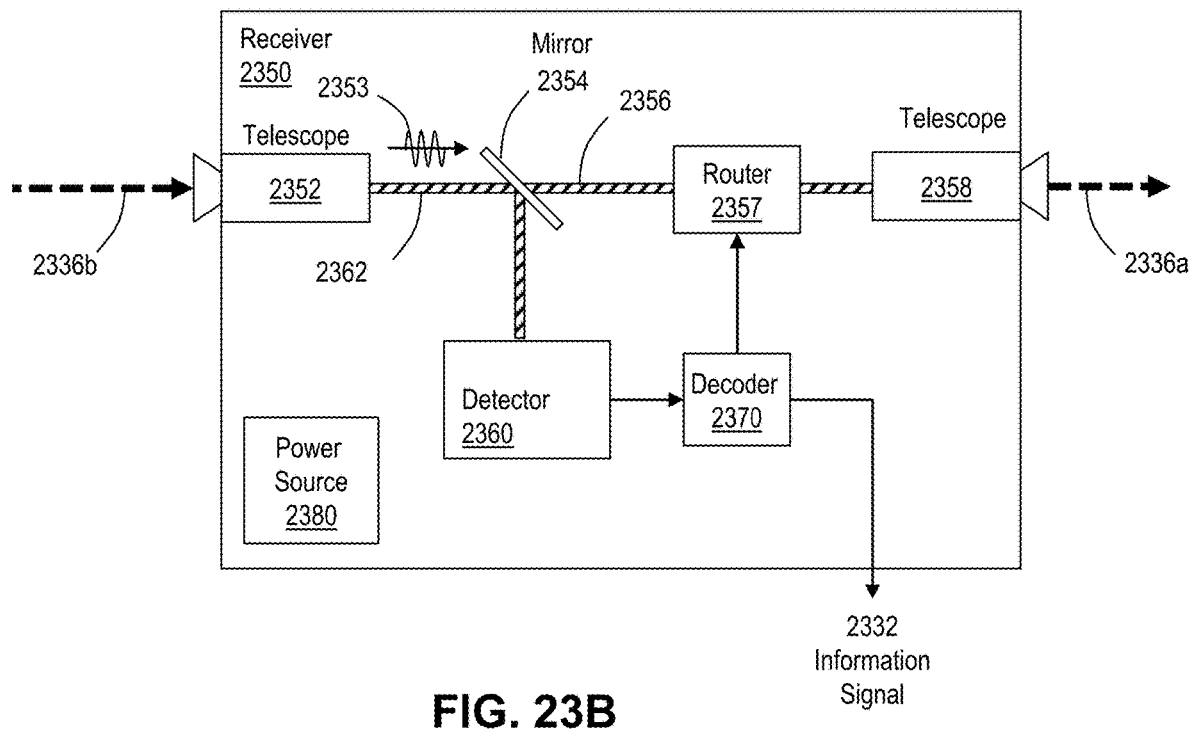
FIG. 23B is a block diagram illustrating an example, non-limiting embodiment of another free-space communication receiver in accordance with various aspects described herein.

FIG. 23B is a block diagram illustrating an example, non-limiting embodiment of another free-space communication receiver 2350 in accordance with various aspects described herein. The example receiver 2350 includes a first optical device, such as a first telescope 2352, a detector, or spatial light demodulator, 2360, a decoder 2370 and a power source 2380. The first telescope 2352 is adapted to collect photons of a twisted light beam 2336b and to produce a received twisted light beam 2353. A beam directing device, such as a mirror 2354 redirects at least a portion of the received light beam 2353 toward the detector 2360. In some embodiments, the received light beam 2353 can be directed toward the detector 2360 according to a free space link, e.g., an unguided beam from the telescope 2352. Alternatively or in addition, the received light beam 2353 can be directed toward the detector 2360 according to a light guiding structure 2362, such as a waveguide, a light pipe, and/or an optical fiber.

The detector 2310 is adapted to process the received light beam 2303 including twisted light to obtain physical parameters related to the orbital angular momentum, such as a number of twists. The number of twists can be provided to the decoder 2370, which provides a decoded value based on the detected number of twists. In at least some embodiments, the decoder 2370 can determine routing information, such as a routing table, next node and/or destination for content of the received twisted light beam 2353. The routing information can be provided to an optical routing device 2357 that selectively directs and/or redirects at least a portion of the received twisted light beam 2353 according to the routing information. According to the illustrative example, the received twisted light beam 2353 can be directed to a second optical device, such as a second telescope 2358 that directs the portion of the received twisted light beam 2353 towards another network node and/or destination via a free-space optical beam 2336a. In at least some embodiments, the decoder 2370 provides an information signal 2332 based on information decoded from the detected number of twists. Accordingly, an optical packet header can be read directly from the received light beam 2303.

Figure 24A:
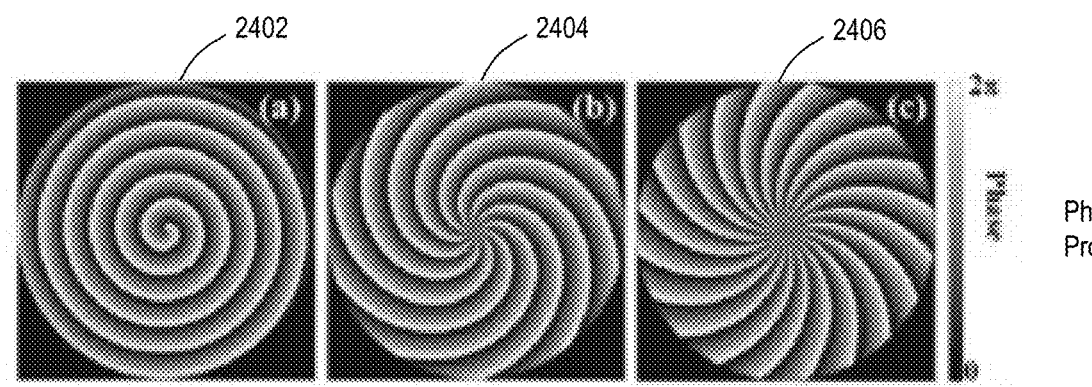
FIG. 24A-24C are block diagrams illustrating an example, non-limiting embodiment of spatial light patterns processed by the free-space communication systems of FIGS. 19-23B in accordance with various aspects described herein.
Figure 24B:
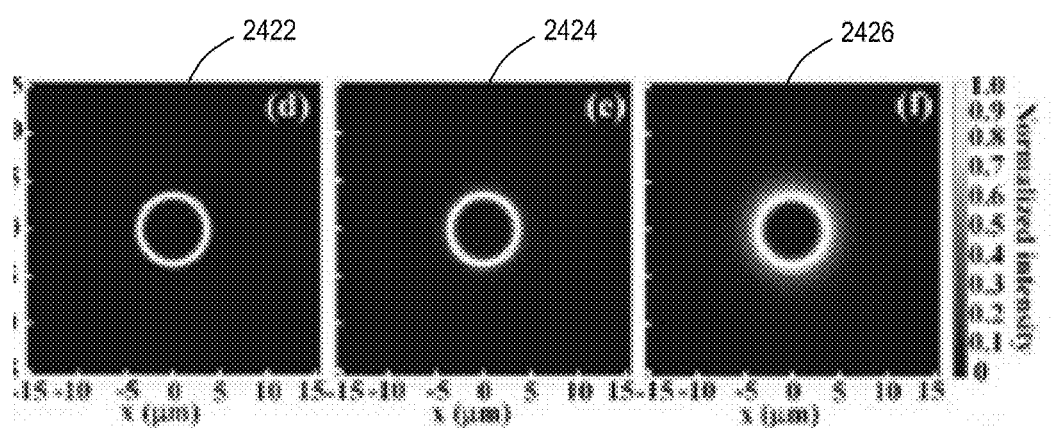
Figure 24C:
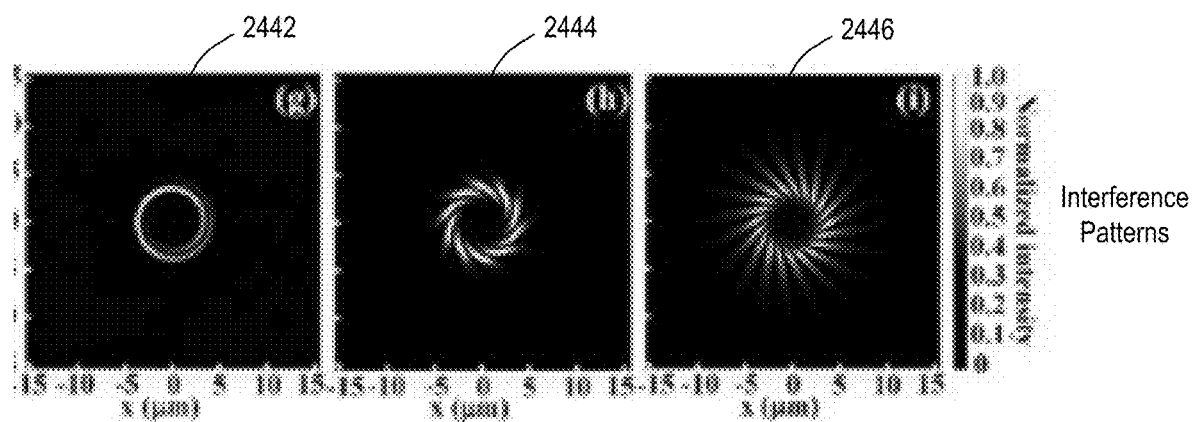

FIG. 24A-24C are block diagrams illustrating an example, non-limiting embodiment of spatial light patterns 2400, 2420, 2440 processed by the free-space communication systems of FIGS. 19-23B in accordance with various aspects described herein. In particular, FIG. 24A includes a first phase profile 2402 including a first spiral indicative of a twisted light beam having a single twist. A second phase profile 2404 includes a second spiral pattern indicative of a twisted light beam having 10 twists, and a third phase profile 2406 includes a third spiral pattern indicative of a twisted light beam having 20 twists. The number of arms of the spiral pattern corresponds to the number of twists of the twisted light beam.

In an optical vortex, otherwise known as "twisted light" or "topological charge", light is twisted like a corkscrew around its axis of travel. Because of the twisting, the light waves at the axis itself cancel each other out. When projected onto a flat surface, an optical vortex looks like a ring of light, with a dark hole in the center. This corkscrew of light, with darkness at the center, is called an optical vortex. FIG. 24B includes a first magnitude or intensity profile 2422 including a first ring indicative of a twisted light beam having a single twist. A second intensity profile 2424 includes a second ring pattern indicative of a twisted light beam having 10 twists, and a third intensity profile 2426 includes a third ring pattern indicative of a twisted light beam having 20 twists. One or more of the intensity, the diameter, and thickness of the ring pattern corresponds to the number of twists of the twisted light beam. According to the illustrative example, the intensity profile can be quantified into an intensity value that can be mapped to a number of twists.

FIG. 24C includes interference patterns 2442, 2444, 2446 obtained by interfering a twisted light beam with an untwisted light beam. A first interference pattern 2442 includes a first twisted shape indicative of a twisted light beam having a single twist. A second interference pattern 2444 includes a second twisted shape indicative of a twisted light beam having 10 twists, and a third interference pattern 2446 includes a third twisted shape indicative of a twisted light beam having 20 twists. The number of twists, or arms of the twisted shapes 2442, 2444, 2446 can be counted to obtain the number of twists of the twisted light beam. According to the illustrative example, the interference pattern can be quantified into an intensity value that can be mapped to a number of twists.

The illustrative patterns of FIGS. 24A-24C can be projected or otherwise produced on a surface to obtain an image. For example, the patterns can be projected onto a dark surface as projected through suitable filters, e.g., to obtain the phase, intensity and/or interference patterns. By counting the dark bands, just like counting the rings of a tree, to find its age, the rings can be counted to determine the number of twists. This allows more than one bit of information to be encoded onto a photon. For example, with 20 twists, the number 20, which represents five bits of information in binary 10100, can be represented by a single photon or group of photons of a common wavefront and/or pulse having an OAM value of 20, i.e., 20 twists One of the major bottlenecks in today's optical networks is routing. The vast majority of end user devices using electronic (i.e., digital) data (e.g., laptops, mobile devices, servers). Therefore, to make use of an optical channel, such as a fiber optic channel, digital information is first be translated (i.e., modulated) into optical information. Similarly, when an optical signal reaches its destination, it must again be re-translated (i.e., demodulated) back into a digital signal to be usable by a receiving device. This modulation/demodulation device is commonly referred to as a modem. The same issues are typically encountered when it comes to routing. Namely, IP routing is a digital event, so incoming optical packets are typically re-translated back into a digital packet, routed, and translated back to an optical packet before continuing along an optical network. Optical signals travel much faster than digital signals, so a natural bottleneck can occur at all end user devices and routing nodes.

Twisted light differs from other quantum phenomena in that is has a macroscopic visibility. The results of the twisting, or orbital angular momentum can be observed with the naked eye. Accordingly, a fully transparent optical router is achievable, which can provide a tremendous impact by allowing for significant increases in network throughput.

The following example discloses mechanisms of a twisted light modem adapted for reading the twisted light. In some sense, the twisted light reading device can be analogized to a barcode scanner adapted for reading twisted-light IP headers.

In the lab, scientists use photon detectors to "read" twisted light. In this type of setup, photodetectors are calibrated to measure a specific twisted state (normally 0-4). This type of read solution has numerous scaling issues when applied to a telecommunications network. Primarily the need to have a single detector per twisted state. This approach may be suitable for detecting a small number of twists, but would be impractical if not impossible for detecting large numbers of twists, e.g., tens, hundreds, thousands, millions of twists. A more efficient solution will be needed for twisted light read in order to make commercialization viable. Twisted read must match or better the performance of existing non-quantum optical modems.

Digital computers are adapted to view or otherwise process information as long strings of 1's and 0's. In the case of an image, these 1's and 0's can be arranged in an array, e.g., according to pixels having corresponding binary numbers that indicate pixel features, such as pixel intensity and/or color. The array can define a field of vision or a picture frame. Features portrayed within images, such as objects, edges of objects, one object in front of another object are common processes addressed in computer vision applications. Mathematical techniques can be used to build and/or evaluate an image in a systematic approach, e.g., up layer by layer. For example, the edges portrayed within an image are detected first, then objects are identified based on the edges and further disambiguated from a background. Next, overlapping objects can be specified, and ultimately objects can be classified and identified. This technology is foundational in myriad technologies including photo editors, e.g., PHOTOSHOP®, facial recognition, video gaming, virtual reality (VR), and self-driving cars.

The case of self-driving cars is of particular importance to the twisted light read problem. In this case, more than most time optimization is paramount. Obviously, the self-driving car only has instances to identify an unexpected pedestrians dashing out in front of it. Seconds to slam on the breaks. Thus, any computer vison algorithm must process information quickly. Machine learning and/or artificial intelligence classification and search space categories can be applied to such applications. Some machine learning algorithms perform a bulk of the compute at a time of query (e.g., regressions), while others do the bulk of their compute prior to the time of query (e.g., neural networks). In the latter case, very large numbers, e.g., millions upon millions of "test cases," can be pumped into the system. When the artificial intelligence is "primed" it knows exactly what its looking for. Computers are well adapted for rapidly matching a closest fit. This is how a self-driving car can react faster than a human driver (if it has been trained on the particular instance it must identify).

A similar approach can be applied to a twisted light modem read operation. The number of twists does not necessarily need to be determined immediately as the light pulse arrives, but artificial intelligence and/or machine learning can be applied to images produced by the received light beam, e.g., as in FIGS. 24A-24C, to recognize the potential patterns it could take. Such image recognition approach can support a real-time read. The only apparent temporal limitation is a speed at which images of the photon pulse are captured. The science of femtosecond photography is advancing at a rapid case. A recent breakthrough, An extremely fast, e.g., a 10 trillion frame-per-second camera, such as devices being developed by researchers at Cal Tech, would be necessary adapted to capture light in slow motion—according to recent breakthroughs, researchers have managed to photograph a single photon, which is a significant improvement over past femtosecond cameras that relied upon a "streak" method. According to the streak method, cameras where left running and then when a rate of photon emission was calculated, then cameras were reset to take advantage to their foreknowledge on when the photon was predicted to appear. This can be considered as an "ambush" technique, whereby a fortunate coincidence is necessary to obtain a photon image. The latest femtosecond cameras react fast enough to capture an image of a single photon in flight, without any foreknowledge of its emission rate. Such rapid camera technology can be applied to the techniques disclosed herein, e.g., image capture, to photograph photons in real time.

Figure 25:
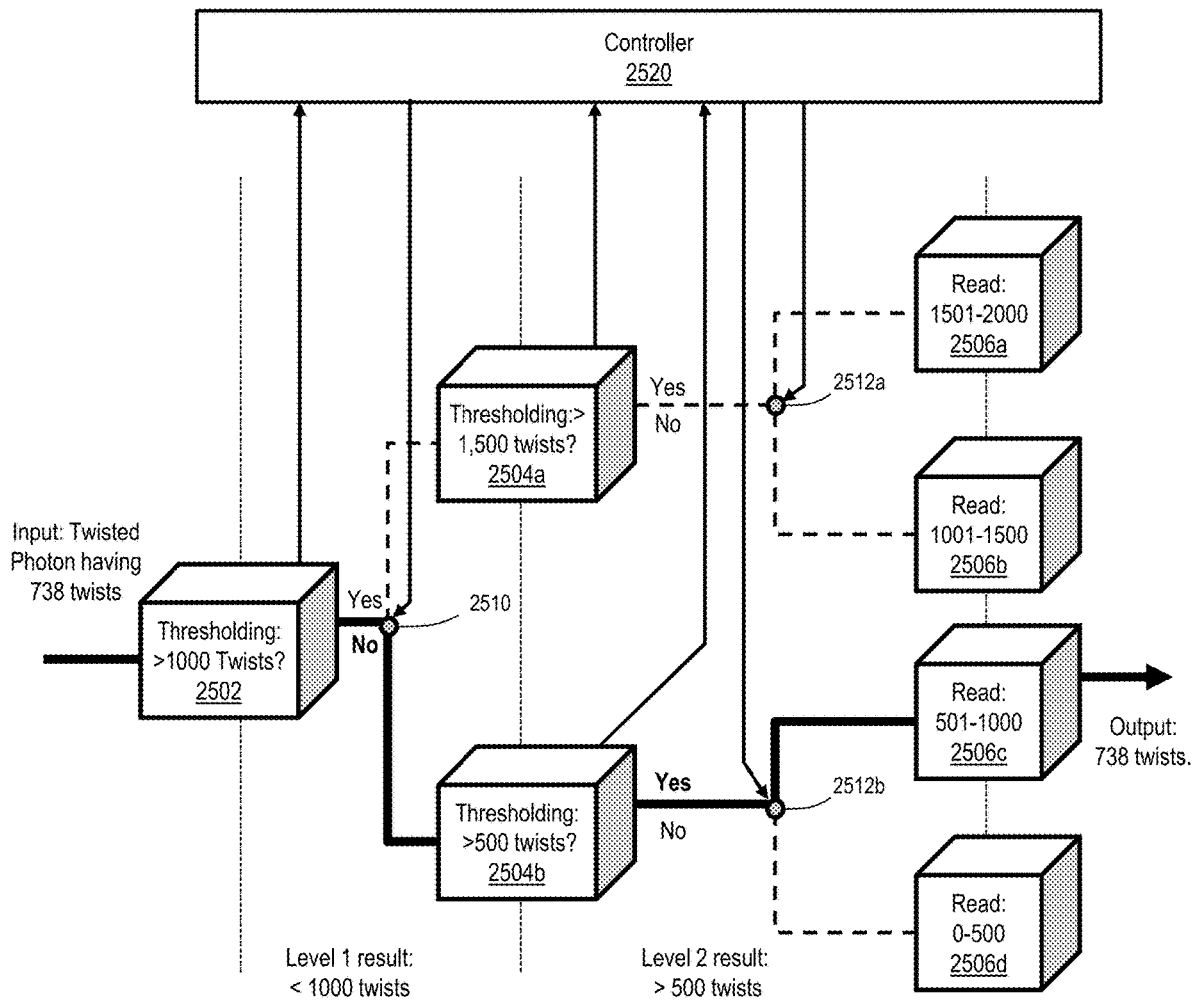
FIG. 25 is a block diagram illustrating an example, non-limiting embodiment of a twisted light demodulator in accordance with various aspects described herein.

By combining these advanced femtosecond cameras with deep learning computer vision, a twisted modem read can be performed at time intervals and/or rates that approach light speed. Consequently, a rate of a date read is not dependent on the size of the data. It would take just as long to read a photon with 1 bit of data, as it would to read a photon with 10, 100, 1,000 or 10 trillion bits of data. It is understood that it would take significantly longer time to train an AI engine to learn the difference between 1 twists vs 2 twists, vs. every consecutive number of twists from 1 to some maximum number, e.g., 10 trillion. But once learned, then the pattern could be applied to obtain a match be nearly instantaneous. In at least some embodiments, a divide-and-conquer distributed categorization approach can be applied to expedite and/or optimize such an AI read approach. As disclosed in more detail below, different deep learning AIs are trained to recognize different ranges of twists. Processing proceeds according to the recognized ranges to the exclusion of other ranges FIG. 25 is a block diagram illustrating an example, non-limiting embodiment of a twisted light demodulator 2500 in accordance with various aspects described herein. The twisted light demodulator 2500 includes a first-level AI module 2502 adapted to determine whether a received twisted light beam has greater than 1,000 twists. The twisted light demodulator 2500 further includes a group of second-level AI modules 2504a, 2504b, generally 2504. A first AI module 2504a of the group of second-level AI modules is adapted to determine whether the received twisted light beam has greater than 1,500 twists. Similarly, a second AI module 2504b of the group of second-level AI modules is adapted to determine whether the received twisted light beam has greater than 500 twists. The twisted light demodulator 2500 further includes a group of third-level AI modules 2506a, 2506b, 2506c, 2506d, generally 2506. A first AI module 2506a of the group of third-level AI modules is adapted to determine whether a number of twists of the received twisted light beam is between 1,501 and 2,000. Similarly, a second AI module 2506b of the group of third-level AI modules is adapted to determine whether the number of twists of the received twisted light beam is between 1,001 and 1,500, a third AI module 2506c of the group of third-level AI modules is adapted to determine whether the number of twists of the received twisted light beam is between 501 and 1,000, and a fourth AI module 2506d of the group of third-level AI modules is adapted to determine whether the number of twists of the received twisted light beam is between 0 and 500.

The twisted light demodulator 2500 also includes a controller 2520 in communication with each of the AI modules 2502, 2504 2506. The controller 2520 receives indications from the AI modules 2502, 2504, 2506 as to a determined range of twists. The twisted light demodulator 2500 further includes a first light directing device 2510 positioned along an optical path between an output of the first-level AI module 2502 and inputs of each of the second-level AI modules 2504a, 2504b, a second light directing device 2512a positioned along an optical path between an output of the first second-level AI module 2504a and inputs of each of the first and second third-level AI modules 2506a, 2506b, and a third light directing device 2512b positioned along an optical path between an output of the second, second-level AI module 2504b and inputs of each of the third and fourth third-level AI modules 2506c, 2506d.

The first light directing device 2510 receives a command from the controller 2520 that directs a twisted light beam from the output of the first-level AI device 2502 to a selected one of the second-level AI devices 2504 according to a thresholding determination received from the first-level AI module 2502. Likewise, the second light directing device 2512a receives a command from the controller 2520 that directs a twisted light beam from the output of the first, second-level AI device 2504a to a selected one of the first and second, third-level AI devices 2506a, 2506b according to a thresholding determination received from the first, second-level AI module 2504a. The third light directing device 2512b also receives a command from the controller 2520 that directs a twisted light beam from the output of the second, second-level AI device 2504b to a selected one of the third and fourth, third-level AI devices 2506c, 2506d according to a thresholding determination received from the second, second-level AI module 2504b. Accordingly, a received twisted light beam having between 0-2,000 twists can be directed to a suitable detector adapted to recognize not more than 500 twists.

According to the illustrative example, a twisted light beam having 738 twists is recognized by the first-level AI module as having less than 1,000 twists. The controller 2520 receives a signal from the first-level AI module 2502 indicating the determined result and controls the first light directing device 2510 to direct the received twisted light beam toward the second, second-level AI module 2504b. The twisted light beam having 738 twists is recognized by the second, second level AI module 2504a as having more than 500 twists. The controller 2520 receives a signal from the second, second-level AI module 2504b indicating the determined result and controls the third light directing device 2512b to direct the received twisted light beam toward the third, third-level AI module 2506c, which is adapted to recognize or otherwise read a number of twists between 501 and 1000. The third, third level AI module 2506c determines that the received twisted light beam has 738 twists. The output can be provided to a decoder that decodes 738 twists to a corresponding value, such as a pixel value of an image conveyed by the twisted light beam. Accordingly, each AI unit is trained on a specific task. Some can be filters, e.g., AI modules 2502, 2504 while other AI modules can be readers, e.g., AI modules 2506. The example divide-and-conquer strategy narrows down the possible range of values and forwards that input to the correct AI module 2506 including an image reader for final analysis and/or determination.

It is understood that in at least some embodiments, image processing techniques can be applied to evaluation and/or analysis of one or more of the images 2402, 2404, 2406, 2422, 2424, 2426, 2442, 2444, 2446. Image processing can include, without limitation, one or more of the following edge detection, pattern recognition, classification, feature extraction, projection, diffusion, image restoration, filtering, e.g., spatial lowpass filtering, spatial highpass filtering, Fourier transformations, Fourier lowapss, Fourier highpass, rotational transformation, scaling, reflections, shear transformation, pixellation, wavelets, and so on.

Figure 26:
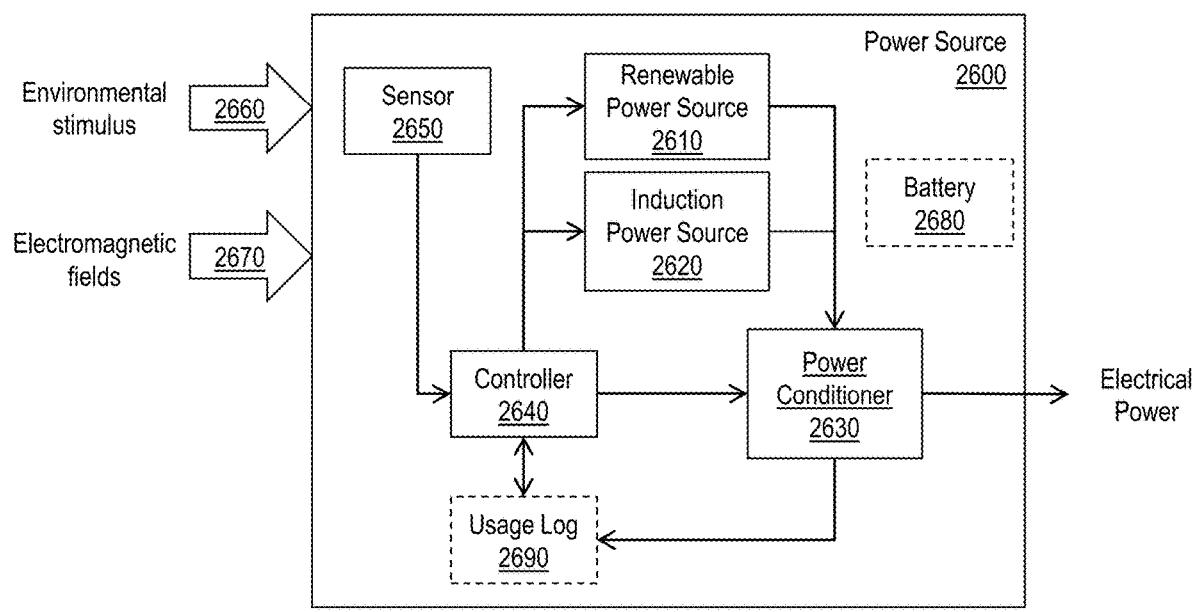
FIG. 26 is a block diagram illustrating an example, non-limiting embodiment of a power source in accordance with various aspects described herein.

FIG. 26 is a block diagram illustrating an example, non-limiting embodiment of a power source 2600 in accordance with various aspects described herein. The power source 2600 includes a renewable power source 2610 adapted to harvest energy from a renewable source, such as solar or wind. The power source 2600 also includes an induction power source 2620 adapted to harvest energy from an electromagnetic power line field. Each of the renewable power source 2610 and the induction power source 2620 are in communication with a controller 2640. The power source 2600 generally receives environmental stimulus 2660, e.g., sunlight 1914 (FIG. 19), wind, precipitation, humidity, and the like. Likewise, the power source 2600 receives input from the electromagnetic fields 2670 of the power lines.

The controller 2640 is adapted to operate and/or selectively apply one or both of the renewable power source 2610 and the induction power source 2620 to a twisted light processing device. In at least some embodiments the power source 2600 includes one or more of a sensor 2650 and a power conditioner 2630. The sensor can include, without limitation, an environmental sensor, such as a light sensor, a wind-speed and/or wind direction sensor, a humidity sensor, a temperature sensor, and the like. The controller 2640 can be adapted to selectively control operation of one or more of the renewable power source 2610, the induction power source and/or the power conditioner 2630 according to inputs obtained from the one or more sensors 2650.

In at least some embodiments, the controller 2640 is adapted to selectively activate and/or apply one of the renewable power source 2610 and the induction power source 2620 over the other. For example, the controller 2640 can selectively apply the renewable power source 2610 to the power conditioner 2630 for powering associated twisted light processing equipment instead of the induction power source 2620. The controller 2640 can make such determinations according to one or more of environmental conditions as determined by the sensors 2650, e.g., if there is adequate sunlight and/or wind speed. Alternatively or in addition, the controller 2640 can make such determinations according to a time of day, a calendar day of the week, month and/or year, power requirements and/or power loading conditions of the associated twisted light processing equipment, e.g., according to a load impedance, a current draw, a voltage drop and the like.

In at least some embodiments, one or more of the renewable power source 2610, the induction power source 2620 and the power conditioner 2630 includes a rechargeable battery 2680. It is envisioned that in at least some embodiments, a single rechargeable battery can be recharged by one or more of the renewable power source 2610 and the induction power source 2620. In at least some embodiments, a charging of the rechargeable battery can be controlled by the controller 2640, e.g., selectively charging only when renewable power source 2610 has sufficient capacity. Preferably, the controller 2640 is adapted to minimize dependence upon the induction power source to minimize a drain on the power line, thereby keeping power line metering costs low. In at least some embodiments the power source 2600 includes a recorder and/or a usage log 2690. The usage log 2690 can monitor power usage and/or power sources over periods of time. Such usage log data can be used in determining metering costs, without necessarily metering the power obtained from the power line fields directly. Instead, a metering value can be determined according to one or more of a duration of time that power was obtained from the induction power source 2620. In some embodiments, a corresponding power consumption value can be obtained, e.g., from the power conditioner 2630 that when considered in combination with the time and/or duration can be used to determine an approximate power consumption of the power line fields.

Figure 27:
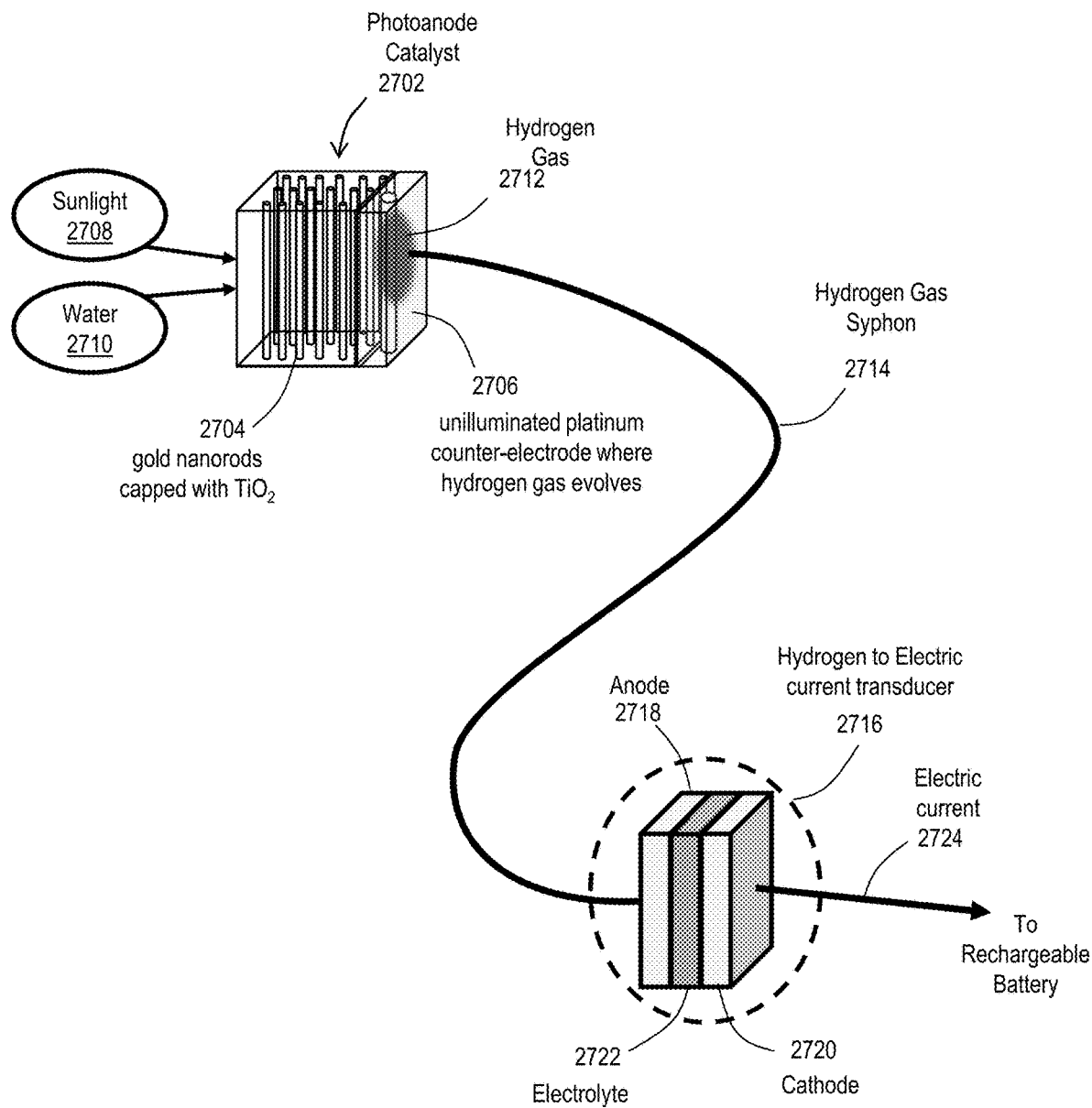
FIG. 27 is a block diagram illustrating an example, non-limiting embodiment of a renewable power source portion of the power source of FIG. 26 in accordance with various aspects described herein.

FIG. 27 is a block diagram illustrating an example, non-limiting embodiment of a renewable power source portion 2700 of the power source of FIG. 26 in accordance with various aspects described herein. The renewable power source 2700 includes a photo-anode catalyst 2702 in communication with a hydrogen to electric current transducer via a hydrogen gas syphon 2714. The photo-anode catalyst 2702 includes an array of gold nanorods capped with $TiO_2$. The photo-anode catalyst 2702 further includes an unilluminated platinum counter-electrode positioned in close proximity to the array of nanorods 2704. In operation, the photo-anode catalyst 2702, when exposed to sunlight 2708 and water 2710, e.g., precipitation, dew, humidity, mist, fog, produces hydrogen gas 2712 at the unilluminated platinum counter-electrode 2706.

The hydrogen gas is syphoned away from the photo-anode catalyst 2702 by the hydrogen gas syphon 2714. The hydrogen gas syphon 2714 transports the hydrogen gas to the hydrogen-to-electric current transducer 2716. The transducer 2716 includes an anode 2718 and a cathode 2720 separated by an electrolyte 2722. When exposed to the hydrogen gas, the hydrogen-to-electric current transducer 2716 generates an electrical current 2724 that can be used to charge a rechargeable power source, such as a rechargeable battery and/or to provide electrical power to circuitry of the twisted light processing circuits.

Figure 28:
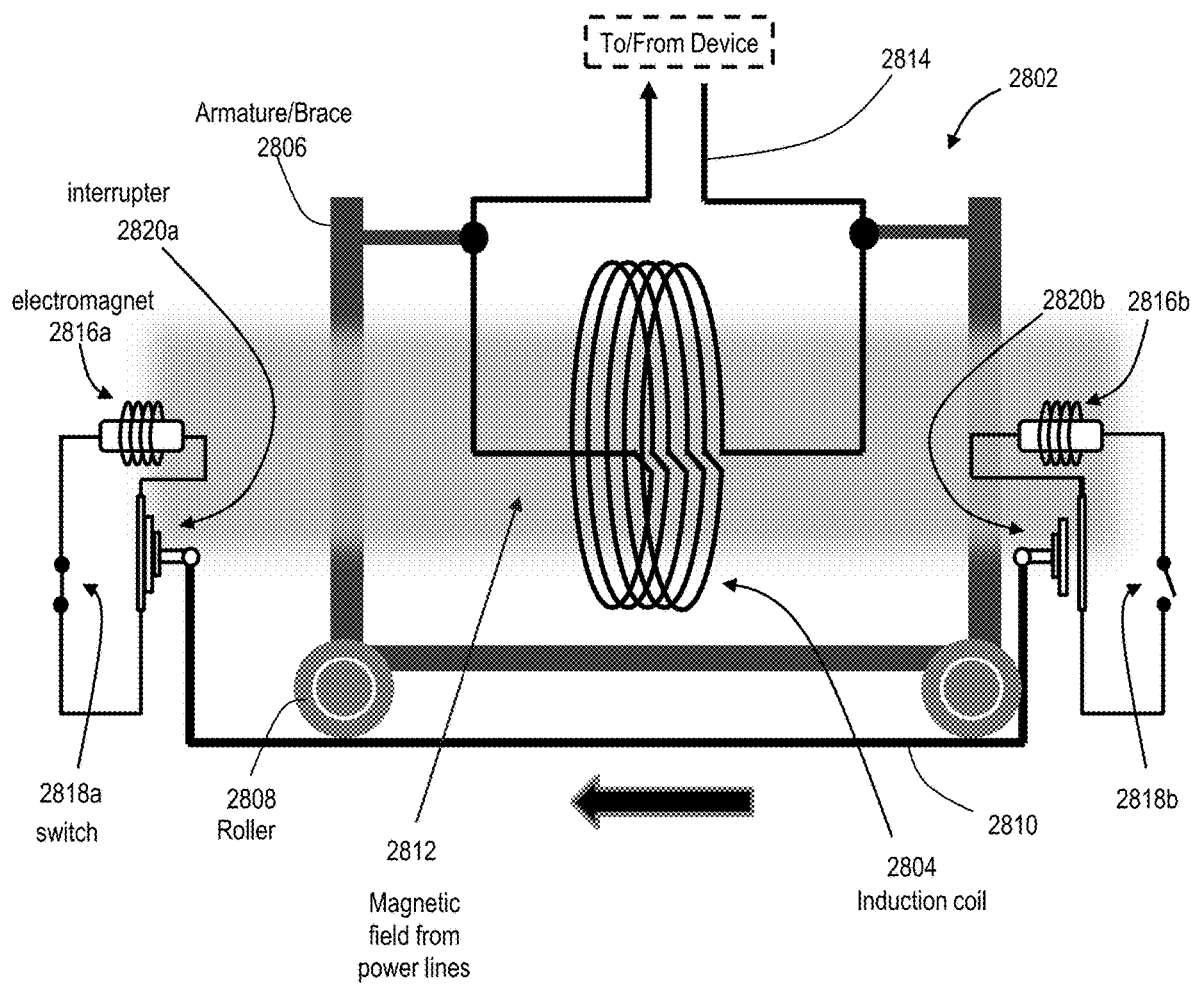
FIG. 28 is a block diagram illustrating an example, non-limiting embodiment of an induction power source portion of the power source of FIG. 26 in accordance with various aspects described herein.

FIG. 28 is a block diagram illustrating an example, non-limiting embodiment of an induction coil power source portion 2800 of the power source of FIG. 26 in accordance with various aspects described herein. The induction coil power source 2800 includes an armature assembly 2802, including an induction coil 2804 attached to a brace or frame 2806. The frame 2806 includes wheels or roller bearings 2808 that allow the frame 2806 to translate along a guide, e.g., a rail or track 2810. The armature assembly 2802 is positioned within an electromagnetic field 2812 of a power line, such that field lines of the magnetic field 2812 are "cut" as the armature assembly 2802 moves along the guide 2810. The cutting of the magnetic field lines produces an electrical current within an electrical circuit including the induction coil 2804, such that a voltage is produced at terminals 2814 of the electrical circuit.

A pair of electromagnets 2816a, 2816b, generally 2816 are positioned at opposite ends of the guide 2810. The frame 2806 includes an iron portion at each end, opposing a respective electromagnet 2816, such that the frame 2806 is selectively attracted to one of the electromagnets 2816, when energized. According to the illustrative embodiment, only one of the electromagnets 2816 is energized at any given time to promote a translation of the armature assembly 2802 causing the induction coil 2804 to cut lines of the magnetic field 2812 to produce a voltage potential at the terminals 2814. In particular, each electromagnet 2816 is connected in series with a corresponding switch 2818a,

2818*b*, generally 2818. As one of the switches 2818 is closed, it completes a circuit thereby energizing the respective electromagnet 2816.

A pair of interrupters 2820*a*, 2820*b*, generally 2820 are provided, one interrupter 2820 in series with each of the electromagnets 2816. The interrupters 2820 ensure that only one electromagnet 2816 is energized at any given time. According to the illustrative example, the armature assembly is located at a right hand portion of the track 2810. A first interrupter 2820*a*, positioned at a left hand portion of the track 2810 is engaged to cause the first switch 2818*a* to close. Closure of the first switch 2818*a* energizes the first electromagnet 2816*a*, which draws the armature frame 2806 to the left as indicated by the arrow. At the same time, the second interrupter 2820*b* positioned at the right hand portion of the track 1820 is disengaged, such that the second switch 2818*b* is opened. Opening of the second switch 2818*b* de-energizes the second electromagnet 2816*b*, thereby removing any magnetic force that might otherwise attract the armature frame 2806. De-energizing the second electromagnet 2820*b* allows the armature frame 2806 to move towards the left, as indicated.

The interrupters 2820 are configured such that the first interrupter 2820*a* will disengage responsive to the armature frame 2806 having travelled fully to the left along the track 2810, while the second interrupter 2820*b* will engage. The selective engagement/disengagement of the interrupters 2820 controls the switches which alternate the energizing/de-energizing of the electromagnets 2816 to cause the armature assembly 2802 to move in a back and forth motion between the two electromagnets 2816. The back and forth motions create oscillation within the induction coil 2804.

Figure 29:
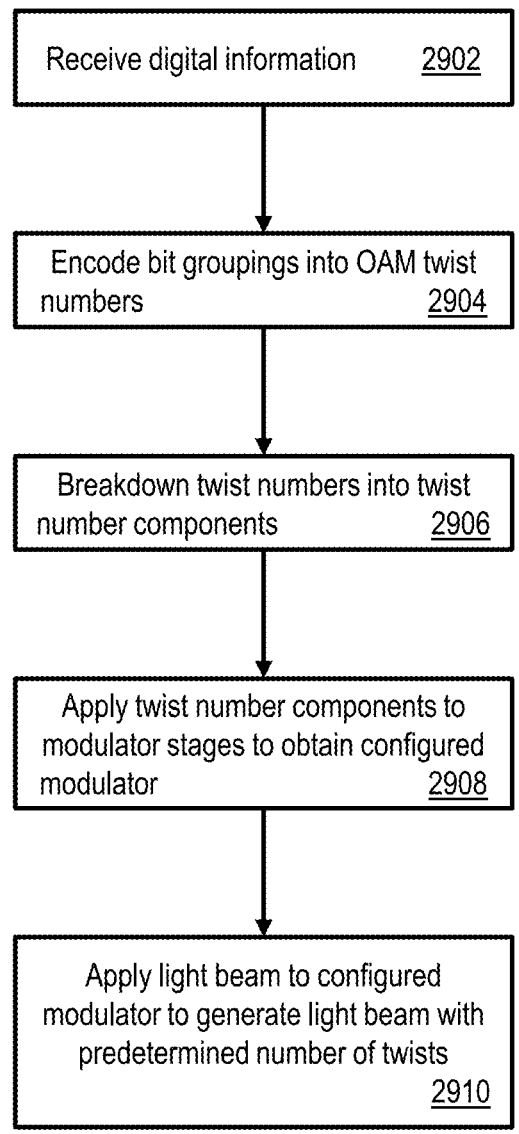
FIG. 29 illustrates a flow diagram of an example, non-limiting embodiment of a twisted light modulation process in accordance with various aspects described herein.

FIG. 29 illustrates a flow diagram of an example, non-limiting embodiment of a twisted light modulation process 2900 in accordance with various aspects described herein.

Digital information is received at 2902. Digital information can include machine-readable files, images, that may or may not be encoded, e.g., binary, octal hexadecimal, ASCII and so on. Bit groupings of the received digital information can be encoded into OAM twist numbers at 2904. For example, a system capable of supporting OAM twists between 0-99 can encode digital values from 0000000 to 1100011. Accordingly, a single twist number, i.e., 0-99, can encode up to 6, or in at least some instances, 7 bits of information.

Twist number can be broken down into twist number component at 2906. For example, an example twist number of 67 can be broken down into a first twist component representing a 10's value, i.e., "6" and a second twist component representing a 1's value, i.e., "7." The individual twist components can be applied to respective modulator stages to obtain a configured modulator at 2908. According to the illustrative example, a first modulator stage corresponding to a $10^1$ value, is adjusted, set or otherwise commanded or controlled to a value of "6." Likewise, a second modulator stage corresponding to a 10° value, is adjusted, set or otherwise commanded or controlled to a value of "7."

A light beam is applied to the configured modulator to generate light beam with predetermined number of twists at 2910. According to the illustrative example, a light beam is applied to the first modulator stage to obtain 6 twists, while the light beam is applied to the second modulator stage to obtain 7 twists. A combination of the twists from the two stages can produce a resultant twisted beam having 67 twists. In some embodiments, an output of one stage is fed as an input of a second stage, such that the twists are additive to obtain a single resultant twisted beam suitable for free-space transmission. Alternatively or in addition, the same light beam is applied to both modulator stages, e.g., simultaneously, to produce two separate twisted beam components. According to the illustrative embodiment, a first twisted beam component having 6 twists and a second twisted beam component having 7 twists.

The two twisted beam components can be combined according to a multiplexing scheme to obtain a multiplexed beam. Without limitation, multiplexing can include spatial multiplexing, wavelength multiplexing, time division multiplexing, or combinations thereof. A receiver is adapted to receive the multiplexed beam and apply a de-multiplexing process to obtain the individual twisted beam components. The multiplexing scheme is adapted to preserve an identification as to which beam component corresponds to which stage of the modulating process. For example, the identifications can be preserved according to their respective positions in a spatially multiplexed scheme, their respective wavelengths in a wavelength multiplexing scheme and/or their respective time slots in a time division multiplexing scheme.

Figure 30:
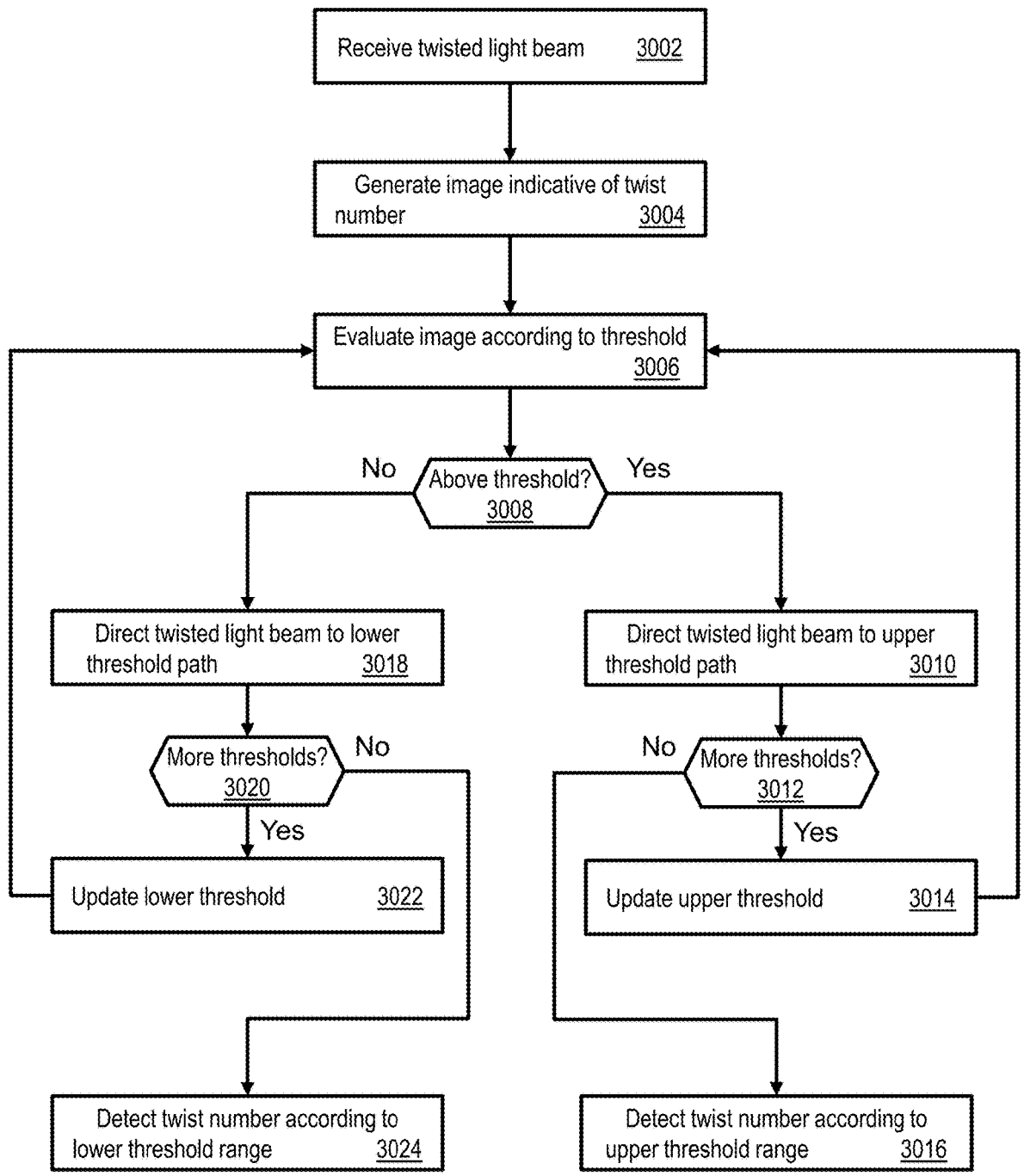
FIG. 30 illustrates a flow diagram of an example, non-limiting embodiment of a twisted light demodulation process in accordance with various aspects described herein.

FIG. 30 illustrates a flow diagram of an example, non-limiting embodiment of twisted light demodulation process in accordance with various aspects described herein.

A twisted light beam is received at 3002. The twisted light beam can be received via a free-space optical link from another optical communication node of an optical communication network. It is understood that an information carrying optical beam according to the disclosed embodiments, will include an orbital angular momentum (OAM) value that corresponds to encoded information, allowing for a transport of information according to the OAM.

An image indicative of a twist number of the received optical beam is generated at 3004. The generated image can be any one or more of the example images 2402, 2404, 2406, 2422, 2424, 2426, 2442, 2444, 2446 of FIGS. 24A-24C. Images can be obtained by one or more of projection onto a surface, combination with other optical beams, e.g., to produce an interference pattern, and the like.

The generated images are evaluated according to threshold at 3006. For example, one or more of a phase profile, an intensity profile or an interference pattern can be analyzed to determine an estimate of a number of twists. In at least some embodiments, the evaluation is accomplished directly on the optical beam, without first having to convert an optical signal carried by the optical beam to an electrical signal.

A determination is made at 3008 as to whether a number of twists of the received twisted light beam is above threshold. To the extent it is determined at 3008 that the number of twists is above the threshold, the twisted light beam is directed to an upper threshold path at 3010. Directing and/or re-directing of the twisted light beam can be accomplished using one or more of an optical switch, an optical mirror, a prism, an lens, and aperture, a waveguide, a light pipe, and so on. For example, a controller can provide a switch signal to a mirror to redirect the optical beam based on an image analysis result indicating that the number of twists is above the threshold.

In some embodiments, a single threshold is applied. In at least some embodiments, more than one thresholds are applied. The illustrative process applies the thresholds in a sequential manner. For example, a determination is made at 3012 as to whether there are any more thresholds to be evaluated. To the extent it is determined at 3012 that there is another upper threshold, the upper threshold is updated at 3014. The process 3000 continues from step 3006 using the new upper threshold. The process can be repeated in a like manner until all of the thresholds have been evaluated. To the extent it is determined at 3012 that there are no other upper thresholds, a twist number is detected according to upper threshold range at 3016.

Likewise, to the extent it is determined at 3008 that the number of twists is not above the threshold, the twisted light beam is directed along a lower threshold path at 3018. A determination is made at 3020 as to whether there are any more thresholds to be evaluated. To the extent it is determined at 3020 that there is another lower threshold, the lower threshold is updated at 3022. The process 3000 continues from step 3006 using the new lower threshold. The process 3000 can be repeated in a like manner until all of the thresholds have been evaluated. To the extent it is determined at 3020 that there are no other lower thresholds, a twist number is detected according to a lower threshold range at 3024.

Figure 31:
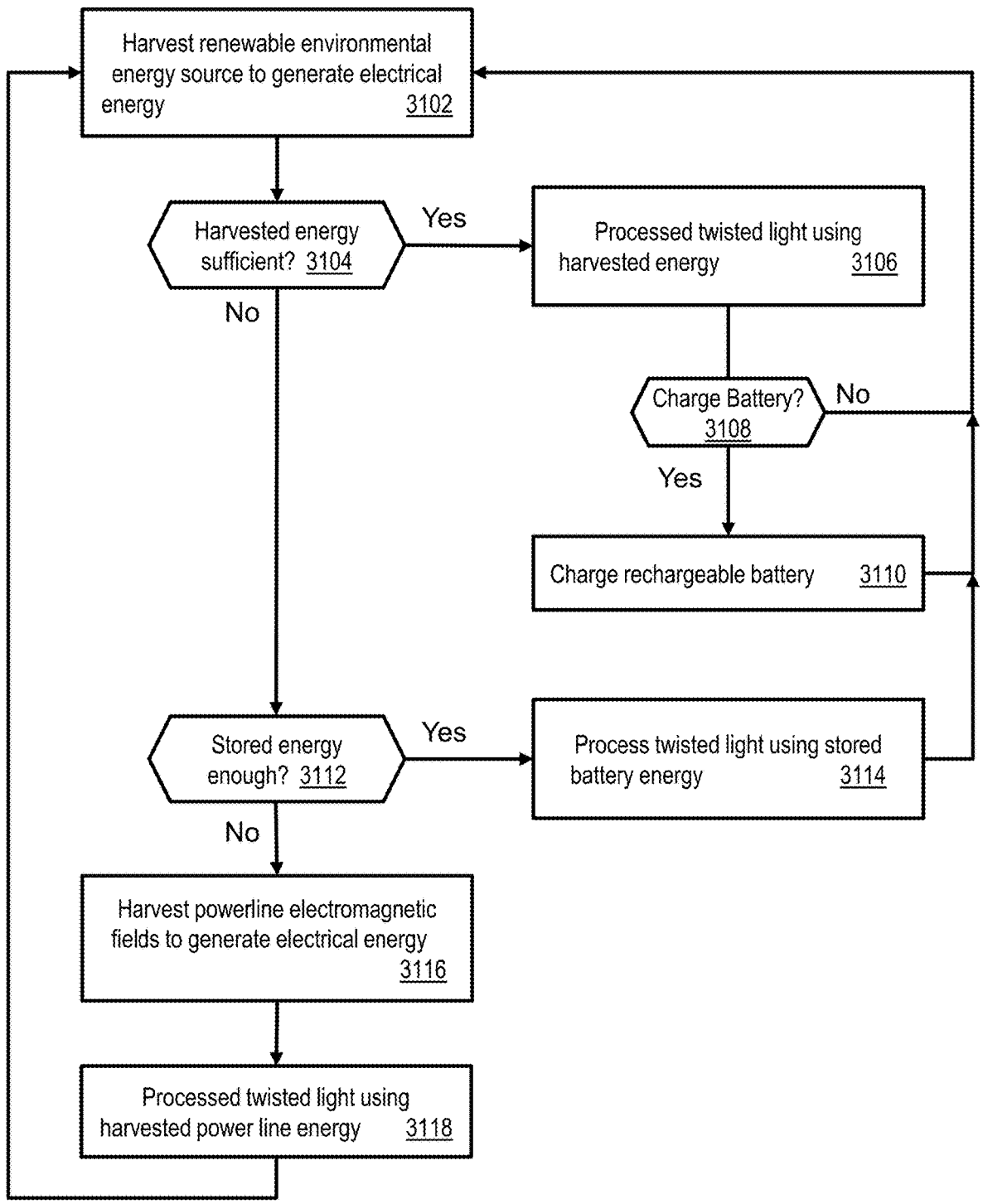
FIG. 31 illustrates a flow diagram of an example, non-limiting embodiment of a power management process in accordance with various aspects described herein.

FIG. 31 illustrates a flow diagram of an example, non-limiting embodiment of a power management process 3100 in accordance with various aspects described herein. At least one renewable environmental energy source is harvested at 3102 to generate electrical energy. Renewable environmental energy sources can include without limitation, solar, wind, water and combinations thereof. A determination is made at 3104 as to whether the harvested renewable environmental energy is sufficient to power any and/or all powered devices of a corresponding free-space communications node. To the extent it is determined that the harvested renewable environmental energy is sufficient, twisted light is processed using the harvested renewable environmental energy at 3106.

A determination is made at 3108 as to whether a rechargeable battery should be recharged. To the extent it is determined that the rechargeable battery should not be recharged, the process 3100 continues from step 3102. To the extent it is determined that the rechargeable battery should be recharged, the battery is recharged at 3110. Preferably, the rechargeable battery is recharged using the harvested renewable environmental energy. The process 3100 continues from step 3102.

To the extent it is determined at 3104 that the harvested renewable environmental energy is insufficient, a further determination is made at 3112 as to whether the electrical energy stored in the rechargeable battery is sufficient. To the extent it is determined at 3112 that the stored electrical energy is sufficient, twisted light is processed using the stored electrical energy at 3114. The process continues from step 3102. However, to the extent it is determined at 3112 that the stored electrical energy is insufficient, powerline electromagnetic fields are harvested at 3116 to generate electrical energy. The twisted light is processed using the harvested powerline energy 3118.

In at least some embodiments, twisted light is processed using any available energy except the harvested powerline energy. Namely, the harvested powerline energy is used as an energy source of last resort to reduce drawing metered energy from the powerlines.

While for purposes of simplicity of explanation, the respective processes are shown and described as a series of blocks in FIGS. 29-31, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It is further appreciated that the foregoing embodiments of FIGS. 19-30 can be combined in whole or in part with one another, and/or can be combined in whole or in part with other embodiments of the subject disclosure, and/or can be adapted for use in whole or in part with other embodiments of the subject disclosure.

It is further appreciated that any of the embodiments of the subject disclosure (singly or in any combination) which are adaptable for transmitting or receiving communication signals can be utilized as network elements for the distribution and/or routing of media content, voice communications, video streaming, internet traffic or other data transport. It is further appreciated that such network elements can be adapted or otherwise utilized in a communication network described below in relation to FIG. 32 for the distribution or routing of media content, voice communications, video streaming, internet traffic or other data transport. It is also appreciated that such network elements can also be configured to utilize virtualized communication network techniques described below in relation to FIG. 33.

Figure 32:
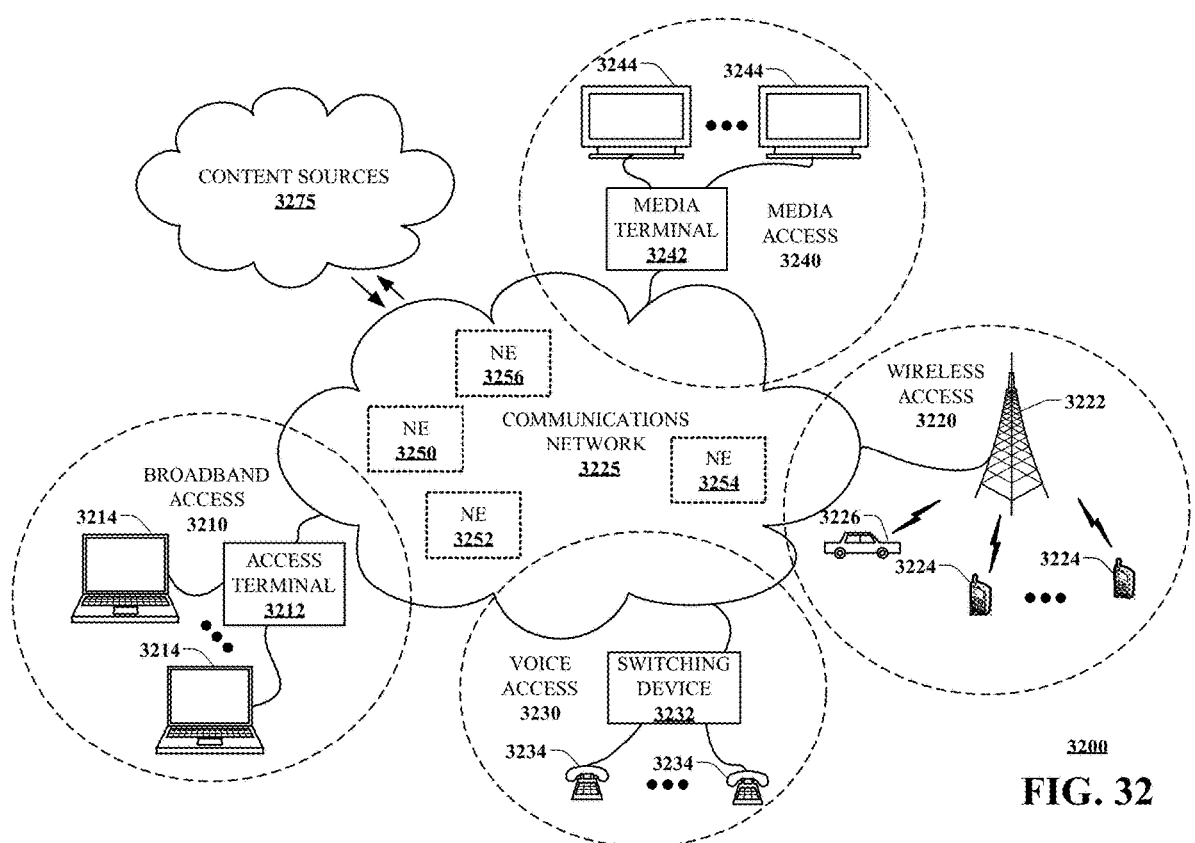
FIG. 32 is a block diagram illustrating an example, non-limiting embodiment of a communications network in accordance with various aspects described herein.

Referring now to FIG. 32, a block diagram is shown illustrating an example, non-limiting embodiment of a communications network 3200 in accordance with various aspects described herein. In particular, a communications network 3225 is presented for providing broadband access 3210 to a plurality of data terminals 3214 via access terminal 3212, wireless access 3220 to a plurality of mobile devices 3224 and vehicle 3226 via base station or access point 3222, voice access 3230 to a plurality of telephony devices 3234, via switching device 3232 and/or media access 3240 to a plurality of audio/video display devices 3244 via media terminal 3242. In addition, communication network 3225 is coupled to one or more content sources 3275 of audio, video, graphics, text and/or other media. While broadband access 3210, wireless access 3220, voice access 3230 and media access 3240 are shown separately, one or more of these forms of access can be combined to provide multiple access services to a single client device (e.g., mobile devices 3224 can receive media content via media terminal 3242, data terminal 3214 can be provided voice access via switching device 3232, and so on).

The communications network 3225 includes a plurality of network elements (NE) 3250, 3252, 3254, 3256, etc. for facilitating the broadband access 3210, wireless access 3220, voice access 3230, media access 3240 and/or the distribution of content from content sources 3275. The communications network 3225 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 3212 can include a digital subscriber line access multiplexer (DSLAM), cable modem termination system (CMTS), optical line terminal (OLT) and/or other access terminal. The data terminals 3214 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 3222 can include a 4G, 5G, or higher generation base station, an access point that operates via an 802.11 standard such as 802.11n, 802.11ac, 802.11ag, 802.11agn or other wireless access terminal. The mobile devices 3224 can include mobile phones, e-readers, tablets, phablets, wireless modems, and/or other mobile computing devices.

In various embodiments, the switching device 3232 can include a private branch exchange or central office switch, a media services gateway, VoIP gateway or other gateway device and/or other switching device. The telephony devices 3234 can include traditional telephones (with or without a terminal adapter), VoIP telephones and/or other telephony devices.

In various embodiments, the media terminal 3242 can include a cable head-end or other TV head-end, a satellite receiver, gateway or other media terminal 3242. The display devices 3244 can include televisions with or without a set top box, personal computers and/or other display devices.

In various embodiments, the content sources 3275 include broadcast television and radio sources, video on demand platforms and streaming video and audio services platforms, one or more content data networks, data servers, web servers and other content servers, and/or other sources of media.

In various embodiments, the communications network 3225 can include wired, optical and/or wireless links and the network elements 3250, 3252, 3254, 3256, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

It will be appreciated that any of the subsystems (e.g., access terminal 3212, network elements 3250-3256, media terminal 3242, switching device 3232, wireless access 3220, and so on) of the communication network 3200 can be configured or otherwise adapted to utilize in whole or in part any of the embodiments of the subject disclosure for transmitting and receiving communication signals via electromagnetic waves that propagate over wireless or physical transmission media.

Figure 33:
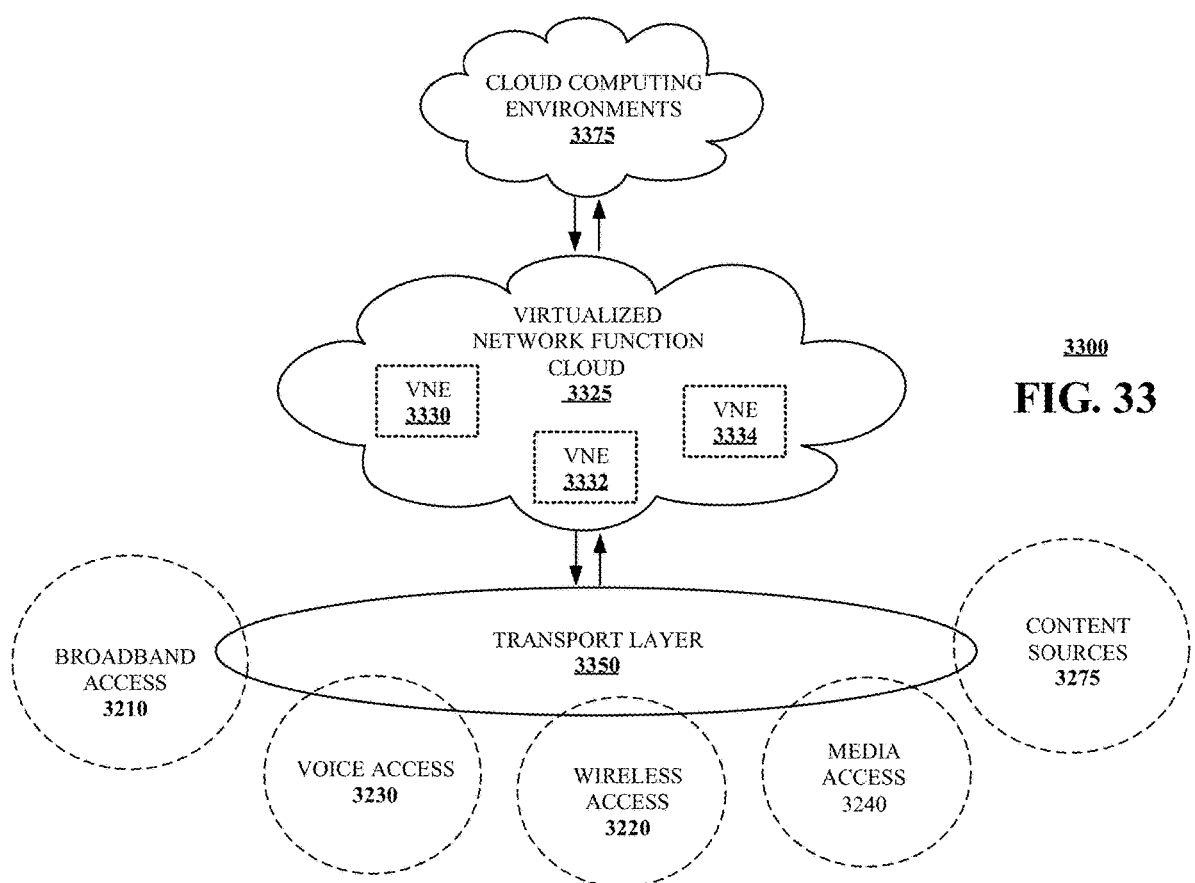
FIG. 33 is a block diagram illustrating an example, non-limiting embodiment of a virtualized communication network in accordance with various aspects described herein.

Referring now to FIG. 33, a block diagram 3300 is shown illustrating an example, non-limiting embodiment of a virtualized communication network in accordance with various aspects described herein. In particular a virtualized communication network is presented that can be used to implement some or all of the subsystems and functions of communication network 3200, some or all of the embodiments associated with waveguide systems and methods thereof, some or all of the embodiments associated with distributed antenna systems, or other embodiments and methods thereof described by the subject disclosure.

In particular, a cloud networking architecture is shown that leverages cloud technologies and supports rapid innovation and scalability via a transport layer 3350, a virtualized network function cloud 3325 and/or one or more cloud computing environments 3375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 3330, 3332, 3334, etc. that perform some or all of the functions of network elements 3250, 3252, 3254, 3256, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 3250 (shown in FIG. 32), such as an edge router can be implemented via a virtual network element 3330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 3350 includes fiber, cable, wired and/or wireless transport elements, network elements and interfaces to provide broadband access 3210, wireless access 3220, voice access 3230, media access 3240 and/or access to content sources 3275 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 3330, 3332 or 3334. These network elements can be included in transport layer 3350.

The virtualized network function cloud 3325 interfaces with the transport layer 3350 to provide the virtual network elements 3330, 3332, 3334, etc. to provide specific NFVs. In particular, the virtualized network function cloud 3325 leverages cloud operations, applications, and architectures to support networking workloads. The virtualized network elements 3330, 3332 and 3334 can employ network function software that provides either a one-for-one mapping of traditional network element function or alternately some combination of network functions designed for cloud computing. For example, virtualized network elements 3330, 3332 and 3334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 3330, 3332, 3334, etc. can be instantiated and managed using an orchestration approach similar to those used in cloud compute services.

The cloud computing environments 3375 can interface with the virtualized network function cloud 3325 via APIs that expose functional capabilities of the VNE 3330, 3332, 3334, etc. to provide the flexible and expanded capabilities to the virtualized network function cloud 3325. In particular, network workloads may have applications distributed across the virtualized network function cloud 3325 and cloud computing environment 3375 and in the commercial cloud, or might simply orchestrate workloads supported entirely in NFV infrastructure from these third party locations.

It will be appreciated that any of the foregoing techniques can be applied or combined in whole or in party with any embodiments of the subsystems and functions of communication network 3200, some or all of the embodiments associated with waveguide systems and methods thereof, some or all of the embodiments associated with distributed antenna systems, as well as other embodiments and methods thereof described by the subject disclosure.

Figure 34:
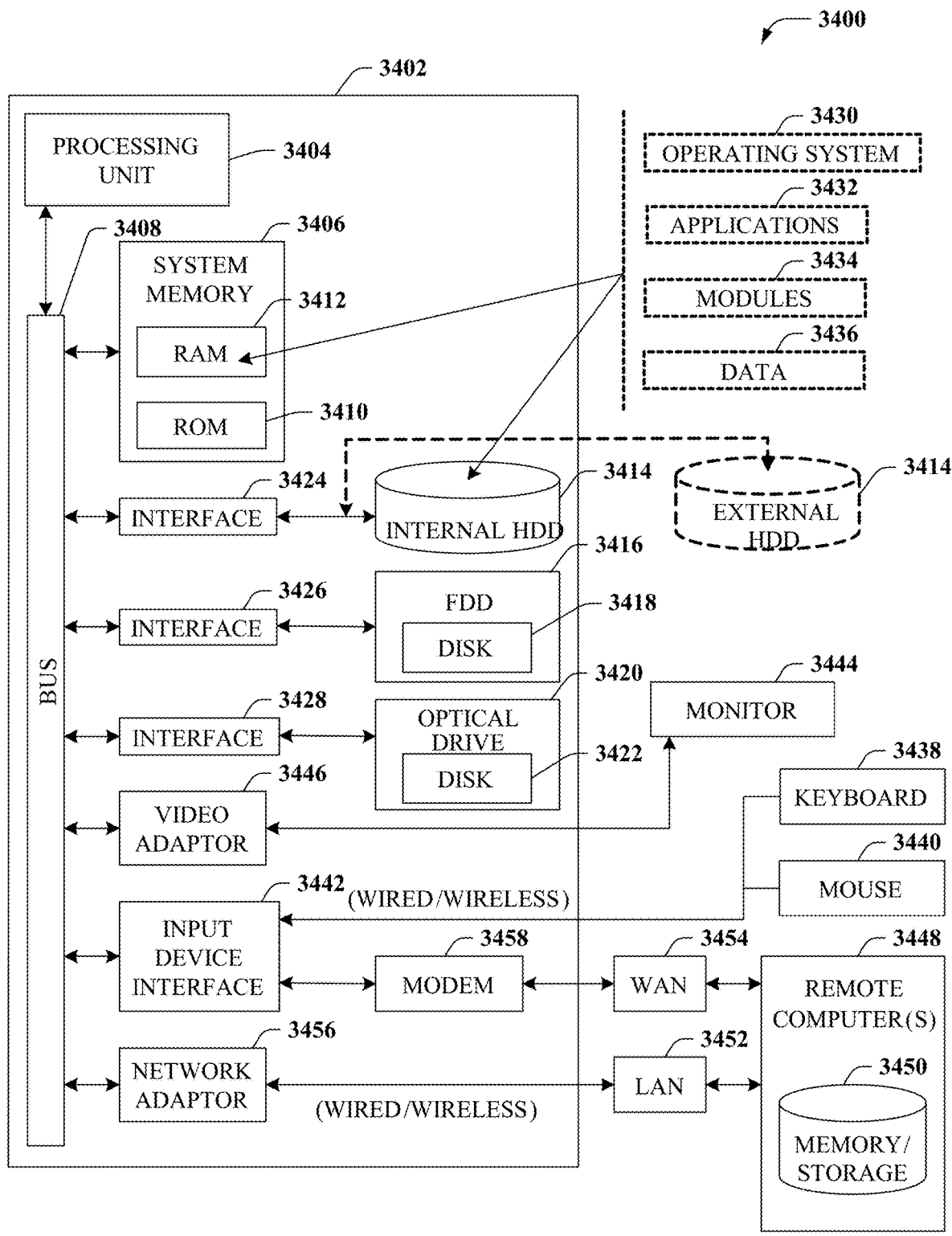
FIG. 34 is a block diagram of an example, non-limiting embodiment of a computing environment in accordance with various aspects described herein.

Referring now to FIG. 34, there is illustrated a block diagram of a computing environment in accordance with various aspects described herein. In order to provide additional context for various embodiments of the embodiments described herein, FIG. 34 and the following discussion are intended to provide a brief, general description of a suitable computing environment 3400 in which the various embodiments of the subject disclosure can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes processor as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 34, the example environment 3400 for transmitting and receiving signals via or forming at least part of a base station (e.g., base station devices 1504, macrocell site 1502, or base stations 1614) or central office (e.g., central office 1501 or 1611). At least a portion of the example environment 3400 can also be used for transmission devices 101 or 102. The example environment can comprise a computer 3402, the computer 3402 comprising a processing unit 3404, a system memory 3406 and a system bus 3408. The system bus 3408 couple's system components including, but not limited to, the system memory 3406 to the processing unit 3404. The processing unit 3404 can be any of various commercially available processors. Dual microprocessors and other multiprocessor architectures can also be employed as the processing unit 3404.

The system bus 3408 can be any of several types of bus structure that can further interconnect to a memory bus (with or without a memory controller), a peripheral bus, and a local bus using any of a variety of commercially available bus architectures. The system memory 3406 comprises ROM 3410 and RAM 3412. A basic input/output system (BIOS) can be stored in a non-volatile memory such as ROM, erasable programmable read only memory (EPROM), EEPROM, which BIOS contains the basic routines that help to transfer information between elements within the computer 3402, such as during startup. The RAM 3412 can also comprise a high-speed RAM such as static RAM for caching data.

The computer 3402 further comprises an internal hard disk drive (HDD) 3414 (e.g., EIDE, SATA), which internal hard disk drive 3414 can also be configured for external use in a suitable chassis (not shown), a magnetic floppy disk drive (FDD) 3416, (e.g., to read from or write to a removable diskette 3418) and an optical disk drive 3420, (e.g., reading a CD-ROM disk 3422 or, to read from or write to other high capacity optical media such as the DVD). The hard disk drive 3414, magnetic disk drive 3416 and optical disk drive 3420 can be connected to the system bus 3408 by a hard disk drive interface 3424, a magnetic disk drive interface 3426 and an optical drive interface 3428, respectively. The interface 3424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 3412, comprising an operating system 3430, one or more application programs 3432, other program modules 3434 and program data 3436. All or portions of the operating system, applications, modules, and/or data can also be cached in the RAM 3412. The systems and methods described herein can be implemented utilizing various commercially available operating systems or combinations of operating systems. Examples of application programs 3432 that can be implemented and otherwise executed by processing unit 3404 include the diversity selection determining performed by transmission device 101 or 102.

A user can enter commands and information into the computer 3402 through one or more wired/wireless input devices, e.g., a keyboard 3438 and a pointing device, such as a mouse 3440. Other input devices (not shown) can comprise a microphone, an infrared (IR) remote control, a joystick, a game pad, a stylus pen, touch screen or the like. These and other input devices are often connected to the processing unit 3404 through an input device interface 3442 that can be coupled to the system bus 3408, but can be connected by other interfaces, such as a parallel port, an IEEE 1394 serial port, a game port, a universal serial bus (USB) port, an IR interface, etc.

A monitor 3444 or other type of display device can be also connected to the system bus 3408 via an interface, such as a video adapter 3446. It will also be appreciated that in alternative embodiments, a monitor 3444 can also be any display device (e.g., another computer having a display, a smart phone, a tablet computer, etc.) for receiving display information associated with computer 3402 via any communication means, including via the Internet and cloud-based networks. In addition to the monitor 3444, a computer typically comprises other peripheral output devices (not shown), such as speakers, printers, etc.

The computer 3402 can operate in a networked environment using logical connections via wired and/or wireless communications to one or more remote computers, such as a remote computer(s) 3448. The remote computer(s) 3448 can be a workstation, a server computer, a router, a personal computer, portable computer, microprocessor-based entertainment appliance, a peer device or other common network node, and typically comprises many or all of the elements described relative to the computer 3402, although, for purposes of brevity, only a memory/storage device 3450 is illustrated. The logical connections depicted comprise wired/wireless connectivity to a local area network (LAN) 3452 and/or larger networks, e.g., a wide area network (WAN) 3454. Such LAN and WAN networking environments are commonplace in offices and companies, and facilitate enterprise-wide computer networks, such as intranets, all of which can connect to a global communications network, e.g., the Internet.

When used in a LAN networking environment, the computer 3402 can be connected to the local network 3452 through a wired and/or wireless communication network interface or adapter 3456. The adapter 3456 can facilitate wired or wireless communication to the LAN 3452, which can also comprise a wireless AP disposed thereon for communicating with the wireless adapter 3456.

When used in a WAN networking environment, the computer 3402 can comprise a modem 3458 or can be connected to a communications server on the WAN 3454 or has other means for establishing communications over the WAN 3454, such as by way of the Internet. The modem 3458, which can be internal or external and a wired or wireless device, can be connected to the system bus 3408 via the input device interface 3442. In a networked environment, program modules depicted relative to the computer 3402 or portions thereof, can be stored in the remote memory/storage device 3450. It will be appreciated that the network connections shown are example and other means of establishing a communications link between the computers can be used.

The computer 3402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and Bluetooth® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 35:
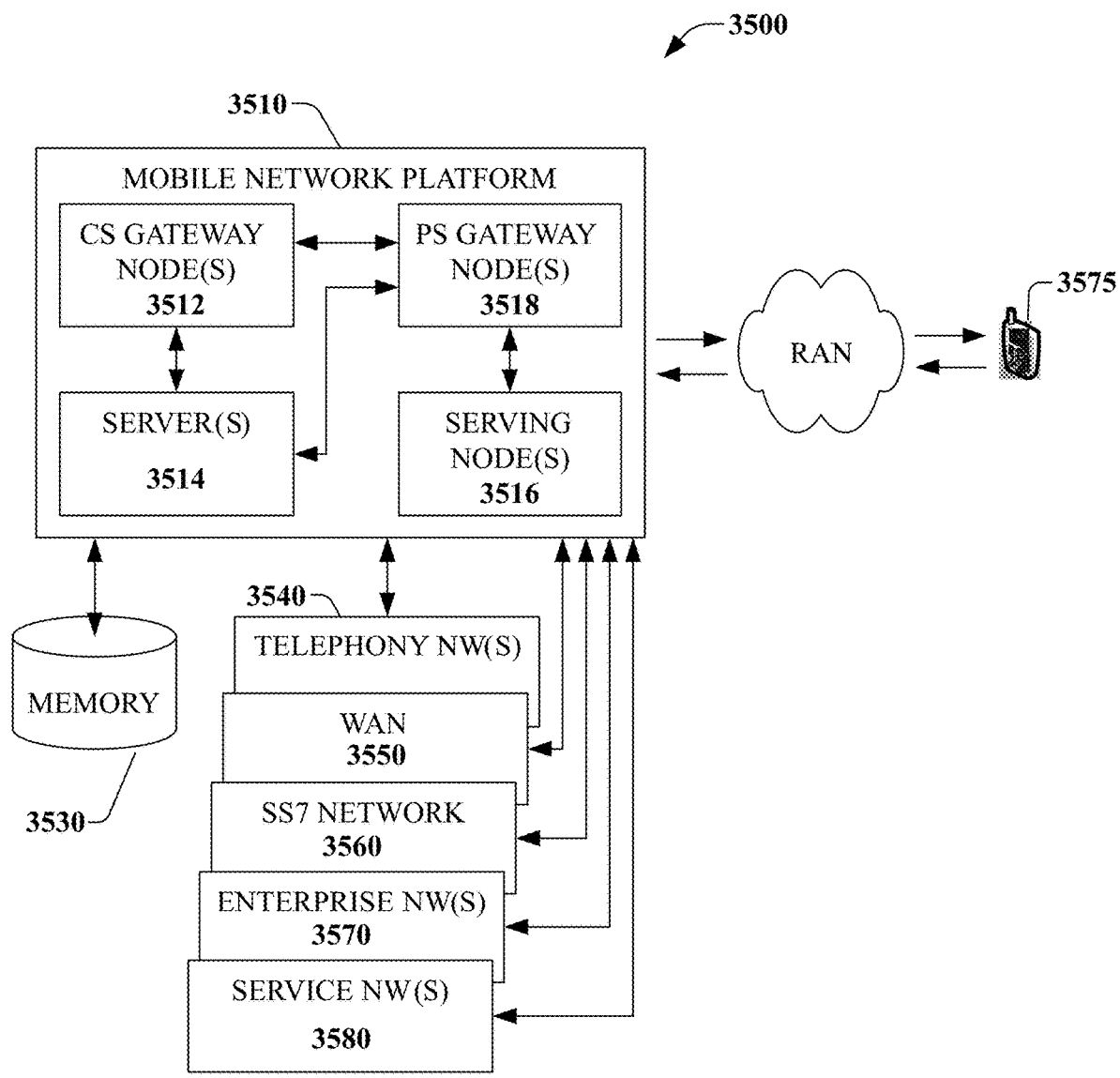
FIG. 35 is a block diagram of an example, non-limiting embodiment of a mobile network platform in accordance with various aspects described herein.

FIG. 35 presents an example embodiment 3500 of a mobile network platform 3510 that can implement and exploit one or more aspects of the disclosed subject matter described herein. In one or more embodiments, the mobile network platform 3510 can generate and receive signals transmitted and received by base stations (e.g., base station devices 1504, macrocell site 1502, or base stations 1614), central office (e.g., central office 1501 or 1611), or transmission device 101 or 102 associated with the disclosed subject matter. Generally, wireless network platform 3510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 3510 can be included in telecommunications carrier networks, and can be considered carrier-side components as discussed elsewhere herein. Mobile network platform 3510 comprises CS gateway node(s) 3522 which can interface CS traffic received from legacy networks like telephony network(s) 3540 (e.g., public switched telephone network (PSTN), or public land mobile network (PLMN)) or a signaling system #7 (SS7) network 3560. Circuit switched gateway node(s) 3522 can authorize and authenticate traffic (e.g., voice) arising from such networks. Additionally, CS gateway node(s) 3522 can access mobility, or roaming, data generated through SS7 network 3560; for instance, mobility data stored in a visited location register (VLR), which can reside in memory 3530. Moreover, CS gateway node(s) 3522 interfaces CS-based traffic and signaling and PS gateway node(s) 3518. As an example, in a 3GPP UMTS network, CS gateway node(s) 3522 can be realized at least in part in gateway GPRS support node(s) (GGSN). It should be appreciated that functionality and specific operation of CS gateway node(s) 3522, PS gateway node(s) 3518, and serving node(s) 3516, is provided and dictated by radio technology (ies) utilized by mobile network platform 3510 for telecommunication.

In addition to receiving and processing CS-switched traffic and signaling, PS gateway node(s) 3518 can authorize and authenticate PS-based data sessions with served mobile devices. Data sessions can comprise traffic, or content(s), exchanged with networks external to the wireless network platform 3510, like wide area network(s) (WANs) 3550, enterprise network(s) 3570, and service network(s) 3580, which can be embodied in local area network(s) (LANs), can also be interfaced with mobile network platform 3510 through PS gateway node(s) 3518. It is to be noted that WANs 3550 and enterprise network(s) 3570 can embody, at least in part, a service network(s) like IP multimedia subsystem (IMS). Based on radio technology layer(s) available in technology resource(s) 3517, packet-switched gateway node(s) 3518 can generate packet data protocol contexts when a data session is established; other data structures that facilitate routing of packetized data also can be generated. To that end, in an aspect, PS gateway node(s) 3518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 3500, wireless network platform 3510 also comprises serving node(s) 3516 that, based upon available radio technology layer(s), convey the various packetized flows of data streams received through PS gateway node(s) 3518. It is to be noted that for technology resource(s) 3517 that rely primarily on CS communication, server node(s) can deliver traffic without reliance on PS gateway node(s) 3518; for example, server node(s) can embody at least in part a mobile switching center. As an example, in a 3GPP UMTS network, serving node(s) 3516 can be embodied in serving GPRS support node(s) (SGSN).

For radio technologies that exploit packetized communication, server(s) 3514 in wireless network platform 3510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 3510. Data streams (e.g., content(s) that are part of a voice call or data session) can be conveyed to PS gateway node(s) 3518 for authorization/authentication and initiation of a data session, and to serving node(s) 3516 for communication thereafter. In addition to application server, server(s) 3514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 3510 to ensure network's operation and data integrity in addition to authorization and authentication procedures that CS gateway node(s) 3522 and PS gateway node(s) 3518 can enact. Moreover, provisioning server(s) can provision services from external network(s) like networks operated by a disparate service provider; for instance, WAN 3550 or Global Positioning System (GPS) network(s) (not shown). Provisioning server(s) can also provision coverage through networks associated to wireless network platform 3510 (e.g., deployed and operated by the same service provider), such as the distributed antennas networks shown in FIG. 1 that enhance wireless service coverage by providing more network coverage. Repeater devices such as those shown in FIGS. 7, 8, and 9 also improve network coverage in order to enhance subscriber service experience by way of UE 3575.

It is to be noted that server(s) 3514 can comprise one or more processors configured to confer at least in part the functionality of macro network platform 3510. To that end, the one or more processor can execute code instructions stored in memory 3530, for example. It is should be appreciated that server(s) 3514 can comprise a content manager, which operates in substantially the same manner as described hereinbefore.

In example embodiment 3500, memory 3530 can store information related to operation of wireless network platform 3510. Other operational information can comprise provisioning information of mobile devices served through wireless platform network 3510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 3530 can also store information from at least one of telephony network(s) 3540, WAN 3550, enterprise network(s) 3570, or SS7 network 3560. In an aspect, memory 3530 can be, for example, accessed as part of a data store component or as a remotely connected memory store.

In order to provide a context for the various aspects of the disclosed subject matter, FIG. 35, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 36:
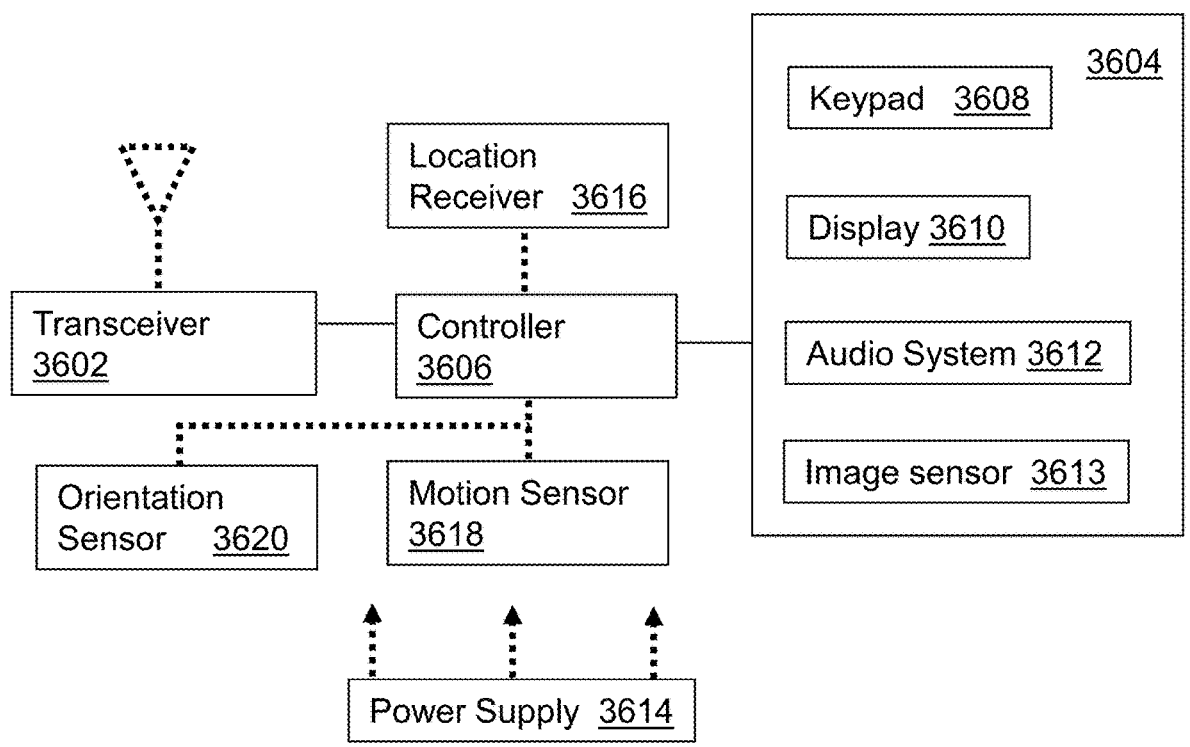
FIG. 36 is a block diagram of an example, non-limiting embodiment of a communication device in accordance with various aspects described herein.

FIG. 36 depicts an illustrative embodiment of a communication device 3600. The communication device 3600 can serve as an illustrative embodiment of devices such as mobile devices and in-building devices referred to by the subject disclosure (e.g., in FIGS. 15, 16A and 16B).

The communication device 3600 can comprise a wireline and/or wireless transceiver 3602 (herein transceiver 3602), a user interface (UI) 3604, a power supply 3614, a location receiver 3616, a motion sensor 3618, an orientation sensor 3620, and a controller 3606 for managing operations thereof. The transceiver 3602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 3602 can also be adapted to support circuit-switched wireline access technologies (such as PSTN), packet-switched wireline access technologies (such as TCP/IP, VoIP, etc.), and combinations thereof.

The UI 3604 can include a depressible or touch-sensitive keypad 3608 with a navigation mechanism such as a roller ball, a joystick, a mouse, or a navigation disk for manipulating operations of the communication device 3600. The keypad 3608 can be an integral part of a housing assembly of the communication device 3600 or an independent device operably coupled thereto by a tethered wireline interface (such as a USB cable) or a wireless interface supporting for example Bluetooth®. The keypad 3608 can represent a numeric keypad commonly used by phones, and/or a QWERTY keypad with alphanumeric keys. The UI 3604 can further include a display 3610 such as monochrome or color LCD (Liquid Crystal Display), OLED (Organic Light Emitting Diode) or other suitable display technology for conveying images to an end user of the communication device 3600. In an embodiment where the display 3610 is touch-sensitive, a portion or all of the keypad 3608 can be presented by way of the display 3610 with navigation features.

The display 3610 can use touch screen technology to also serve as a user interface for detecting user input. As a touch screen display, the communication device 3600 can be adapted to present a user interface having graphical user interface (GUI) elements that can be selected by a user with a touch of a finger. The touch screen display 3610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 3610 can be an integral part of the housing assembly of the communication device 3600 or an independent device communicatively coupled thereto by a tethered wireline interface (such as a cable) or a wireless interface.

The UI 3604 can also include an audio system 3612 that utilizes audio technology for conveying low volume audio (such as audio heard in proximity of a human ear) and high volume audio (such as speakerphone for hands free operation). The audio system 3612 can further include a microphone for receiving audible signals of an end user. The audio system 3612 can also be used for voice recognition applications. The UI 3604 can further include an image sensor 3613 such as a charged coupled device (CCD) camera for capturing still or moving images.

The power supply 3614 can utilize common power management technologies such as replaceable and rechargeable batteries, supply regulation technologies, and/or charging system technologies for supplying energy to the components of the communication device 3600 to facilitate long-range or short-range portable communications. Alternatively, or in combination, the charging system can utilize external power sources such as DC power supplied over a physical interface such as a USB port or other suitable tethering technologies.

The location receiver 3616 can utilize location technology such as a global positioning system (GPS) receiver capable of assisted GPS for identifying a location of the communication device 3600 based on signals generated by a constellation of GPS satellites, which can be used for facilitating location services such as navigation. The motion sensor 3618 can utilize motion sensing technology such as an accelerometer, a gyroscope, or other suitable motion sensing technology to detect motion of the communication device 3600 in three-dimensional space. The orientation sensor 3620 can utilize orientation sensing technology such as a magnetometer to detect the orientation of the communication device 3600 (north, south, west, and east, as well as combined orientations in degrees, minutes, or other suitable orientation metrics).

The communication device 3600 can use the transceiver 3602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 3606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 3600.

Other components not shown in FIG. 36 can be used in one or more embodiments of the subject disclosure. For instance, the communication device 3600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. For example, artificial intelligence can be used in optional training controller 230 evaluate and select candidate frequencies, modulation schemes, MIMO modes, and/or guided wave modes in order to maximize transfer efficiency. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving digital input data;
determining a twist number based on the digital input data, wherein the twist number corresponds to a predetermined orbital angular momentum;
deriving an adjustment value based on the twist number; and
controlling a plurality of orbital angular momentum modulators adapted to change orbital angular momenta of an input, free-space optical beam according to the adjustment value,
wherein application of a free-space light beam to the plurality of orbital angular momentum modulators applies orbital angular momenta to the input, free-space optical beam resulting in a modulated free-space optical beam having a predetermined number of twists based on the predetermined orbital angular momentum.

2. The device of claim 1, wherein the plurality of orbital angular momentum modulators comprise spiral phase plates.

3. The device of claim 2, wherein the spiral phase plates are adjustable to apply a selectable value of orbital angular momentum.

4. The device of claim 1, wherein the operations further comprise:
receiving the modulated free-space optical beam to obtain a received, twisted free-space optical beam;
generating a first image based on the received, twisted free-space optical beam;
applying a threshold filter to the first image, wherein the threshold filter is adapted to determine a comparison of an optical angular momentum of the received, twisted free-space optical beam to a predetermined threshold number of twists; and
re-directing the received, twisted free-space optical beam according to the comparison of the optical angular momentum of the received, twisted free-space optical beam to the predetermined threshold number of twists, to obtain a re-directed received, twisted free-space optical beam.

5. The device of claim 4, wherein the operations further comprise:
determining a second image based on the re-directed received, twisted free-space optical beam; and
evaluating the second image to detect a number of twists of the re-directed received, twisted free-space optical beam, resulting in a detected number of twists, wherein the detected number of twists.

6. The device of claim 5, wherein the operations further comprise decoding the detected number of twists to determine the digital input data.

7. The device of claim 1, wherein the device is mounted proximal to a power line, the operations further comprising obtaining first electrical power from an electromagnetic field of the power line, wherein the device is adapted to operate using the first electrical power.

8. The device of claim 7, wherein the operations further comprise obtaining second electrical power from a local, renewable energy source, when available, wherein the device is adapted to operate using the second electrical power, the operations further comprising using the second electrical power, when available, exclusively.

9. A method, comprising:
obtaining, by a processing system including a processor, input data;
identifying, by the processing system, a twist number based on the input data, wherein the twist number corresponds to a predetermined orbital angular momentum;
determining, by the processing system, an adjustment value based on the twist number; and
controlling, by the processing system, a plurality of orbital angular momentum modulators adapted to change orbital angular momenta of an input optical beam according to the adjustment value,
wherein application of a light beam to the plurality of orbital angular momentum modulators applies orbital angular momenta to the input optical beam resulting in a modulated optical beam having a predetermined number of twists based on the predetermined orbital angular momentum.

10. The method of claim 9, further comprising:
receiving, by the processing system, the modulated optical beam to obtain a received optical beam;
obtaining, by the processing system, a first image based on the received optical beam;
applying, by the processing system, a threshold filter to the first image, wherein the threshold filter is adapted to determine a comparison of an optical angular momentum of the received optical beam to a predetermined threshold number of twists; and
controlling, by the processing system, an optical directing device to redirect the received optical beam according to the comparison of the optical angular momentum of the received optical beam to the predetermined threshold number of twists, to obtain a re-directed received, twisted optical beam.

11. The method of claim 10, further comprising:
determining, by the processing system, a second image based on the re-directed received, twisted optical beam; and
evaluating, by the processing system, the second image to detect a number of twists of the re-directed received, twisted optical beam, resulting in a detected number of twists, wherein the detected number of twists.

12. The method of claim 11, further comprising:
decoding, by the processing system, the detected number of twists to determine the input data.

13. The method of claim 11, wherein the evaluating of the second image further comprises utilizing, by the processing system, an image processing technique.

14. The method of claim 9, further comprising obtaining first electrical power from an electromagnetic field of a power line, wherein the processing system is mounted proximal to the power line, and wherein the processing system is adapted to operate using the first electrical power.

15. The method of claim 14, further comprising:
obtaining, by the processing system, second electrical power from a local, renewable energy source, when available,
wherein the processing system is adapted to operate using the second electrical power, and wherein the second electrical power, when available, is used exclusively.

16. A non-transitory, machine-readable medium, comprising executable instructions that, when executed by a processing system including a processor, facilitate performance of operations, the operations comprising:
determining a twist number based on digital input data, wherein the twist number corresponds to a predetermined orbital angular momentum of a photon;
generating an adjustment value based on the twist number; and
adjusting a plurality of orbital angular momentum modulators adapted to change orbital angular momenta of photons of an input optical beam according to the adjustment value,
wherein application of a light beam to the plurality of orbital angular momentum modulators applies orbital angular momenta to the input optical beam resulting in a modulated optical beam having a predetermined number of twists based on the predetermined orbital angular momentum.

17. The non-transitory, machine-readable medium of claim 16, wherein the operations further comprise:
generating a first image based on a received, twisted optical beam;
applying a threshold filter to the first image, wherein the threshold filter is adapted to determine a comparison of an optical angular momentum of the received, twisted optical beam to a predetermined threshold number of twists; and
adjusting an optical directing device to redirect the received, twisted optical beam according to the comparison of the optical angular momentum of the received, twisted optical beam to the predetermined threshold number of twists, to obtain a re-directed received, twisted optical beam.

18. The non-transitory, machine-readable medium of claim 17, wherein the operations further comprise:
determining a second image based on the re-directed received, twisted optical beam; and
processing the second image to detect a number of twists of the re-directed received, twisted optical beam, resulting in a detected number of twists, wherein the detected number of twists.

19. The non-transitory, machine-readable medium of claim 18, wherein the processing of the second image further comprises applying image processing to the second image.

20. The non-transitory, machine-readable medium of claim 16, wherein the operations further comprise:
obtaining first electrical power from an electromagnetic field of a power line, wherein the processing system is adapted to operate using the first electrical power.

* * * * *